(12) United States Patent
Rouse et al.

(10) Patent No.: US 10,733,682 B1
(45) Date of Patent: Aug. 4, 2020

(54) METHODS AND SYSTEMS FOR OPTIMIZING ESCHEAT AND DERECOGNITION OF PREPAID CARDS, STORED VALUE CARDS, CREDIT MEMOS AND ELECTRONIC PAYMENT INSTRUMENTS

(71) Applicants: Phillip C. Rouse, Shawnee, KS (US);
Victoria Blake, Shawnee, KS (US);
Jeff Horen, Overland Park, KS (US);
Amanda Culp, Overland Park, KS (US)

(72) Inventors: Phillip C. Rouse, Shawnee, KS (US);
Victoria Blake, Shawnee, KS (US);
Jeff Horen, Overland Park, KS (US);
Amanda Culp, Overland Park, KS (US)

(73) Assignee: CARD COMPLIANT, LLC, Kansas City, MO (US)

( * ) Notice: Subject to any disclaimer, the term of this patent is extended or adjusted under 35 U.S.C. 154(b) by 809 days.

(21) Appl. No.: 14/166,539

(22) Filed: Jan. 28, 2014

Related U.S. Application Data

(63) Continuation of application No. 12/489,373, filed on Jun. 22, 2009, now Pat. No. 8,639,592.
(Continued)

(51) Int. Cl.
*G06Q 50/16* (2012.01)
*G06Q 40/00* (2012.01)
*G06Q 10/10* (2012.01)

(52) U.S. Cl.
CPC .......... *G06Q 50/167* (2013.01); *G06Q 40/12* (2013.12)

(58) Field of Classification Search
CPC ........ G06Q 40/10; G06Q 40/02; G06Q 40/00; G06Q 30/04; G06Q 20/10
(Continued)

(56) References Cited

U.S. PATENT DOCUMENTS 6,192,347 B1    2/2001  Graff
7,054,833 B1 *  5/2006  McDonald ............. G06Q 30/06
                                                            705/26.1

(Continued)

*Primary Examiner* — Garcia Ade
(74) *Attorney, Agent, or Firm* — Kutak Rock LLP

(57) ABSTRACT

Methods, processes, and systems architecture utilized to integrate key attributes of the unclaimed property laws of the states of the United States and other jurisdictions, along with certain generally accepted accounting principles, into a rules-based processing platform that processes, positions, and manages prepaid cards, stored value cards, and other payment instruments with respect to escheat under the unclaimed property laws and derecognition under the accounting standards are provided. A systems architecture platform aggregates transaction data and other information and processes escheat and derecognition for the payment instruments. Each instrument in a portfolio is individually positioned and individually repositioned into single or multiple footprint systems using one or more issuers to achieve optimum compliance with escheat laws while either minimizing or maximizing the breakage that is subject to escheat. Each instrument also is individually positioned and individually repositioned with respect to derecognition to optimize compliance with applicable accounting principles while managing the breakage that is not subject to escheat.

22 Claims, 36 Drawing Sheets

Single Footprint System

Related U.S. Application Data

(60) Provisional application No. 61/074,557, filed on Jun. 20, 2008.

(58) Field of Classification Search
USPC .......................................................... 705/30
See application file for complete search history.

(56) References Cited

U.S. PATENT DOCUMENTS

| | | |
|---|---|---|
| 7,107,239 B2 | 9/2006 | Graff |
| 7,258,273 B2 * | 8/2007 | Griffin .......................... 235/380 |
| 7,406,442 B1 | 7/2008 | Kottmeier et al. |
| 7,664,681 B1 | 2/2010 | Oliveau |
| 2004/0236688 A1 * | 11/2004 | Bozeman ............... G06Q 20/04 705/42 |
| 2005/0071177 A1 * | 3/2005 | Berger ................... G06Q 10/10 705/311 |

* cited by examiner

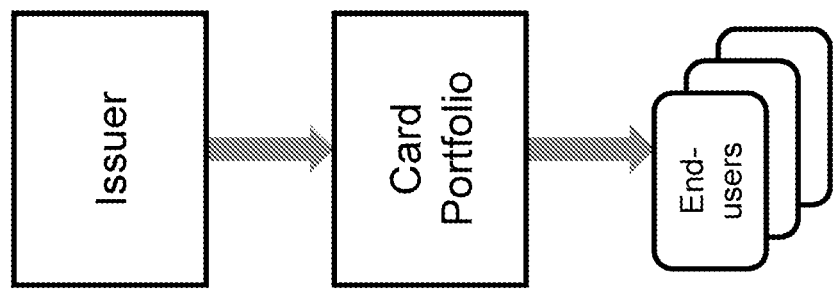
Figure 1 – Single Footprint System

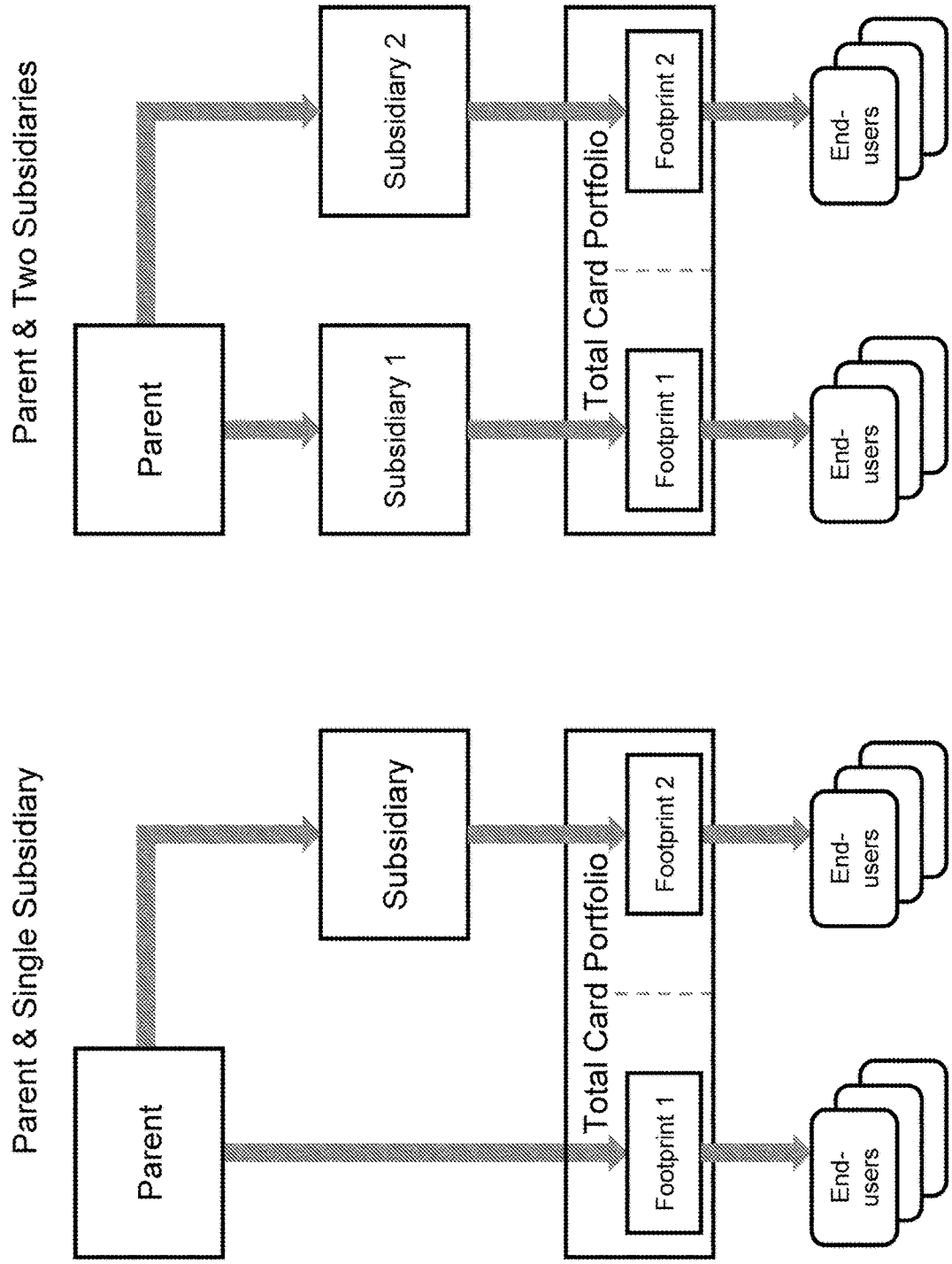

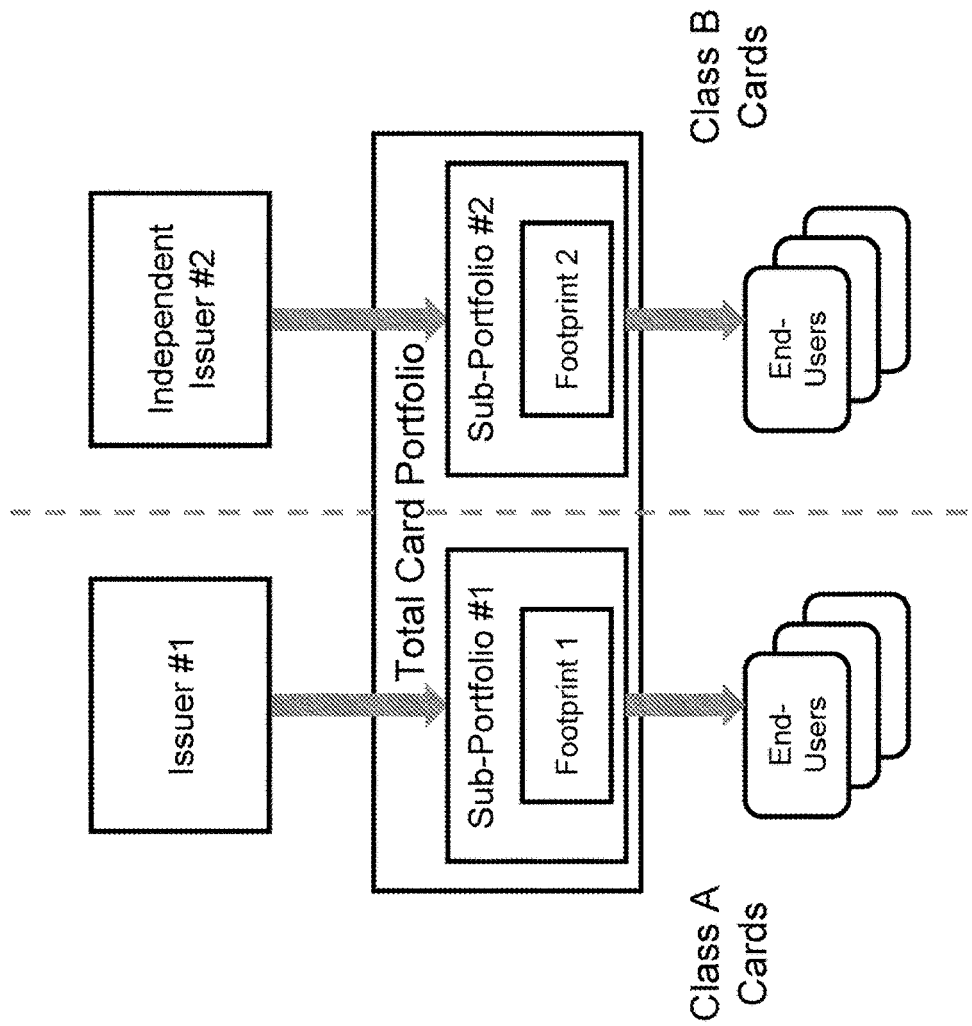

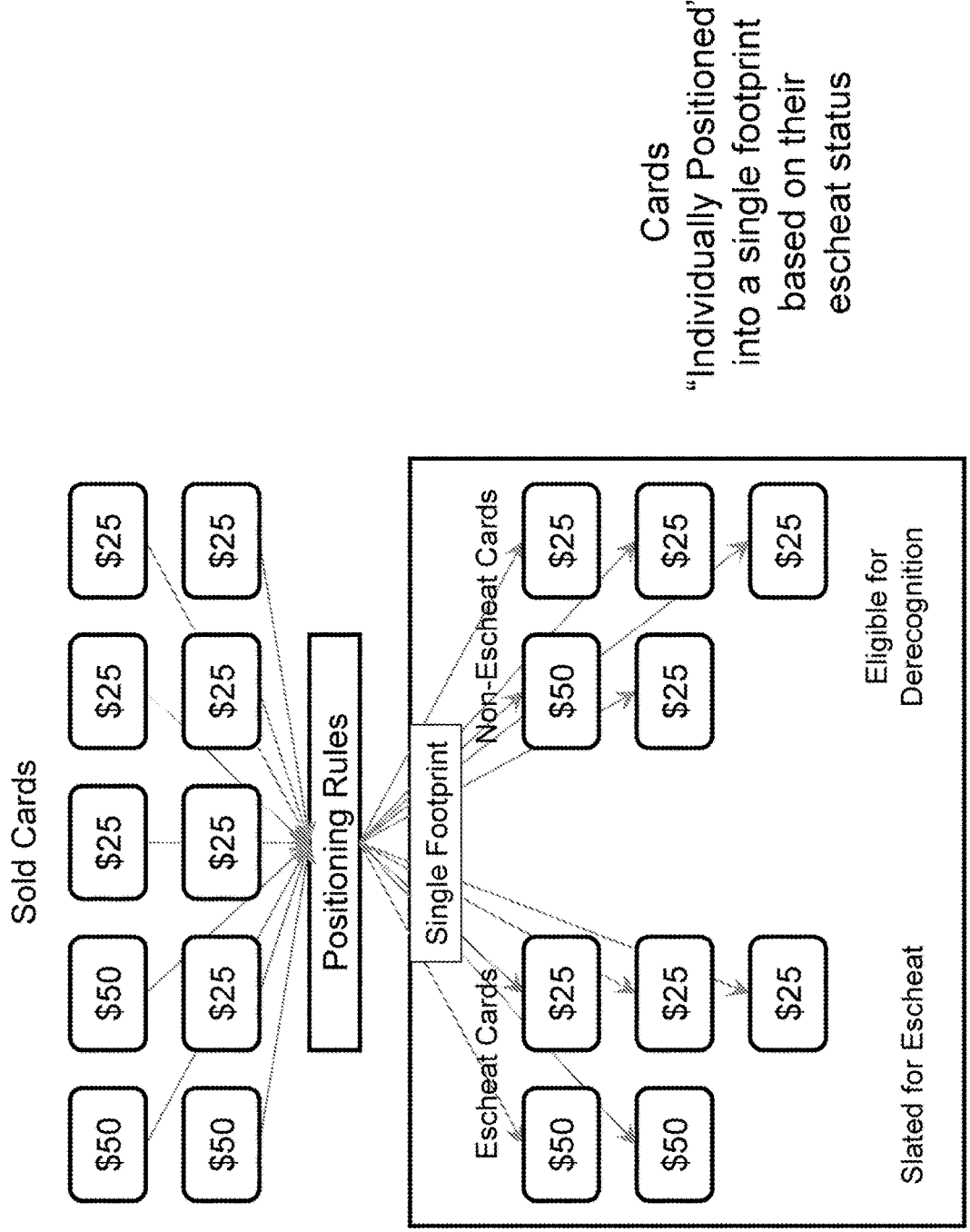

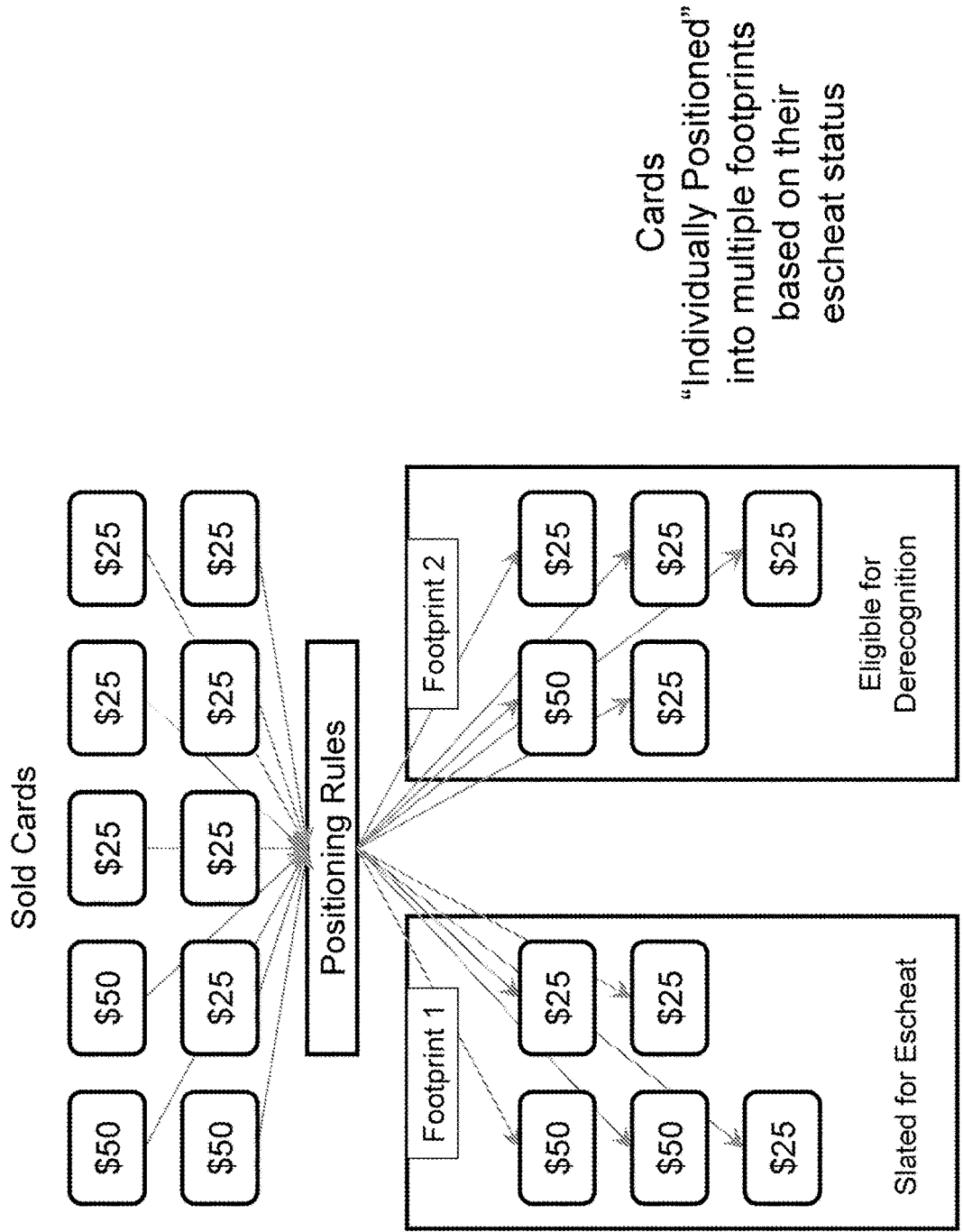

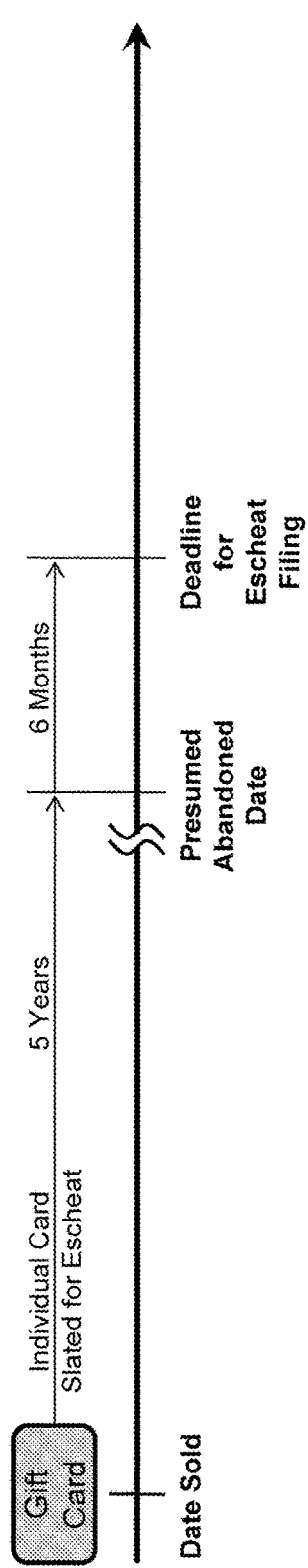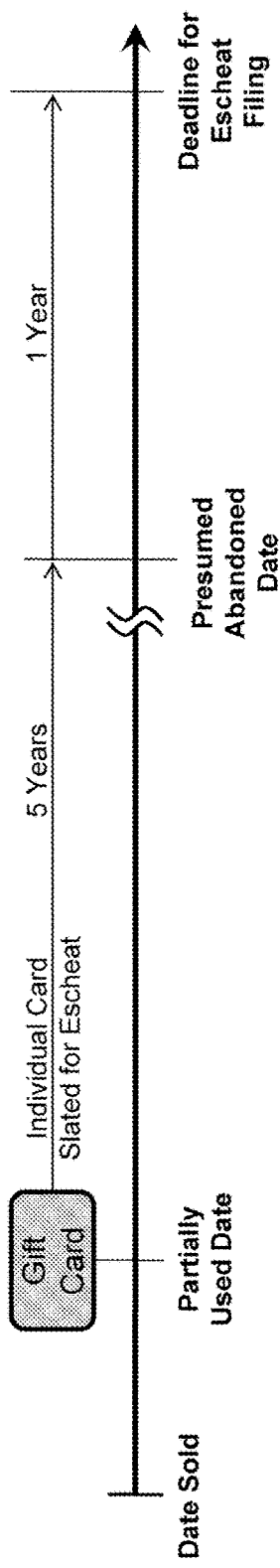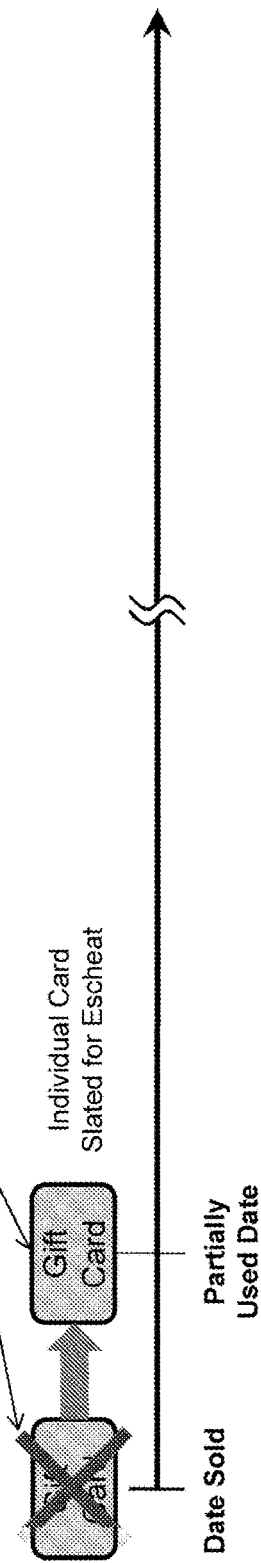
Figure 6 – Vertical Repositioning

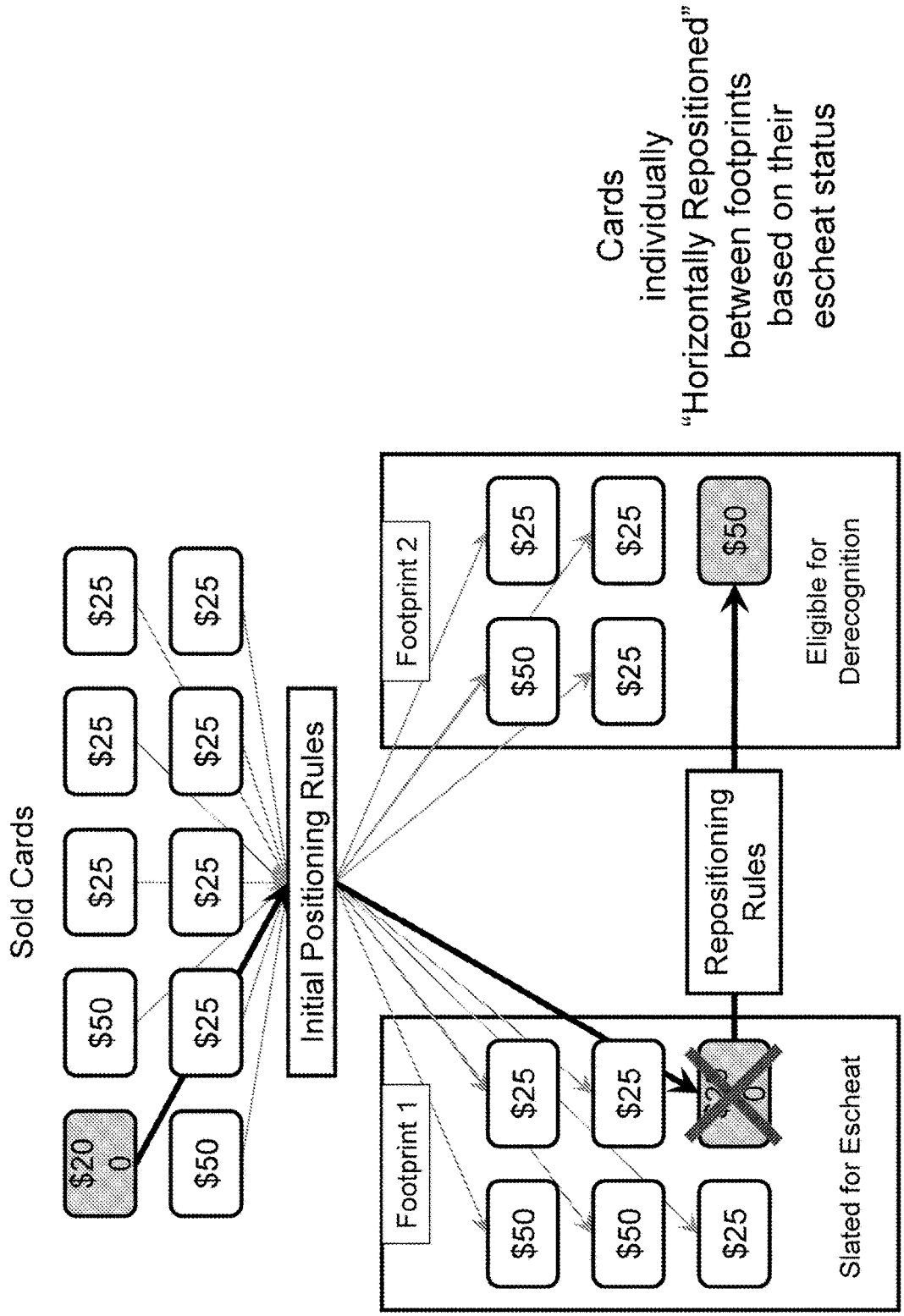
Figure 7 – Horizontal Repositioning

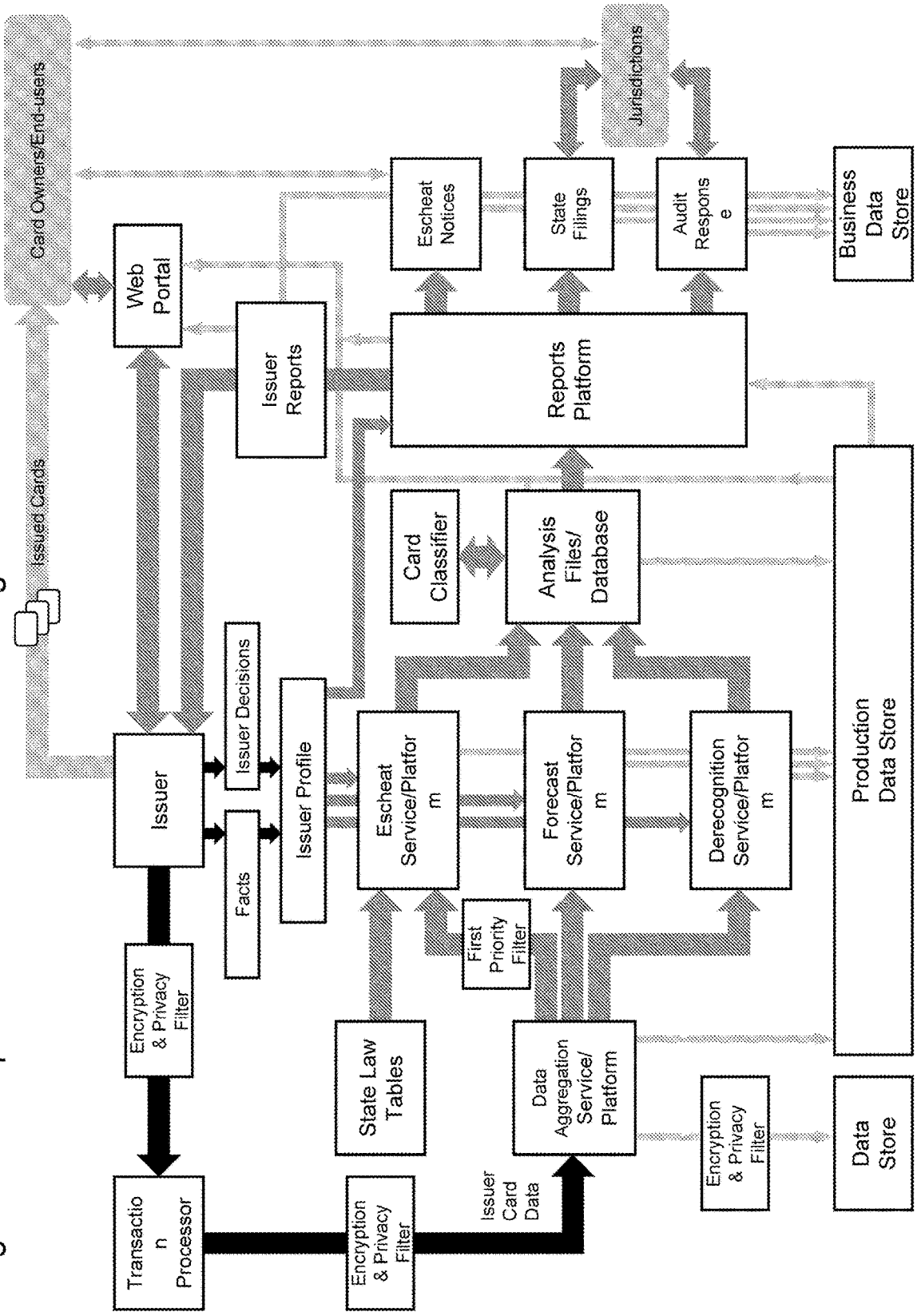

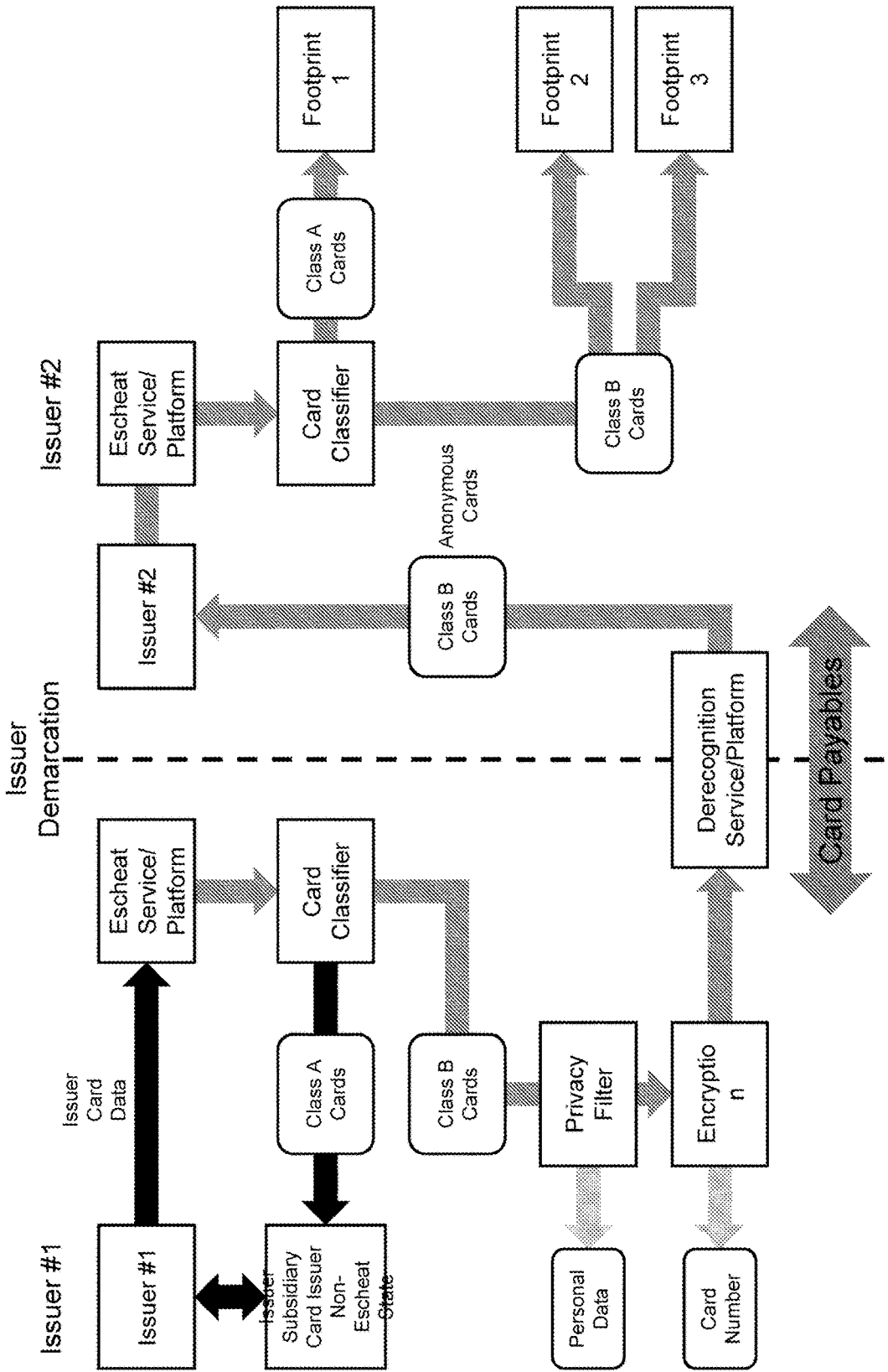
Figure 9 – Multiple Footprint System – Split Issuance

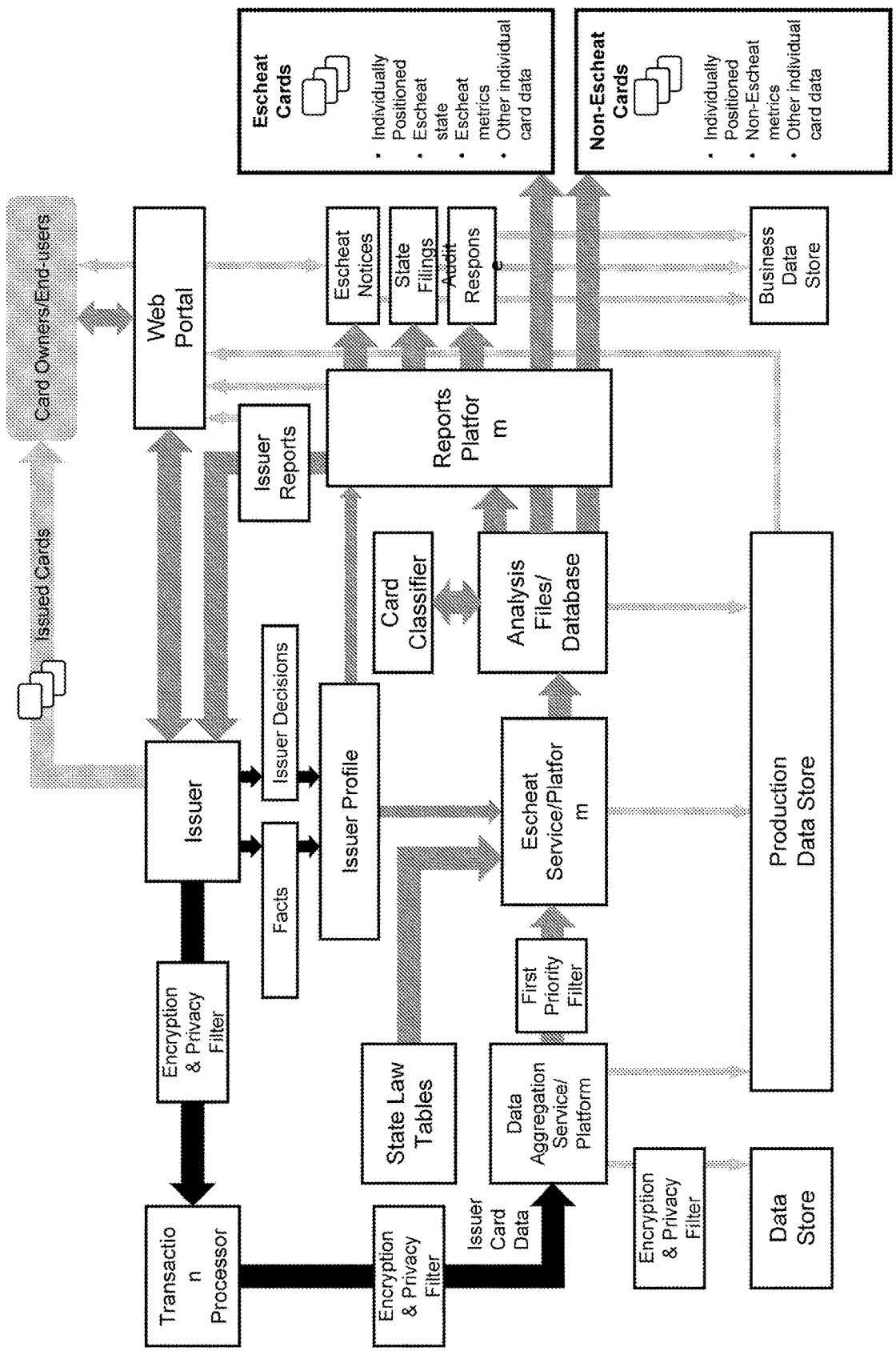
Figure 10 – Escheat Service/Platform

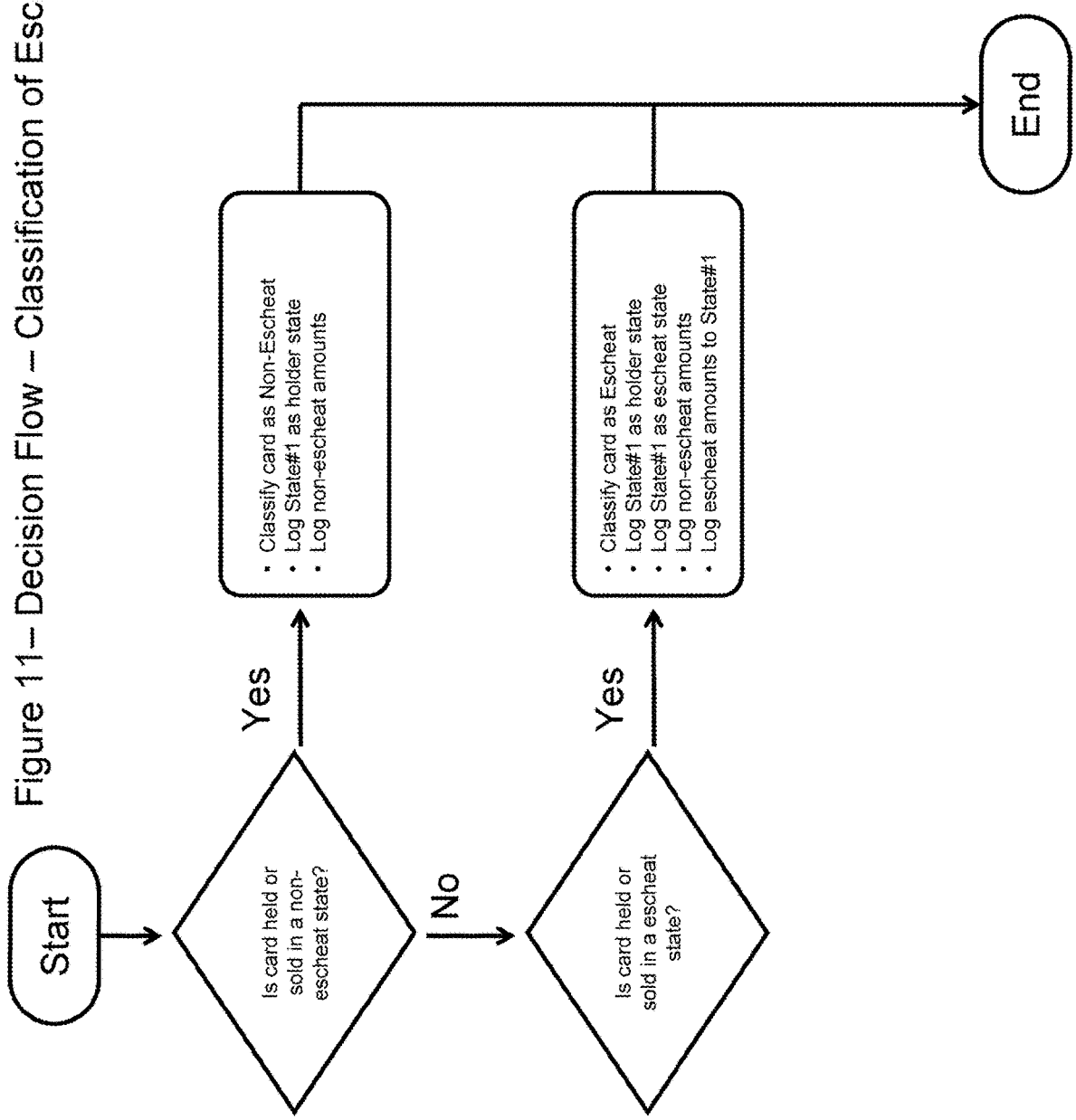
Figure 11 – Decision Flow – Classification of Escheat Status

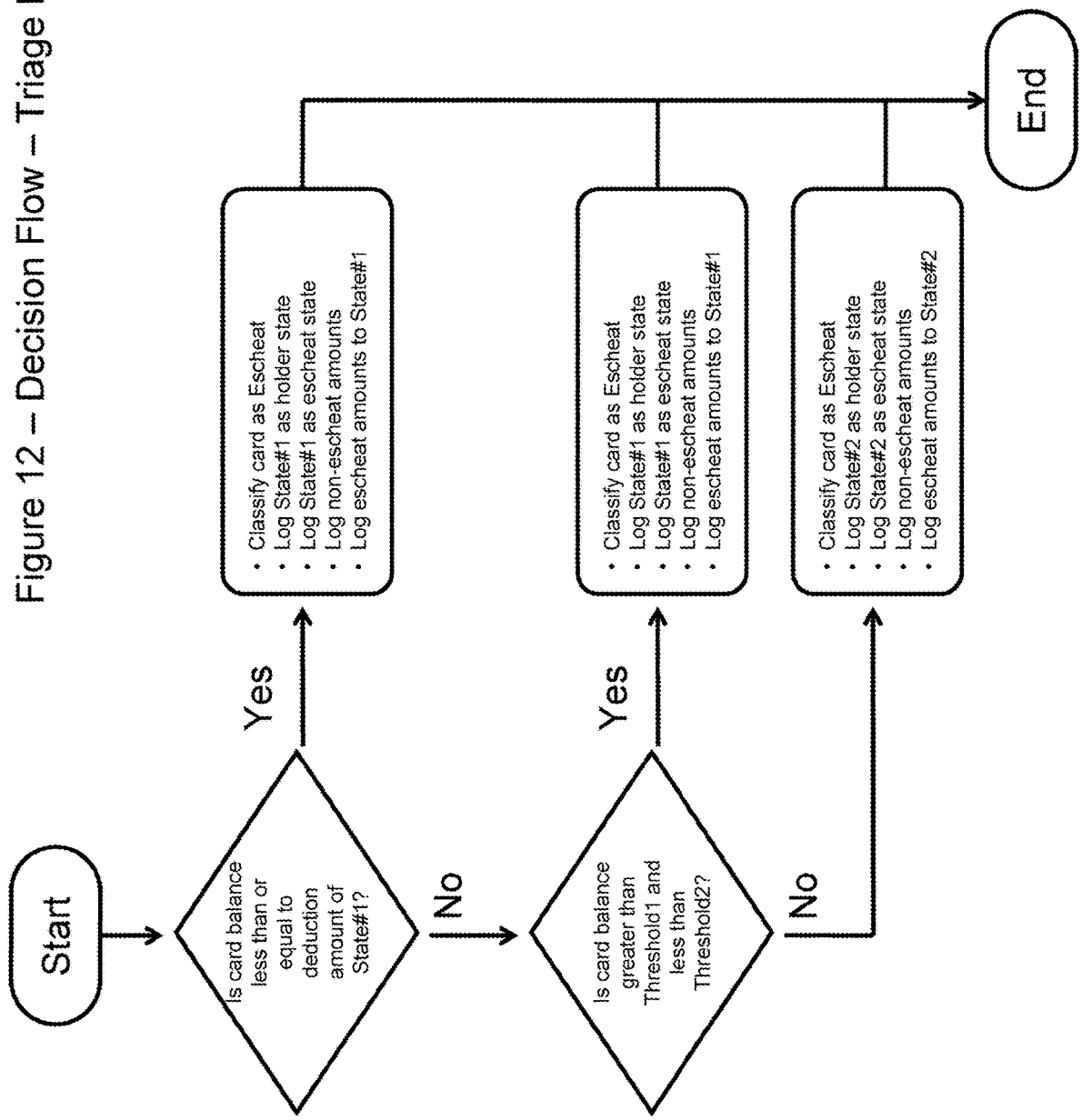
Figure 12 – Decision Flow – Triage Product 1

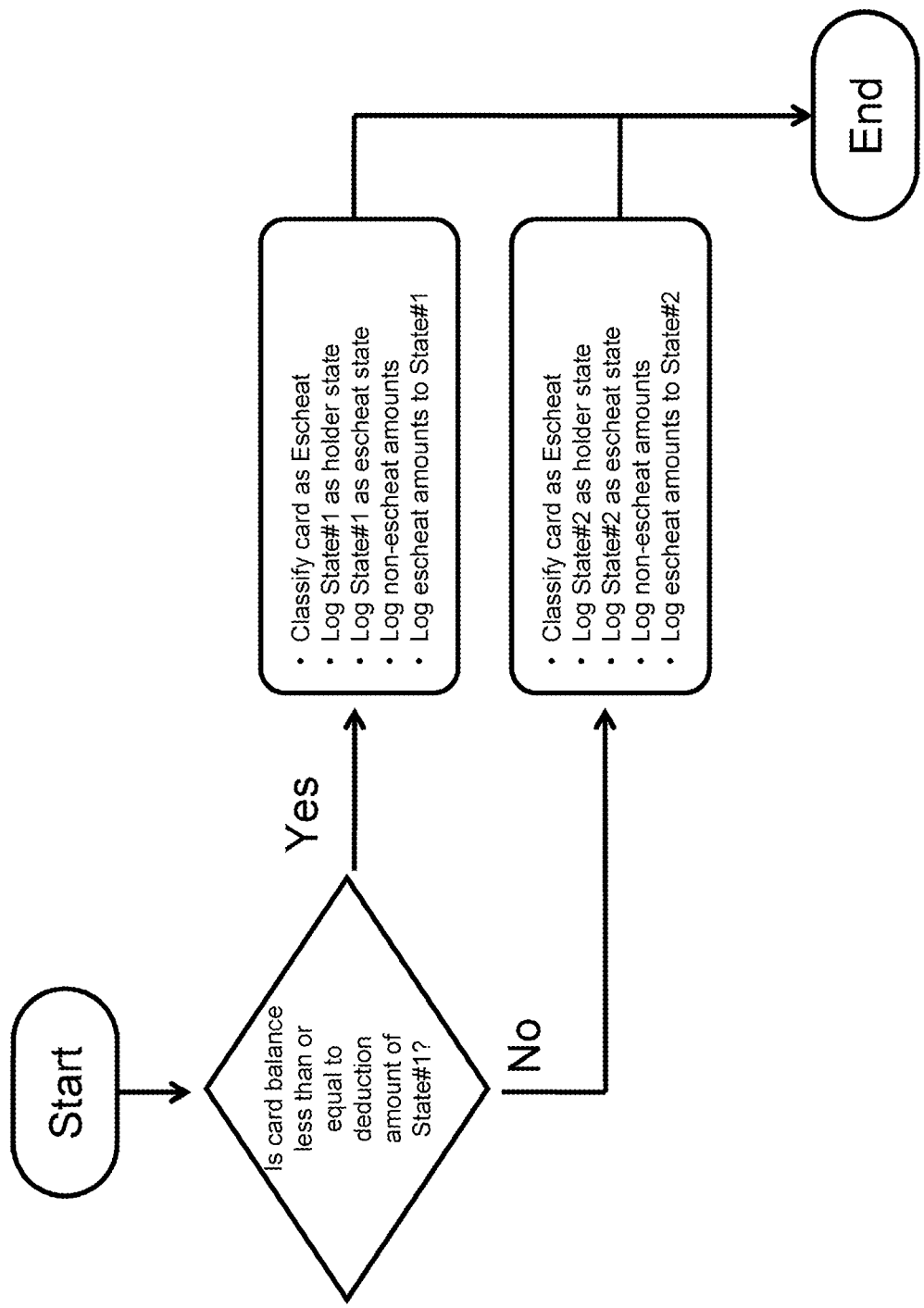
Figure 13 – Decision Flow – Triage Product 2

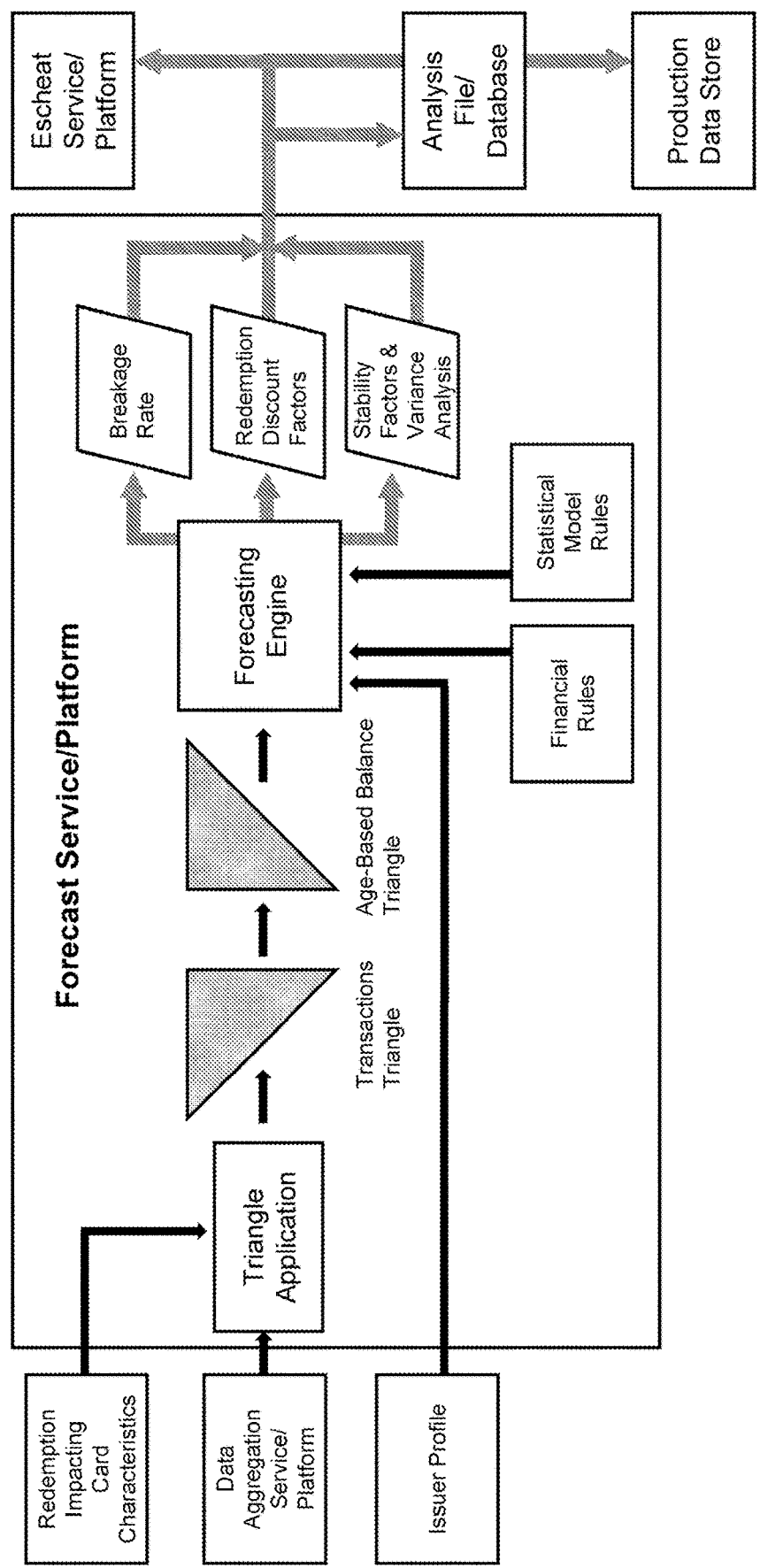
Figure 14 – Forecast Service/Platform

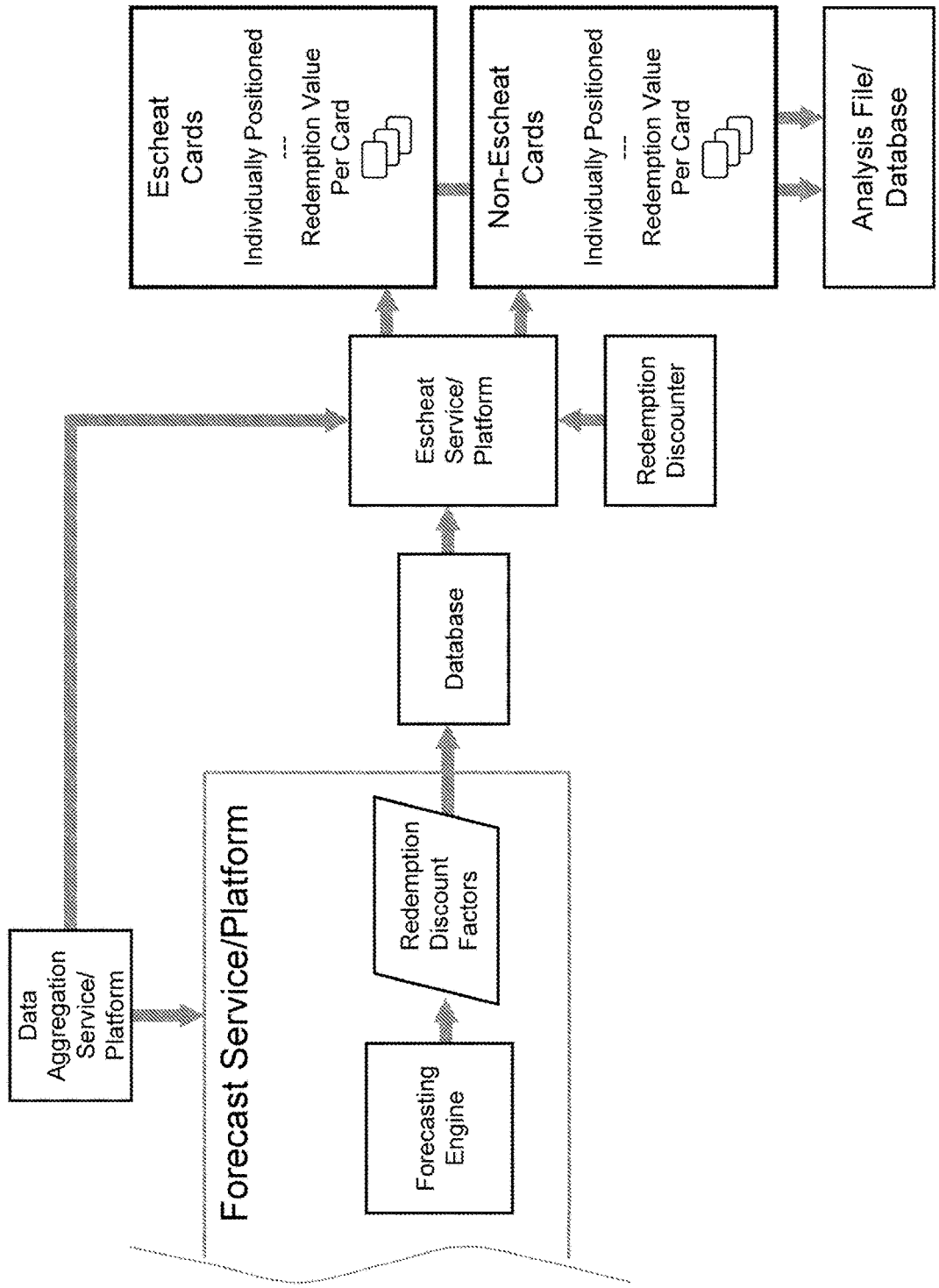
Figure 15 – Redemption Discounted Value System

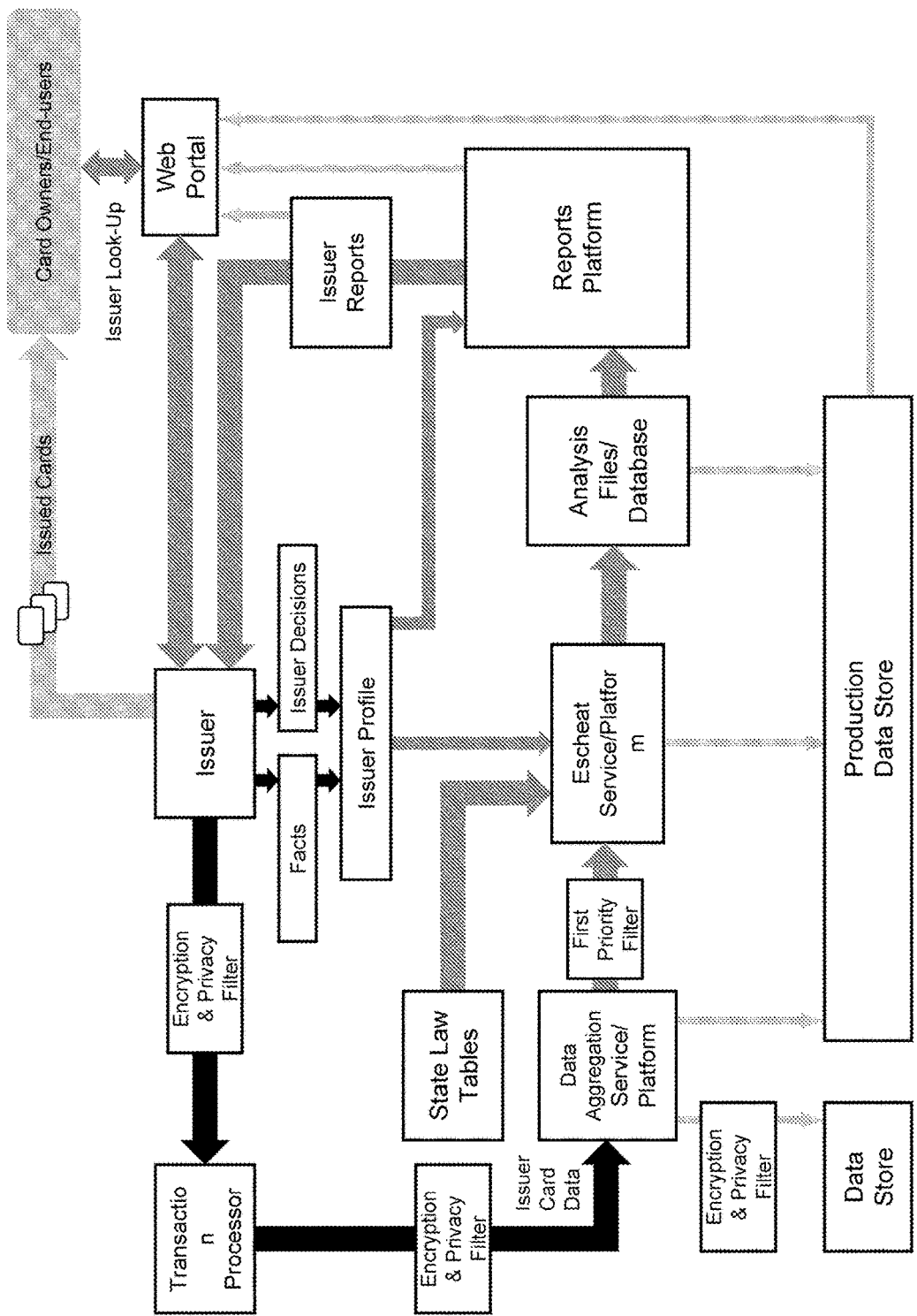
Figure 16 – Issuer Look-Up

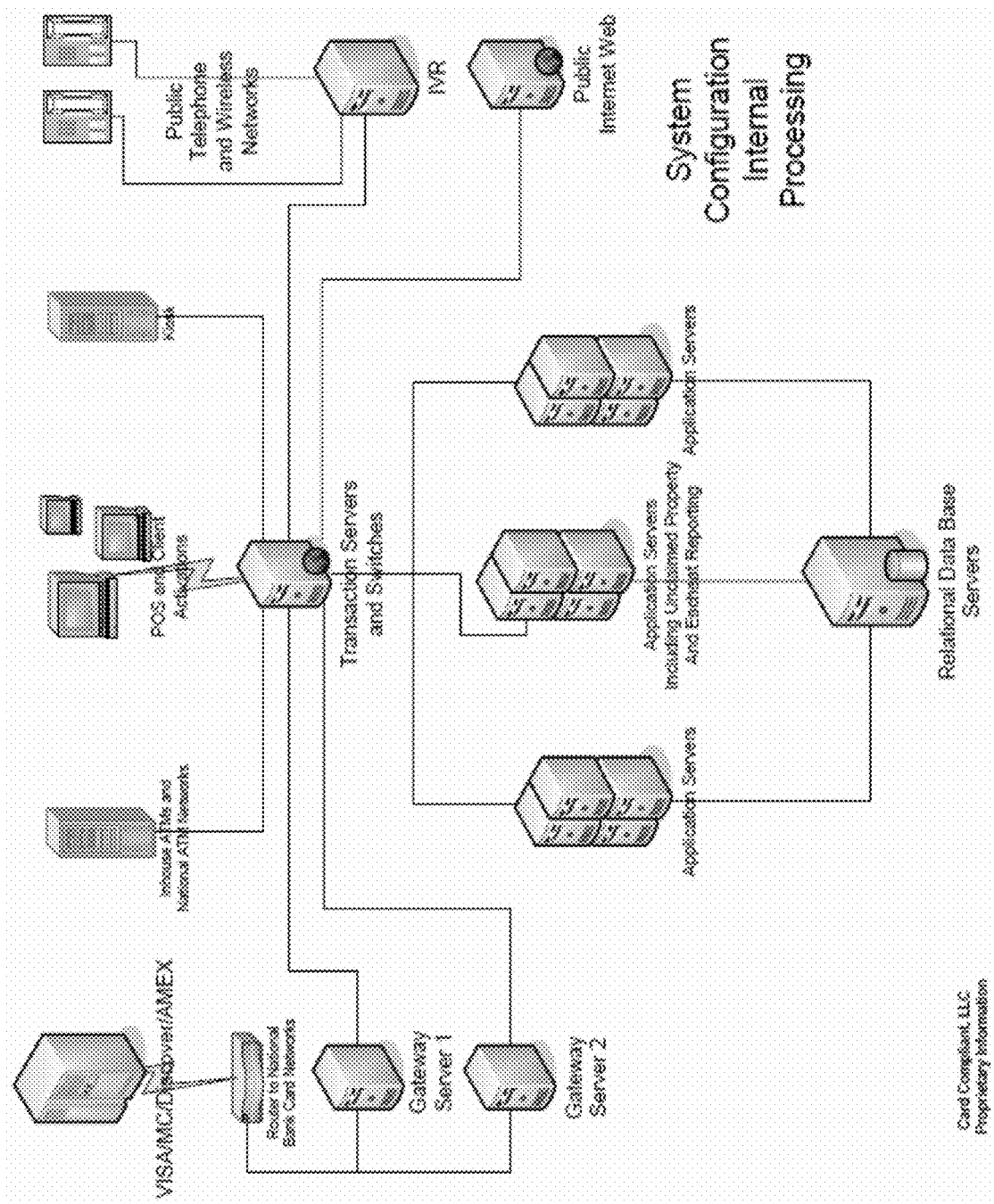
Figure 17 – Real-Time Processing 1

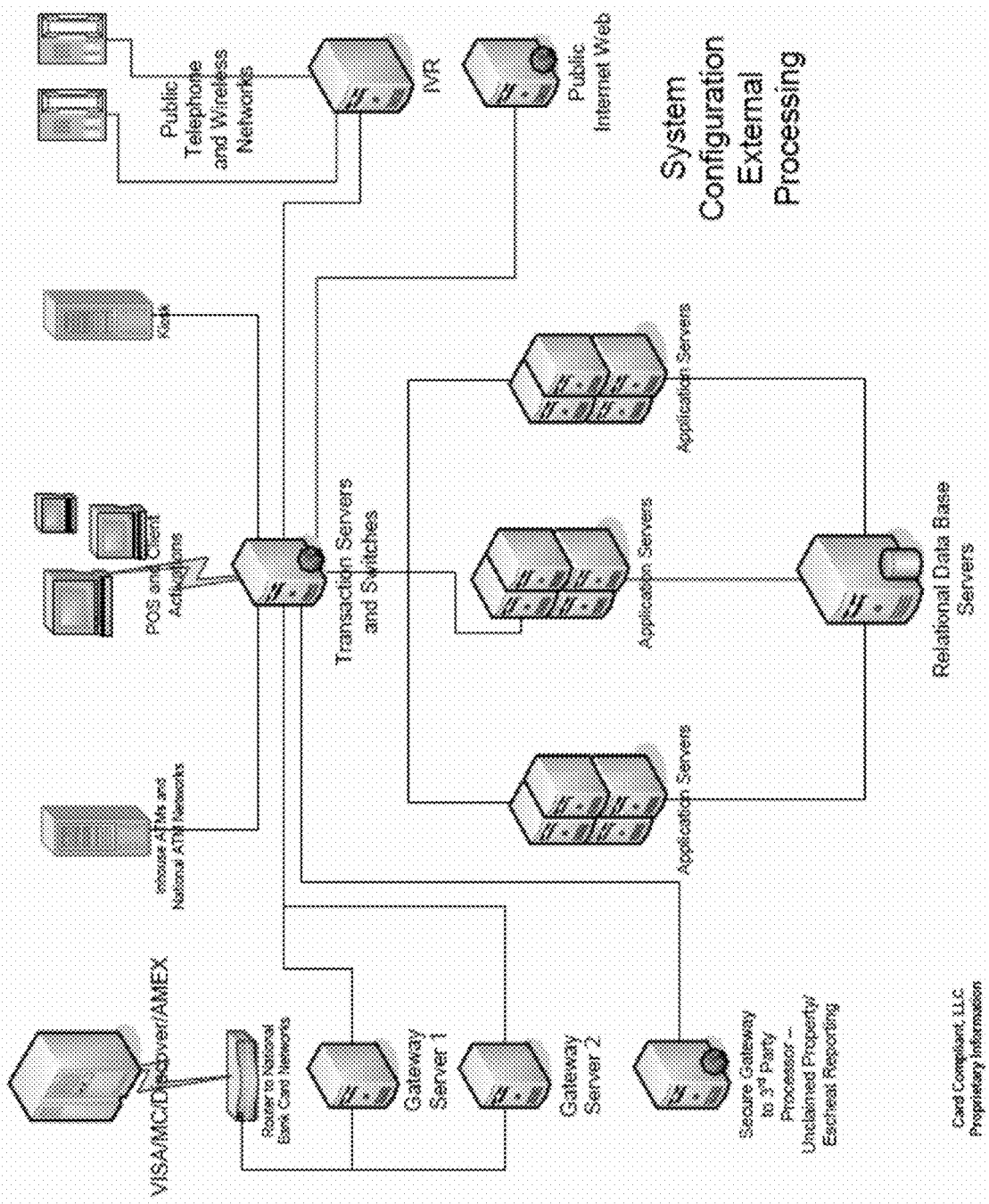
Figure 18 – Real-Time Processing 2

Figure 19a – Issuer Profile – General Tab

Figure 19b – Issuer Profile – General Tab

Billing Information

First Name:
Last Name:
Phone:
Email:
Address:
Address 2:
City:
State: - please select -
Zip:

Technical Information

First Name:
Last Name:
Phone:
Email:

Number of Employees:

1st Contact Info:

Name:
Title:
Address1:
Address2:
Address3:
City:
State: - please select -
Zip:
Country:
Phone:
Fax:
Email:

Figure 19c – Issuer Profile – General Tab

Figure 20a – State Profile – General Tab

Figure 20b – State Profile – Retailer Tab

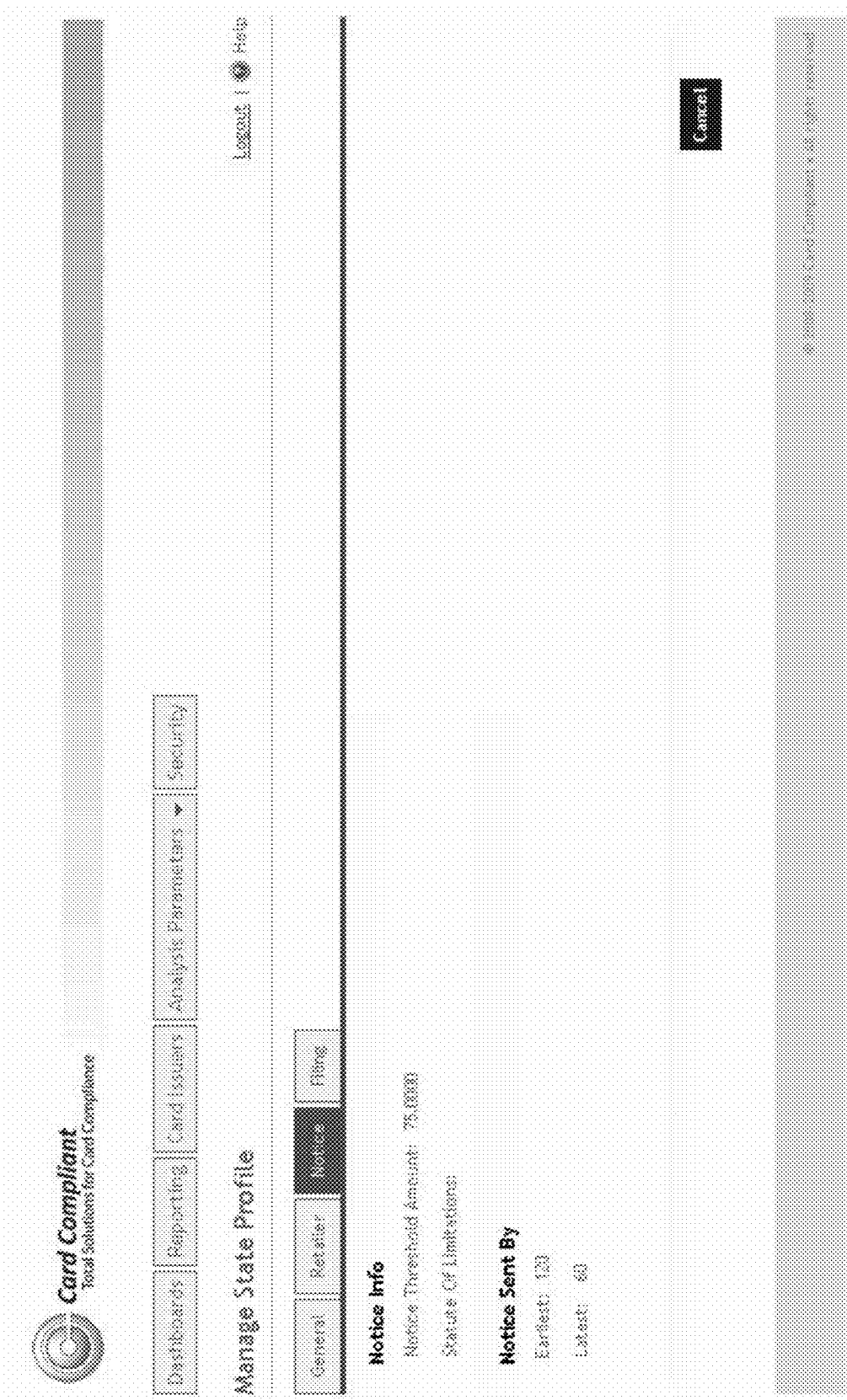
Figure 20c – State Profile – Notice Tab

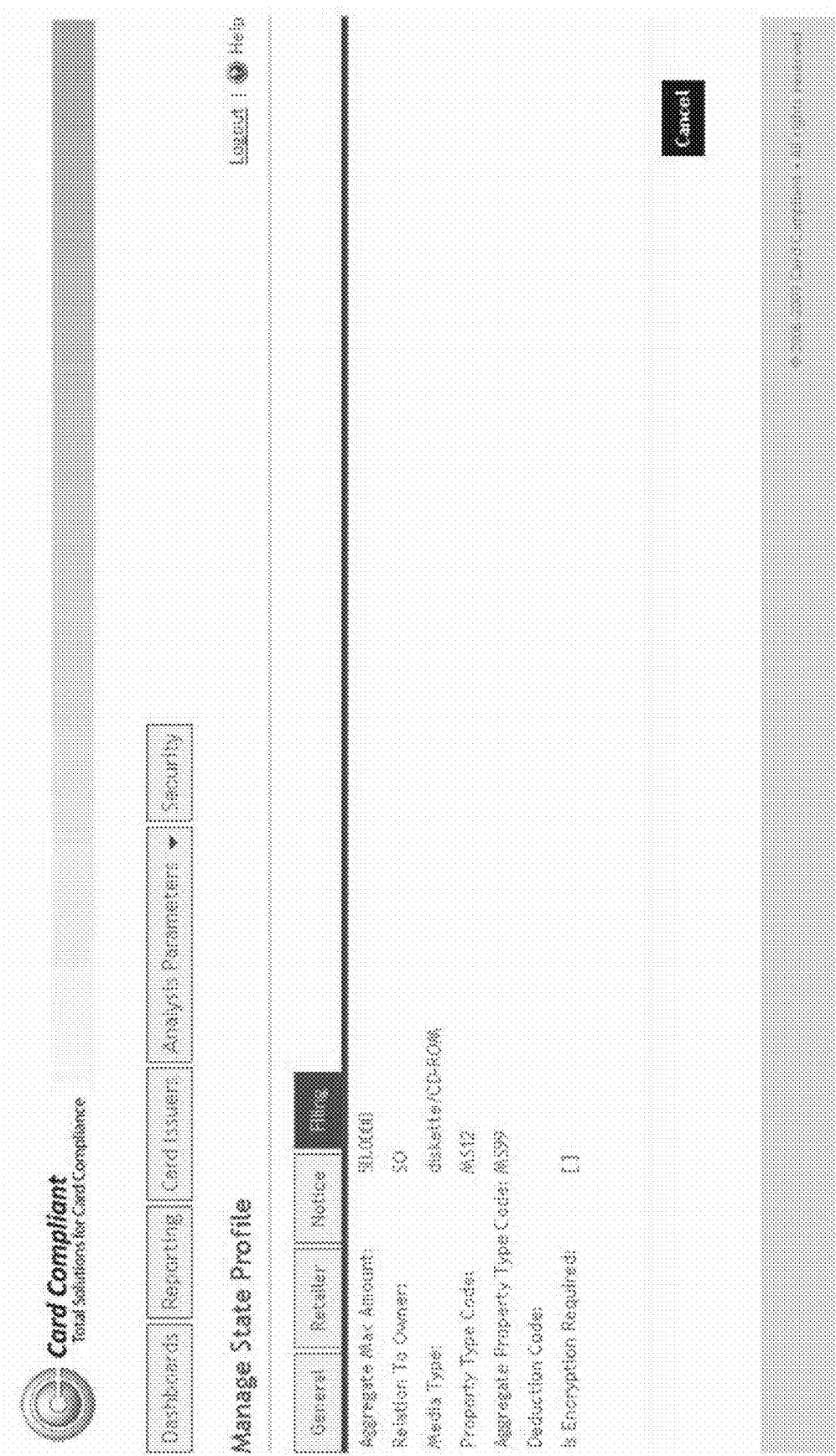
Figure 20d – State Profile – Filing Tab

Figure 21

Figure 22 – Forecast Service/Platform Sample Output

BALANCE BY AGE OF CARD

| Age (months) | Balance Factor |
|---|---|
| 0 | 100.0000% |
| 1 | 79.0824% |
| 2 | 52.1448% |
| 3 | 38.7515% |
| 4 | 30.5556% |
| 5 | 25.3094% |
| 6 | 21.4437% |
| 7 | 18.7074% |
| 8 | 16.3240% |
| 9 | 14.7582% |
| 10 | 13.3801% |
| 11 | 12.2184% |
| 12 | 11.2522% |
| 13 | 10.4642% |
| 14 | 9.7177% |
| 15 | 9.1458% |
| 16 | 8.6046% |
| 17 | 8.1417% |
| 18 | 7.6443% |
| 19 | 7.3320% |
| 20 | 6.9580% |
| 21 | 6.7098% |
| 22 | 6.4045% |
| 23 | 6.1514% |
| 24 | 5.9393% |
| 25 | 5.7957% |
| 26 | 5.6372% |
| 27 | 5.4428% |
| 28 | 5.3148% |
| 29 | 5.2249% |
| 30 | 5.0567% |
| 31 | 4.9878% |
| 32 | 4.8798% |
| 33 | 4.7910% |
| 34 | 4.7380% |
| 35 | 4.6332% |
| 36 | 4.5778% |
| 37 | 4.5552% |
| 38 | 4.4990% |
| 39 | 4.4320% |
| 40 | 4.4063% |
| 41 | 4.3778% |
| 42 | 4.2625% |
| 43 | 4.2553% |
| 44 | 4.2453% |
| 45 | 4.1690% |
| 46 | 4.1544% |
| 47 | 4.1397% |
| 48 | 4.1324% |
| 49 | 4.0901% |
| 50 | 4.0163% |
| 51 | 3.9981% |
| 52 | 3.9798% |
| 53 | 3.9658% |
| 54 | 3.9550% |
| 55 | 3.9488% |
| 56 | 3.8840% |
| 57 | 3.8746% |
| 58 | 3.8600% |
| 59 | 3.8433% |
| 60 | 3.8358% |
| Slope Breakage | 3.7986% |

REDEMPTION RATE
80% of the balance is redeemed in about 7 months

STABILITY TESTING AGE GROUP
Terminal Breakage + 5% is reached in about 16 months

FORECASTING REPORT
1) Arithmetic Breakage and Month
Breakage 3.88%
Month 60

2) Slope-determined Breakage and Month
Breakage 3.81%
Month 67

3) Terminal Breakage
Breakage 3.58%

4) Stability - Drift
Drift Positive
Age Group 16 Months

5) Stability - Consistency
A

Input Date
3/10/2009

Current Date
6/17/2009

Figure 24

Card Compliant
Total Solutions for Card Compliance

| AGC Restaurant 1 | SingleStoreRetailer | File as of Date: 1/28/2009 | File No.: 9 |
| AZ MO | | 1/1/1900 - 1/29/2009 | |
| | Expiration Dates:(False), Fees:(False), Cash Back:(False) | | |

Cash Report

3/20/2009 11:34:32 AM

Subsidiary Account: (AZ)

| | Current Period | Previous Period |
|---|---|---|
| Total Balance at Beginning of Period | $0.00 | -- |
| Plus Sold Amount | $813.00 | |
| Plus Repositioned Amount | $0.00 | -- |
| Less Redemptions Amount | $418.26 | $0.00 |
| Less Repositioned-Out Balance | $0.00 | -- |
| Total Balance at End of Period | $394.74 | $0.00 |
| Amount Slated for Escheat | $8.59 | 2.18 % | | 0.00 % |
| Amount Slated for Non-Escheat | $386.15 | 97.82 % | | 0.00 % |

Subsidiary Account: (MO)

| | Current Period | Previous Period |
|---|---|---|
| Total Balance at Beginning of Period | $0.00 | -- |
| Plus Sold Amount | $227.00 | |
| Plus Repositioned Amount | $0.00 | -- |
| Less Redemptions Amount | $108.38 | $0.00 |
| Less Repositioned-Out Balance | $0.00 | -- |
| Total Balance at End of Period | $118.62 | $0.00 |
| Amount Slated for Escheat | $71.17 | 60.00 % | | 0.00 % |
| Amount Slated for Non-Escheat | $47.45 | 40.00 % | | 0.00 % |

Figure 24a

Cash Report

Subsidiary Account: (AZ)

| | Current Period | | Previous Period | |
|---|---|---|---|---|
| Total Balance at Beginning of Period | $0.00 | | -- | |
| Plus Sold Amount | $813.00 | | -- | |
| Plus Repositioned Amount | $0.00 | | -- | |
| Less Redemptions Amount | $418.26 | | $0.00 | |
| Less Repositioned-Out Balance | $0.00 | | -- | |
| Total Balance at End of Period | $394.74 | | $0.00 | |
| Amount Slated for Escheat | $8.59 | 2.18 % | | 0.00 % |
| Amount Slated for Non-Escheat | $386.15 | 97.82 % | | 0.00 % |

Subsidiary Account: (MO)

| | Current Period | | Previous Period | |
|---|---|---|---|---|
| Total Balance at Beginning of Period | $0.00 | | -- | |
| Plus Sold Amount | $227.00 | | -- | |
| Plus Repositioned Amount | $0.00 | | -- | |
| Less Redemptions Amount | $108.38 | | $0.00 | |
| Less Repositioned-Out Balance | $0.00 | | -- | |
| Total Balance at End of Period | $118.62 | | $0.00 | |
| Amount Slated for Escheat | $71.17 | 60.00 % | | 0.00 % |
| Amount Slated for Non-Escheat | $47.45 | 40.00 % | | 0.00 % |

Figure 24b

Card Compliant
Total Solutions for Card Compliance

3/20/2009 11:34:32 AM

Cash Report

Combined Portfolio:

| | Current Period | | Previous Period | |
|---|---|---|---|---|
| Total Balance at Beginning of Period | $0.00 | | | |
| Plus Sold Amount | $1,040.00 | | | |
| Plus Repositioned Amount | $0.00 | | | |
| Less Redemptions Amount | $526.64 | | $0.00 | |
| Less Repositioned-Out Balance | $0.00 | | | |
| Total Balance at End of Period | $513.36 | | $0.00 | |
| Amount Slated for Escheat | $79.76 | 15.54 % | | 0.00 % |
| Amount Slated for Non-Escheat | $433.60 | 84.46 % | | 0.00 % |

Figure 25

Card Compliant
Total Solutions for Card Compliance

Escheat Payable Due

3/20/2009 11:34:46 AM

AGC Restaurant 1 — SingleStoreRetailer — 1/1/1900 - 1/29/2009 — File as of Date:1/28/2009 | File No.:9
AZ MO — Expiration Dates:(False), Fees:(False), Cash Back:(False)

| Escheat Year | Escheat Due Date | Escheat State | Registered 1st Priority | | Non Registered | | Escheat Total | |
|---|---|---|---|---|---|---|---|---|
| | | | Amount | Cards | Amount | Cards | Amount Forecasted | Cards |
| | 05/01/2011 | ME | $1.80 | 1 | $0.00 | 0 | $1.80 | 1 |
| 2011 Total | | | $1.80 | 1 | $0.00 | 0 | $1.80 | 1 |
| | 11/01/2013 | CO | $0.00 | 0 | $0.00 | 1 | $0.00 | 1 |
| | 11/01/2013 | MO | $0.00 | 0 | $47.32 | 9 | $47.32 | 9 |
| 2013 Total | | | $0.00 | 0 | $47.32 | 10 | $47.32 | 10 |
| | 04/30/2014 | FL | $0.00 | 0 | $0.00 | 1 | $0.00 | 1 |
| | 11/01/2014 | MO | $0.00 | 0 | $24.64 | 3 | $24.64 | 3 |
| 2014 Total | | | | | $24.64 | 4 | $24.64 | 4 |
| | 11/01/2015 | NM | $0.00 | 0 | $6.00 | 1 | $6.00 | 1 |
| 2015 Total | | | | | $6.00 | 1 | $6.00 | 1 |
| Grand Total: | | | $1.80 | 1 | $77.96 | 15 | $79.76 | 16 |

Figure 26

Card Compliant
Total Solutions for Card Compliance

Arizona R5 | AZ | MultiRetailUnaffiliated | 1/1/2006 - 1/1/2009 | File as of Date:6/17/2009 | File No.:1 | 6/17/2009 9:47:40 AM Card Notices Report Expiration Dates:(False), Fees:(False), Cash Back:(False)

| Earliest Date | Latest Date | | |
|---|---|---|---|
| 07/04/2009 | 09/02/2009 | AL | 1 |
| | | | 1 |

| Earliest Date | Latest Date | | |
|---|---|---|---|
| 07/04/2011 | 09/02/2011 | AR | 1 |
| | | | 1 |

| Earliest Date | Latest Date | | |
|---|---|---|---|
| 11/01/2013 | 09/02/2014 | MI | 1 |
| | | | 1 |

Total: 3

Figure 27

Card Compliant
Total Solutions for Card Compliance

Portfolio Positioning Report

3/20/2009 11:34:39 AM

| AGC Restaurant 1 | SingleStoreRetailer | 1/1/1900 - 1/29/2009 | File as of Date:1/28/2009 | File No.9 |
| AZ MO | | Expiration Dates:(False), Fees:(False), Cash Back:(False) | | |

Subsidiary Account: (AZ)

| | Sold this Period | | Repositioned this Period | | Total Portfolio |
|---|---|---|---|---|---|
| Number of Cards | 41 | 100.00 % | 0 | | 41 |
| Sold | $813.00 | 100.00 % | $0.00 | | $813.00 |
| Balance | $394.74 | 100.00 % | $0.00 | | $394.74 |
| Average Sold Amount | $19.00 | | $0.00 | | $19.00 |

Subsidiary Account: (MO)

| | Sold this Period | | Repositioned this Period | | Total Portfolio |
|---|---|---|---|---|---|
| Number of Cards | 11 | 100.00 % | 0 | | 11 |
| Sold | $227.00 | 100.00 % | $0.00 | | $227.00 |
| Balance | $118.62 | 100.00 % | $0.00 | | $118.62 |
| Average Sold Amount | $20.00 | | $0.00 | | $20.00 |

Combined Portfolio:

| | Sold this Period | | Repositioned this Period | | Total Portfolio |
|---|---|---|---|---|---|
| Number of Cards | 52 | 100.00 % | 0 | | 52 |
| Sold | $1,040.00 | 100.00 % | $0.00 | | $1,040.00 |
| Balance | $513.36 | 100.00 % | $0.00 | | $513.36 |
| Average Sold Amount | $20.00 | | $0.00 | | $20.00 |

Figure 28

Card Compliant
Total Solutions for Card Compliance

Aged Escheat Report

3/20/2009 11:34:49 AM

AGC Restaurant 1 — SingleStoreRetailer — File as of Date: 1/28/2009 | File No.: 9
AZ MO — 1/1/1900 - 1/29/2009 — Expiration Dates:(False), Fees:(False), Cash Back:(False)

Subsidiary Account: (AZ)

| | Current Period | Forecasted | Previous Period |
|---|---|---|---|
| Due in 2011 | | $1.80 | $0.00 |
| Due in 2013 | | $0.79 | $0.00 |
| Due in 2014 | | $0.00 | $0.00 |
| Due in 2015 | | $6.00 | $0.00 |
| Total Slated for Escheat: | | $8.59 | $0.00 |

Subsidiary Account: (MO)

| | Current Period | Forecasted | Previous Period |
|---|---|---|---|
| Due in 2013 | | $46.53 | $0.00 |
| Due in 2014 | | $24.64 | $0.00 |
| Total Slated for Escheat: | | $71.17 | $0.00 |

Combined Portfolio:

| | Current Period | Forecasted | Previous Period |
|---|---|---|---|
| Due in 2011 | | $1.80 | $0.00 |
| Due in 2013 | | $47.32 | $0.00 |
| Due in 2014 | | $24.64 | $0.00 |
| Due in 2015 | | $6.00 | $0.00 |
| Total Slated for Escheat: | | $79.76 | $0.00 |

US 10,733,682 B1

METHODS AND SYSTEMS FOR OPTIMIZING ESCHEAT AND DERECOGNITION OF PREPAID CARDS, STORED VALUE CARDS, CREDIT MEMOS AND ELECTRONIC PAYMENT INSTRUMENTS

CROSS-REFERENCE TO RELATED APPLICATIONS

This application is a continuation of U.S. patent application Ser. No. 12/489,373, filed Jun. 22, 2009, now U.S. Pat. No. 8,639,592, which claims the benefit of U.S. Provisional Patent Application Ser. No. 61/074,557, filed Jun. 20, 2008, the entire disclosures of both applications being incorporated herein by reference.

FIELD OF THE INVENTION

The present invention relates to methods, processes, and systems architecture utilized to integrate key attributes of the unclaimed property laws of the states of the United States and other jurisdictions, along with certain generally accepted accounting principles, into a rules-based processing platform that processes, positions, and manages prepaid cards, stored value cards, and other payment instruments with respect to escheat under the unclaimed property laws and derecognition under the accounting standards. A systems architecture platform aggregates transaction data and other information and processes escheat and derecognition for the payment instruments. Each instrument in a portfolio is individually positioned (defined below) and individually repositioned (defined below) into single or multiple footprint systems (defined below) using one or more issuers to achieve optimum compliance with escheat laws while either minimizing or maximizing the breakage (defined below) that is subject to escheat. Each instrument also is individually positioned and individually repositioned with respect to derecognition to optimize compliance with applicable accounting principles while managing the breakage that is not subject to escheat.

BACKGROUND OF THE INVENTION

Each of the states and most territories of the United States and several foreign countries or their sub-jurisdictions have enacted or promulgated unclaimed property laws or regulations that proclaim property to be abandoned after a period of dormancy or inactivity by the owner of the property. These laws require the holder of the abandoned or unclaimed property to return the property to its rightful owner or escheat the property to the treasury of the applicable jurisdiction.

As technology advances, new products will give rise to intangible property rights that are subject to escheat. Therefore, the impact of escheat upon new technologies must be evaluated and compliance implemented as required. This impact is substantial with respect to a group of products recently developed by the financial services, retail, and payment instrument industries. These sectors have created payment instruments that use electronic systems or devices to carry out the payment. Examples of the payment systems or devices are magnetic stripe cards, chip based cards, wireless phone chip devices, and the like. Examples of the payment instruments are prepaid cards, stored value cards, gift cards, credit memo accounts or cards, loyalty or affinity points or cards, rebates, promotional cards, awards or incentive points or cards, health savings account cards, government benefit cards, payroll cards, per diem cards, prepaid minutes from wireline or wireless telephone companies, electronic coupons or certifications, mobile chip payment systems, and the like. Each of these products or services (hereinafter "cards" or "card") creates intangible property rights that may be subject to escheat.

These cards are sold or issued by financial institutions, retailers, third party distributors, and other issuers (hereinafter "issuers" or "issuer") for use by businesses, consumers, or other end-users. The cards usually are sold in a program or portfolio (hereinafter a "portfolio" or "program") through which a particular card is designed, marketed, and distributed for use by targeted end-users. An example is an open-loop Visa rebate card issued by a retailer that may be used by a recipient anywhere that accepts Visa. Another example is a closed-loop gift card issued by a retailer that may be used by the gift recipient only at the issuing retailer. A third example is a payroll card sponsored by a bank that may be used like a debit card. In each portfolio, funds are loaded on or remitted to buy the card by the purchaser, the card may be used by an end-user for its designated purpose, and the card is honored by the issuer upon use.

These cards are marketed and used throughout interstate commerce. As a result, they give rise to unclaimed property issues that cut across jurisdictional lines. The cards may be sold by an issuer incorporated in one state with its principal place of business in another state. They may be sold from outlets in multiple states to buyers residing in varying states. The buyers may retain the cards, or gift or give them to recipients or end-users located in varying states. The buyers, recipients, and end-users may use the items in other states. If reloadable, the cards may be reloaded in varying states. These states may shift, from time to time, as the locations of buyers, end-users, or issuers move. Therefore, as the cards become inactive or dormant over time, the cards may become subject to the escheat laws of several different jurisdictions.

Determining which jurisdiction's escheat laws may apply to cards and instruments has substantial economic impact upon the issuers of the items. When a card is not used or redeemed by an owner (sometimes called "breakage"), the issuer holding the obligation to honor the card must determine the escheat status of the item by evaluating the escheat laws of numerous jurisdictions in light of varying applicable factual scenarios. In some jurisdictions, the issuer may be permitted to retain all or a portion of this breakage. In other jurisdictions, a completely different result may apply. Furthermore, the issuer's objectives may vary. Some may wish to minimize escheat, while others may desire to maximize escheat in certain circumstances (for example to take advantage of the statutory release of the issuer's liability to the end-user of an inactive instrument or card).[1]

[1] The breakage in a portfolio gives rise to revenue generating opportunities for an issuer. It creates float or cash flow. It may be harvested by fees or expiration dates if permitted by law. And it may be subject to derecognition (described below) with attendant income or earnings. Escheat bars or limits these opportunities in that breakage is remitted to a jurisdiction upon escheat.

Determining which jurisdiction's escheat laws may apply to cards also has substantial impact upon the end-users of the items. When escheat is required and carried out by an issuer, the escheat process likely will be a materially adverse and invasive event for the end-user. Upon escheat, the issuer's obligation to honor the card will be released, and the ability of the end-user to use the card, as intended and expected, will end. The end-user will be required to locate the card where it was escheated, and engage in a cumbersome process of reclaiming the item. These problems are pronounced for many of the card types listed above. The items usually are small dollar items rendering the reclamation unattractive, and the card owners may be anonymous making reclamation difficult to process.[2]

[2] Determination of which jurisdiction's escheat laws may apply to a program also may have substantial impact upon the features of a program. Many programs are designed so that the cards do not expire, and an issuer may promote a "no expiration" feature as a favorable attribute of a program. While escheat is not an expiration date, it may have a similar impact upon a card when the card is shut down upon escheat.

The standards applied in unclaimed property laws for cards have a correlation to certain generally accepted accounting principles. The escheat laws of several jurisdictions require intangible property to be escheated when abandoned or unclaimed. Payment cards are items of intangible property that may be subject to such escheat. For the purpose of accounting, the cards consist of an asset on the owner's books and a payable on the issuer's books. Under accounting principles, an issuer may write-off an aging card payable when the likelihood of the card being used becomes "remote." This practice is known as "derecognizing" the payable, and the corresponding bookkeeping entry usually results in income to the issuer.[3] The "remote use" standard used in accounting for derecognizing cards is similar to the "abandoned or unclaimed" standard used under escheat laws. The resultant interplay between the two standards has substantial economic effect. If a "remote use" card is also an "abandoned or unclaimed" card, an issuer may not be able to derecognize the payable. Instead, the issuer may be required to escheat the card to an applicable state.

[3] As used herein, the phrase "derecognition" refers to the accounting practice of writing-off a liability or payable with the corresponding accounting entry resulting in income.

Determining which jurisdiction's unclaimed property laws may apply, and correctly applying that jurisdiction's laws after such determination, is a difficult task for issuers of cards. The escheat statutes vary from state to state, and country to country, on numerous relevant subjects. The priorities among competing jurisdictions are subject to rules, and these rules themselves vary from state to state. These laws are not static but are amended over time. In addition, the application of the laws is fact dependent and varies upon certain facts, including the type of issuer, type of card, facts specific to a portfolio, facts regarding the owners, and facts specific to a particular card. These facts are not static but change over time. Therefore, it would be beneficial to provide a system, process, and method under which an issuer may process the large numbers of applicable legal and factual escheat variables to determine and manage the escheat of the cards in a portfolio and seamlessly adjust and manage escheat as the laws and facts change over time.[4]

[4] A rules-based systems processing platform would preferably determine, on any given date, if the cards are required to escheat. For cards slated to escheat, the systems platform also would track, ascertain, and manage all pertinent escheat events and attributes regarding the cards, including, among others, determination of the jurisdiction of escheat, the presumed abandonment date, the duty to provide a pre-escheat notice, the date for the pre-escheat notice, the date for filing with the jurisdiction, the amount subject to escheat, the statute of limitation for card owner claims, the statute of limitation for escheat jurisdiction claims, and the archive requirements.

The legal and factual variables impacting the escheat status of a card are highly specific to each individual item. For example, the escheat status of cards issued to end-users located in the same state may vary. Similarly, cards issued by issuers located in the same state may vary as to escheat. Even the cards sold in the same state may vary. Furthermore, changes that will impact the escheat status of the cards over time are not uniform to a portfolio or to any particular state. Many changes impacting escheat are specific to a single card. Therefore, it would be beneficial to provide a system, process, and method under which the escheat status, attributes, and events regarding each individual card in a portfolio are processed, determined, and managed on a per-item basis (hereinafter "individually positioned") and seamlessly processed, reset, and managed over time on a per-item basis as the laws and facts change (hereinafter "individually repositioned").[5]

[5] A rules-based systems processing platform preferably would determine on a per card basis, on any given date, if cards are required to escheat. For cards slated to escheat, the systems platform preferably would track, ascertain, and manage all pertinent escheat events and attributes on a per card basis. As the card ages, the systems platform would adjust the escheat status and management for the card to optimize compliance on a per card basis. The systems platform preferably would track the escheat attributes of the card over time, ascertain applicable escheat events, and manage or direct the management of the card upon the escheat events.

Some issuers elect to design solutions to manage the escheat of cards. Some design the payment instrument itself to minimize or maximize the amount required to escheat. Others reorganize their company structure to minimize or maximize breakage by trying to take advantage of the escheat laws of the issuer's domiciliary state.[6] While these types of solutions may benefit an issuer, they typically will use techniques based upon portfolio-wide averaging, coupled with efforts to achieve a desired result on average (i.e., hit the mean) or an outcome that will most often occur (i.e., hit the mode). The use of means or modes to address the interplay of multiple escheat laws with multiple factual scenarios is helpful, but it will not achieve an exact result for the portfolio or the best result for the individual items residing on one side or the other of the targeted mean or mode. And, given the number of escheat variables in question, an escheat solution may have unclear or unintended consequences unless the impact of a solution is determined on a per card basis.

[6] For example, an issuer may relocate to, or incorporate a subsidiary issuer company in, a jurisdiction that has favorable escheat laws, and issue the cards or instruments from that state. The Supreme Court has recognized that a company may select a state of incorporation by reference to which state's laws are more attractive on the subject of escheat. See, *Delaware v. New York*, 507 US 490, 507 (1993).

Furthermore, when a card program is designed, several non-escheat related features of the card program will impact the escheat of the cards in the program. Examples of such features are fees, expiration dates, capped loads, pre-activated card amounts, cash back, use of open-loop versus closed-loop systems, the scope of partially open-loop systems, and the like. In addition, the design and selection of certain distribution methods for the cards, such as Internet sales or third party distribution channels, may impact the escheat profile of a portfolio. The current techniques used to assess the impact of features and methods upon escheat typically use techniques based upon portfolio averages and targeted means and modes. The impact of features and methods upon escheat can be more accurately assessed, however, if the impact upon each card is determined on an individual basis. Therefore, it would be beneficial to provide a system, process, and method under which each card in a portfolio is individually positioned with its escheat status, on any given date, to assess the impact of program designs, escheat solutions, program features, and distribution methods upon the escheat of the cards within the portfolio.[7]

[7] A rules-based systems processing platform preferably would determine, on any give date, the exact escheat profile of a portfolio by reference to the individual escheat status of each card in the portfolio. The settings for the platform preferably would be subject to adjustment to permit its use to perform "what-if" and other diagnostic runs to determine the escheat impact of various program designs, escheat solutions, program features, or distribution methods.

If a card is not subject to escheat, the payable underlying the card may be subject to derecognition by the issuer with attendant income or earnings. The derecognition of cards is subject to accounting standards under which the cards are derecognized when their likelihood of being used becomes remote. Under current practices, an issuer typically will use an accounting method that derecognizes card payables on a portfolio-wide basis as opposed to a per-item basis. The ability to derecognize payables on a per-item basis may be preferable, however, for a particular portfolio. In addition, when a portfolio-wide method is used, the issuer may desire to reconcile its portfolio-wide method with the individual items in the portfolio. In addition, depending upon the accounting method used to derecognize the payables, an issuer may desire to track, ascertain, and manage derecognition on a per-item basis, so that each card is seamlessly derecognized over time pursuant to a specified accounting method and supporting statistical methodology. Therefore, it would be beneficial to provide a system, process, and method under which each card in a portfolio is individually positioned with respect to derecognition at the time a card is sold and individually repositioned with such status on a seamless per-item basis over time and as the facts change.[8]

[8] Various accounting methods are available for derecognizing card payables. Depending upon the method, the amount that may be derecognized, along with the timing of derecognition, likely must be supported by a valid statistical model. A rules-based systems processing platform preferably would apply the accounting method specified by the issuer for derecognition, use the transaction data for the program to statistically support and apply the accounting method, and direct and manage the derecognition of the portfolio on an individual card basis as each card ages.

To properly assess the economic impact of the cards positioned for escheat or derecognition, the number and balances of such items on any given date should be discounted to reflect the impact of redemptions arising from use of the cards by end-users prior to future escheat or derecognition dates. At the time a card is sold, the escheat or derecognition of the card will be future events, and they will remain future events as the card ages until they occur. Therefore, to assess the present economic impact, on any given date, of the future escheat or derecognition of cards, the balances of the cards slated for future escheat or derecognition should be discounted to reflect the likelihood that they will be redeemed before escheat or derecognition occurs. The adjusted balances of the cards after discounting for likely redemptions (hereinafter the "redemption discounted balances") will provide the issuer, on any given date, with a more accurate economic view of the escheat and derecognition profile of a portfolio. Therefore, it would be beneficial to provide a system, process, and method under which a portfolio, or any segment thereof, will be discounted to reflect the impact of future redemptions upon the items positioned for escheat or derecognition and to provide the redemption discounted balances for the portfolio or any segment thereof.[9]

[9] A rules-based systems processing platform preferably would use the transaction data from the program to statistically set redemption factors for the program and use the factors to calculate the redemption discounted values for the portfolio. The redemption discounted balances will provide valuable economic information to an issuer with respect to assessing future breakage income, managing cash flows to meet escheat needs, and in managing revenue generating opportunities concerning breakage.

Furthermore, redemption rates likely will vary among the types of cards comprising a portfolio. Therefore, a determination of the redemption discounted balance of a portfolio, or any segment thereof, will depend upon the nature of the individual cards comprising the portfolio or segment. In turn, the redemption discounted balances of the individual cards within a portfolio or segment likely will depend upon individual characteristics that are specific to each individual card, such as its age, its balance, its issuing sector, and the like. In addition, these individual characteristics for each card will not be static but likely will change over time. For example, a card will have one redemption rate on the date it is sold but a completely different redemption rate four years later. Therefore, it would be beneficial to provide a system, process, and method under which each card within a portfolio is individually positioned with its redemption discounted balance at the time of sale and individually repositioned with its redemption discounted balance on a seamless per-item basis as the card ages and as the facts change over time.[10]

[10] A rules-based systems processing platform preferably would use the transaction data to set redemption factors and apply the factors to each card in a portfolio on an individual pre card basis to set the redemption discounted balance of the card on a given date and to adjust the redemption discounted balance of the card as its ages. This method and process enables the redemption discounted balance to be efficiently determined for any segment of a portfolio by reference to the aggregated values of the cards in the segment.

Furthermore, current methods used by an issuer to calculate the redemption rate and the concomitant breakage rate for a portfolio, or any segment thereof, typically require the issuer to conduct a mathematical or statistical analysis of the portfolio or applicable segment to determine its redemption and breakage rates. When a portfolio is administered in an operational setting, however, the portfolio typically will be segmented into subsets for many purposes for analysis or operations. For example, the historical numbers for a portfolio typically will be separated and presented by year, such as by cards sold in particular years. They also may be separated by geographic location, such as by state. They also may be segmented by distribution method, such as Internet versus brick-and-mortar. They typically will be separated by combinations of the above along with other characteristics or factors. In addition, the splitting of a portfolio by an issuer into subsets for analysis or operations typically will reoccur over time. For example, the numbers for a portfolio may be separated into subsets and presented in regular monthly, quarterly, or yearly statements or reports. Or the splitting of a portfolio into subsets may be required for a special project as of a specified date.

The current practice of determining redemption and breakage rates by performing a mathematical or statistical analysis of a portfolio, or a specified segment thereof, is not practical for payment cards under these circumstances. A system, however, that individually positions each card with its individual redemption rate, breakage rate, and redemption discounted balance and then aggregates the individual rates and balances for specified subsets of a portfolio would enable the redemption rate, breakage rate and redemption discounted balance for any specified subset of a portfolio to be determined and reported on an efficient basis without resort to multiple or repeated mathematical or statistical analyses. This "bottom-up" system would permit redemption and breakage rates, along with discounted redemption balances, to be reported for multiple specified subsets of cards within a portfolio as of any given date.[11] For example, the breakage rate and redemption discounted balance of the cards sold in 2003 could be determined as of any given date. As another example, the breakage rate and redemption discounted balances of the group of cards required to be escheated to Missouri in 2014 could be determined. Therefore, it would be beneficial to provide a system, process, and method under which the redemption rates and redemption discounted balances of the cards in a portfolio are individually determined and then aggregated by reference to specified segments of a card portfolio.

[11] The process and method preferably would determine the redemption rate and breakage rate from the data for a portfolio as a whole, and then individually position each card with its specific redemption rate and breakage rate and adjust those rates for each specific card over time. When the redemption discounted balance is required for any subset or segment of a portfolio, the individual rates for the cards in the subset or segment are aggregated and reported. This bottom up approach is more efficient than the current practice of statistically or mathematically analyzing each subset of a portfolio. It also provides a more statistically sound approach to setting breakage rates and redemption discounted balances of small segments or subsets of a portfolio.

The determination and positioning of the escheat status, derecognition status, redemption rate, breakage rate, and redemption discounted balance for the individual cards in a portfolio will have a substantial economic impact upon the portfolio. As a result, these metrics should be determined on a real-time or near real-time basis at or about the time when the items are sold and should be individually repositioned on a real-time or near real-time basis over time at or about the time when facts and laws change. Therefore, it would be beneficial to provide a system, process, and method under which the escheat status and derecognition status, along with the redemption discounted values, of the cards in a portfolio are individually positioned and individually repositioned on a real-time or near real-time basis.[12]

[12] A rules-based systems processing platform preferably would aggregate and filter applicable transaction data on a real-time or near real-time basis specified by an issuer, and would set and reset the escheat and derecognition status and redemption adjusted balance of each card on an individual basis as the card ages.

The current models for issuing payment instruments should be classified as "single footprint systems" because they are capable of using only one issuer for each portfolio thereby confining the issuer and end-users to the positives of a single issuer state's laws while also exposing the issuers and end-users to the negatives of that state's laws. This limitation could be managed if the cards in the portfolio are seamlessly issued by multiple companies domiciled in multiple states (hereinafter the "multiple footprint system").[13] A multiple footprint system would allow the flexible use of differing combinations of multiple companies to issue cards within a single portfolio. Combinations would include a parent and subsidiary, multiple subsidiaries, one or more independent companies, and the like. Therefore, it would be beneficial to provide a system, process, and method under which a multiple footprint system may be used to issue the cards of a single portfolio.

[13] As one of many legal variables affecting escheat, the unclaimed property laws of the domiciliary state of the card issuer, in certain circumstances, may govern and impact the escheat of the cards. Each card issuer will have one domicile located in a single state. Therefore, the use of a single footprint system restricts the management of this legal variable to one issuing state's laws. In a single footprint system, there will be only one issuing state, one domicile for that state, and, thus, only one applicable issuing state's laws. A multiple footprint system uses more than one issuer to issue the cards of a portfolio. Therefore, a portfolio manager may take advantage of more than one set of issuing states' unclaimed property laws.

Furthermore, an issuer may desire to retain one segment of a portfolio while selling or transferring another segment of the same portfolio to one or more other issuers. Transfers of a segment of a portfolio among multiple issuers are difficult, if not impossible, to implement in a single footprint system because the cards cannot be readily repositioned for issuance by multiple issuers. The splitting of a portfolio, however, among one or more issuers (hereinafter "split issuance") will be possible, however, in a multiple footprint system. Therefore, it would be beneficial to provide a system, process, and method under which the cards in a portfolio will be processed and subject to split issuance by multiple issuers in a multiple footprint system.

Furthermore, the multiple issuers in a split issuance system may desire to split the cards among the issuers based upon the escheat status or derecognition status of the cards in the portfolio, so that cards with a specified status are issued by one issuer and the cards with another status are issued by the other issuer. The issuers may desire to implement these splits at regular intervals or on designated timetables as the cards and instruments are sold to buyers or age over time. This method also would enable an issuer to classify the cards in a program by reference to the quality of their escheat status or derecognition status so that an issuer may retain one or more classes of cards while selling or transferring other classes of cards for issuance by another issuer. Therefore, it would be beneficial to provide a system, process, and method under which the cards in a portfolio will be classified on an individual per card basis by reference to the escheat status or derecognition status of the cards and allocated by class among multiple issuers in a split issuance system at designated intervals or at specified times.

Furthermore, when a multiple footprint system is used for a portfolio, each card in the portfolio must be placed in the correct footprint at the correct time so that it is issued by the correct issuer of the proper footprint at the desired time. In addition, the class or status of a card may change over time or upon changes in law or facts, and an issuer may desire to reposition a card among the footprints of the multiple footprint system to reflect the change. Therefore, it would be beneficial to provide a system, process, and method under which the individual positioning method is used to individually position and populate each individual card with the proper issuer and footprint of a multiple footprint system and to individually reposition each card among the multiple footprints and issuers on a seamless basis as the card ages or the laws and facts change over time.[14]

[14] With respect to multiple footprint systems, a rules-based systems processing platform preferably would determine the status of each individual card and would allocate and populate the footprints of the multiple footprint system. In its diagnostic mode, the systems platform preferably would determine the impact of various combinations of footprints upon the escheat and derecognition profiles of a portfolio. In its operation mode, it preferably would triage the cards as sold and allocate and populate each footprint with a correct and optimized set of cards. In its classification mode, it preferably would classify the cards in a portfolio by specified escheat status or derecognition status and split the portfolio pursuant into the specified classes.

Furthermore, when a multiple footprint model is used, an issuer may desire to individually position the cards into the footprints on a real-time or near real-time basis at specified times which may be the dates the cards are sold to buyers or other dates when the portfolio is transferred or split. Real-time or near real-time positioning in multiple footprint systems assures that each issuer in each footprint will be the holder of the card obligation from and after the specified time. It also helps in managing escheat issues arising from delayed positioning. Additionally, it assures that the cards specified for the multiple footprints are accurately and timely allocated among the footprints. Therefore, it would be beneficial to provide a system, process, and method that individually positions cards among the multiple issuers of a multiple footprint system on a real-time or near real-time basis when and as the products are sold to buyers or at other specified times.[15]

[15] The systems platform preferably would manage the multiple footprint system in real-time or near real-time at or about the time cards are sold or used, would reposition and reclassify the cards as they age over time, and would reallocate and populate the footprints of the multiple footprint systems upon repositioning.

Furthermore, the approaches taken by issuers to escheat compliance are not uniform but differ from issuer to issuer. The current methods used by issuers to assess the risk of their decisions concerning escheat compliance typically use estimates based upon portfolio averages, means and modes. In addition, many issuers require their outside law firms or accounting firms to provide opinion letters supporting the issuers' methods for handling the escheat and derecognition of cards. The current methods used to provide opinion letters typically use estimates based upon portfolio averages, means and modes. An assessment of the compliance related risks arising from an issuer's compliance decisions will be made more efficient and accurate if a portfolio can segmented into subsets for the purpose of isolating the risk of a particular decision on an exact or near-exact basis by individually positioning the cards with the subset by each card's escheat status. Similarly, the process of seeking and providing opinion letters would be made more efficient and accurate. Therefore, it would be beneficial to provide a system, process, and method under which the cards in a portfolio are individually positioned by their escheat status into specified subsets for the purpose of risk assessment and opinion letters.

Furthermore, when a multiple footprint system is used, the cards in a portfolio will be issued by multiple issuers. The buyers or other end-users of these cards may desire, from time to time, to ascertain the identity of the issuer of a particular item. Therefore, it would be beneficial to provide a system, process, and method under which a buyer or end-user may be able to ascertain the identity of the issuer of a particular card owned by the buyer or end-user.

The escheat of cards will materially alter the usual course of conduct of the issuer and end-user regarding the use of the items. Ordinarily, when an item is used by an end-user, the end-user will present the item for redemption to an entity such as a retailer. If properly presented, the card will be authorized for acceptance by the retailer and honored by the issuer through a settlement payment process. Transaction processors electronically activate cards when sold, authorize cards for use at retailers when presented for redemption, and settle the payment by the issuer to the retailer after a card is redeemed. When the item is escheated, however, this orderly process will cease. The issuer will be required to escheat the card to an applicable jurisdiction. At that time, the issuer's obligation to honor the card will be released. The ability of an end-user to use the card will cease and will be declined upon presentation, leaving the end-user to locate and reclaim the card from the state of escheat.

The current system of reclaiming escheated cards is burdensome and is not cost effective for low dollar value or anonymous cards. Therefore, it would be beneficial to provide an automated system, process, and method under which an issuer may seamlessly honor an escheated card upon presentment by an end-user and seek reimbursement from the state regarding the escheated item. In the alternative, it would be beneficial to provide an automated system, process, and method under which the data for the escheated cards are managed for the jurisdictions for efficient processing of reclamation in a manner consistent with the current transaction processing systems used to process the cards prior to escheat.

When cards are escheated, the issuer is required to file a report with the jurisdiction of escheat and likely will be required to transmit certain information and data concerning the escheated cards to the jurisdiction of escheat. With respect to some filings, an issuer will be required to provide specific data on the cards escheated to the jurisdiction. Other filings, however, will be made in the "aggregate" without supplying specific data for the escheated cards. When the information is escheated in the aggregate, the jurisdiction will not have sufficient information to process a reclamation claim. Furthermore, for security purposes, certain issuers may desire not to transmit card numbers and other security sensitive information to the state upon escheat. Therefore, it would be beneficial to provide a system, process, and method under which information retained by the issuer upon escheat, including the information retained for security reasons and data retained with respect to aggregated filings, may be accessed by the state or card owner for the purpose of processing of a claim made by a card owner with the escheat jurisdiction for return of an escheated card.

As the cards are purchased and used by end-users, the resultant card transactions likely will be electronically processed by a transaction processor. The transaction processor may be the issuer but likely will be a third party processor. The transaction processor's data likely will be considered the "data of record" for a program or portfolio. This transaction data, along with other information from the issuers, will be required to perform the various processes, systems and methods described herein. In addition, it is desirable that the issuer's accounting books regarding escheat and derecognition transactions tie to the transaction processor's data of record.[16] Therefore, it would be beneficial to provide a system, process, and method under which the transaction data and other pertinent information is aggregated through one or more gateways from multiple sources, including issuers and transaction processors, for the performance of the processes and methods described herein and for the purpose of enabling an issuer to tie its accounting books with the transaction processor's data of record with respect to escheat and derecognition related transactions.

[16] With respect to derecognition of cards, under current practices, the transaction processor's "data of record" cannot record the derecognition of a card, because the card must remain live on the processor's records in the event it is used after derecognition. Similarly, if an issuer desires to honor an escheated card when used after escheat, the escheated card must remain live on the processor's data of record. It would be desirable to enable an issuer to reconcile and tie the transaction processors data of record for a program with the issuer's books with respect to escheat and derecognition transactions.

Given the nature of the card programs and portfolios, the issuers likely will sell and issue millions of small dollar items for use by millions of customers throughout a wide variety of jurisdictions resulting in the creation, maintenance, and processing of millions of small dollar payables with varying escheat characteristics, derecognition attributes, breakage rates, and redemption discounted values, all of which may change over time. The proper and timely processing of such large volumes of items, transactions, and variables would be benefited by an automated process. Therefore, it would be beneficial to provide a system, process, and method under which the various processes, systems and methods described herein are implemented on an automated basis across multi-jurisdiction portfolios with large numbers of accounts.

SUMMARY OF THE INVENTION

The instant invention includes processes, methods, and systems architecture for integrating the key requirements of the unclaimed property laws of the states and territories of the United States and other jurisdictions, along with certain generally accepted accounting principles, into a systems processing platform that may be used to optimize compliance by an issuer of payment cards with the escheat laws and accounting principles while either maximizing or minimizing the cards an issuer is required to escheat or is permitted to derecognize. Embodiments of the instant invention include all aspects of data collection and reformatting, system hardware and software architecture, methods for processing legal rules, methods for processing the accounting rules, methods for redemption discounting, data storage methods, reporting methods, and operational processing methods required to fulfill the issuer's regulatory obligation to escheat the cards as required, to fulfill the issuer's ability to derecognize the cards in the event they are not subject to escheat, and to manage all aspects of the escheat and derecognition processes.

The methods, processes, and systems architecture of the instant invention specifically address the processing of the escheat or derecognition of payment instruments issued by the financial services, retail, and payment instrument industries, including payment instruments which use magnetic stripes, bar codes, chips, or other electronic or computer methods to carry out payment obligations. Examples of such payment instruments are prepaid cards, stored value cards, gift cards, credit memo accounts or cards, loyalty or affinity points or cards, rebates, promotional cards, awards or incentive points or cards, health savings account cards, government benefit cards, payroll cards, per diem cards, prepaid minutes from wireline or wireless telephone companies, electronic coupons or certifications, mobile chip payment systems, and the like.

A preferred embodiment of the instant invention uses a systems processing platform that enables each card in a portfolio to be analyzed on an individual per card basis with respect to numerous factual variables, legal variables, and issuer directives and individually positioned and managed on a per card basis for either the minimization or maximization of the cards subject to escheat or available for derecognition. The systems processing platform uses an individual positioning method under which cards are analyzed and individually positioned on an exact per-card basis versus a portfolio-wide average and estimated basis, resulting in either the minimization or maximization of the cards escheated or derecognized by the issuer. The instant invention enables portfolios to be managed on an exact per card basis, and enables a portfolio to be split into segments for issuance, operations, analysis, classification, risk assessment, legal or accounting opinions, and the like. Preferred embodiments of the instant invention uses a real-time or near-real time method enabling an issuer to analyze and manage escheat and derecognition on a real time basis in advance of derecognition or escheat.

A preferred embodiment of the instant invention includes the "individual positioning method" of using an automated process and system to individually position and/or individually reposition each card in a portfolio on a real-time or near real-time basis to track, ascertain, and manage a regulatory or rules driven status for each individual card or instrument on a per card basis. The individual positioning method may be used to determine the status of each individual card with respect to regulations and rules governing payment cards. In a preferred embodiment, the individual positioning method is used to individually position the escheat status, derecognition status, redemption rate, breakage rate and/or the redemption discounted value of each individual card as of a specific date. In another embodiment, the individual positioning method is used to individually position the status of each card with respect to compliance with consumer protection and other laws regulating fees, expiration dates, cash back, reloads, and the like. Preferably, the individual repositioning method is used to automatically and seamlessly reset and manage the status of each card in either embodiment as a card ages and as laws or facts change over time.

A preferred embodiment of the instant invention includes the use of the "individual positioning method" for the specific purpose of processing, determining, and managing the escheat status of each card, along with pertinent escheat attributes and events regarding each card, on an automated per card basis. In a preferred embodiment, a systems platform determines if a card is slated for future escheat to a particular jurisdiction. If a card is slated for future escheat, the systems platform tracks, ascertains, and manages various escheat attributes and events regarding the card including, among others, the jurisdiction of escheat, the presumed abandonment date, the duty to send a pre-escheat notice, the date of a pre-escheat notice, the date of an escheat filing with the jurisdiction, the escheat amount, the jurisdiction's escheat filing fields, the jurisdiction's escheat data format, the jurisdiction's escheat filing media, the statute of limitations for card owner claims, the statute of limitations for escheat jurisdiction claims, and applicable archive requirements. The individual positioning method preferably is used to determine and manage the escheat status, events, and attributes for each individual card on a specific date. The individual repositioning method preferably is used to automatically and seamlessly reset, determine, and manage the escheat status and related attributes and events for each individual card as the card ages and as laws or facts change over time.

A preferred embodiment of the instant invention includes the use of the "individual positioning method" for the specific purpose of processing, determining, and managing the derecognition of each card on an automated per card basis. In a preferred embodiment, a systems platform determines if a card is eligible for future derecognition. If a card is eligible for future derecognition, the systems platform tracks, ascertains, and manages various derecognition attributes and events regarding the card including, among others, the amount that is subject to derecognition, the timing of derecognition, and the reconciliation of the derecognition method on a per card basis. The individual positioning method preferably is used to determine and manage the derecognition status, events, and attributes for each individual card on a specific date. The individual repositioning method preferably is used to automatically and seamlessly reset, determine, and manage the derecognition status and related attributes and events for each individual card as the card ages and as laws or facts change over time.

A preferred embodiment of the instant invention includes the "redemption discounted balance method" of using an automated system to implement an individual positioning process for the specific purpose of determining the redemption discounted balance of each card in a portfolio on a per card basis. In a preferred embodiment, this method is used to determine the redemption discounted balance for each card slated for future escheat and for each card eligible for future derecognition. The individual positioning method preferably is used to determine the discounted redemption balance of each individual card on a specified date. The individual repositioning method preferably is used to automatically and seamlessly recalculate the discounted redemption balance of each individual item as the card ages and as laws or facts change over time.

A preferred embodiment of the instant invention includes the "aggregated individual breakage rate method" of using an automated system to implement an individual positioning process for the purpose of determining the redemption rate and breakage rate of each card in a portfolio on a per card basis and aggregating these individual rates to determine and report the redemption rate and breakage rate for any specified subset of a portfolio as of any specified date. In a preferred embodiment, the method is used to determine the redemption rate and breakage rate for the cards slated for future escheat, the cards eligible for future derecognition, and any subset thereof. The method preferably uses individual positioning to determine and report the redemption rate and breakage rate for any subset of a portfolio on any specified date. The method preferably uses individual repositioning to automatically and seamlessly determine and report the redemption rate and breakage rate for any subset of a portfolio as it ages and as laws or facts change over time.

A preferred embodiment of the instant invention includes the use of "aggregated individual breakage rate method" for the specific purpose of determining the redemption discounted balance of a segment or subset of a portfolio. A systems platform uses the individual positioning method to determine the redemption rate and breakage rate of each card in a portfolio on a per card basis and then aggregates the individual rates to determine and report the redemption discounted balance of any specified subset of a portfolio as of any specified date. In the preferred embodiment, this method is used to determine and report the redemption discounted balance of the cards slated for future escheat and the cards eligible for future derecognition, along with any subset of the groups of cards. An example is the use of the method to determine the redemption discounted value of all the cards in a portfolio that is slated for future escheat, and to further determine the redemption discounted value of such cards on a per state and a per escheat date basis, so that the redemption discounted balances of each group of cards to be escheated to various states on various dates is determined and reported. The preferred method uses individual positioning to determine and aggregate the redemption discounted balance for any subset of a portfolio on any specified date. The method preferably uses individual repositioning to automatically and seamlessly determine and report the redemption discounted balance of any subset of a portfolio as the subset ages and as laws or facts change over time.

A preferred embodiment of the instant invention includes the "multiple footprint system method" for issuing cards under which the cards issued in a card program are issued by two or more issuers, as opposed to being issued in the current single footprint practice under which the cards sold or marketed in a card program are issued by one issuer. In a preferred embodiment, the multiple issuers in a multiple footprint system are domiciled in different states with the multiple footprint system permitting the issuer to take advantage of the escheat laws of the different states as appropriate. In another embodiment, the issuers are located in the same state with the multiple footprint system permitting a card portfolio to be split among the issuers pursuant to specified criteria. A preferred embodiment of the instant invention includes the use of a multiple footprint system to permit the issuance of cards by any combination of multiple issuers, including multiple affiliated companies or multiple unaffiliated companies (such as a parent and subsidiary, sister companies, multiple subsidiaries, multiple independent companies, and the like).

A preferred embodiment of the instant invention includes the method of combining the "multiple footprint system method" with the "individual positioning method" to permit a card portfolio to be processed effectively within a multiple footprint system. A rules-based systems processing platform processes the combined methods to split a portfolio on a specified date or timetable into segments or classes to be issued by two or more issuers. In a preferred embodiment, the combined methods are used to split a card portfolio into classes based upon the escheat status or derecognition status of the individual cards and to timely allocate the classes among the multiple issuers. When a multiple footprint system is used with individual positioning, the method preferably is used to automatically process, determine, and populate each footprint of a multiple footprint system on a real-time or near-real time basis on a specified date or timetable. When used with individually repositioning, this method preferably is used to automatically and seamlessly reset and reallocate the cards within the multiple footprint system over time and as the laws or facts change.

An embodiment of the instant invention comprises a multiple axis rules-based processing platform for determining and managing compliance with the unclaimed property laws of applicable jurisdictions on an individual card and automated basis in light of multiple legal and factual variables and specified issuer decisions. A preferred systems architecture platform periodically aggregates the required transaction data, factual information, and issuer decisions through profiles, gateways, and networks with applicable issuers and transaction processors, and processes the legal variables, factual variables and issuer directives to determine and manage the escheat status of each card in a portfolio on an individual per card basis. One axis of a preferred embodiment of a systems platform processes applicable legal variables including various priority rules governing the priorities among jurisdictions (including the first, second and third priorities used in the United States), various versions of these priority rules, multiple key attributes of each jurisdiction's escheat laws, the historical versions of these rules and laws, and with the future changes to the laws that will occur over time. Another axis of a preferred embodiment of the systems platform processes the relevant factual variables impacting escheat, including facts specific to card issuers, card programs, card owners, and cards, along with the changes to these facts that will occur over time. Another axis of a preferred embodiment of the systems platform processes specified decisions and directives by the issuers regarding their preferences with respect to escheat compliance.

The systems processing platform processes the legal variables, factual variables and issuer directives to individually position each card in a portfolio with its escheat status on a specific date. Thereafter, the systems platform automatically and seamlessly individually repositions each card with its escheat status over time as the card ages and the laws and facts change over time. In a preferred embodiment, at the election of an issuer, the systems processing platform may be used on a real-time basis to set the escheat status on the same day as the cards are sold and to reset the status upon applicable events on the same date the event occurs. In a preferred embodiment, the systems processing platform is used on a near real-time basis to set and reset the escheat status of each individual card within weekly, monthly or other desirably accounting periods.

A preferred embodiment of the instant invention also comprises a multiple axis rules-based processing platform for determining and managing compliance with applicable accounting principles and related statistical methods governing the derecognition of card payables on an individual item and automated basis in light of the accounting method selected by an issuer for derecognizing the payables, the statistical method used to support the accounting method, and specified issuer decisions. A preferred systems architecture platform periodically aggregates the required transaction data, factual information, and issuer directives through profiles, gateways, and networks with applicable issuers and transaction processors, and processes the applicable factual variables, issuer directives, accounting methods, and statistical methods to determine the cards that are eligible for derecognition and to manage the derecognition of each card in a portfolio on an individual card basis.

The preferred systems processing platform individually positions each card in a portfolio with its derecognition status on a specific date. Thereafter, the systems processing platform of a preferred embodiment automatically and seamlessly individually repositions each card with its derecognition status over time as the card ages and the laws and facts change. In a preferred embodiment, at the election of an issuer, the systems processing platform may be used on a constant real-time basis to process and determine the derecognition status on the same day as the cards are sold or used. In a preferred embodiment, the systems processing platform is used on a near real-time basis to periodically set or reset the derecognition status of each individual card within weekly, monthly or other desired accounting periods.

When utilized in its diagnostic mode, the systems processing platform of a preferred embodiment is capable of determining and diagnosing the escheat profile and derecognition profile of a portfolio as of a specified date. The systems processing platform preferably determines the profile of a portfolio on an as-is basis as of the specified date. In addition, in a preferred embodiment, the settings on the systems processing platform may be adjusted to modify factual variables and issuer directions to perform "what-if" or diagnostic runs to assess the impact of program designs, escheat solutions, issuer directives, program features, distribution methods, and with proposed changes to the foregoing upon the escheat and derecognition profiles of a portfolio. The systems processing platform may be used in its diagnostic mode in either a single footprint system or a multiple footprint system. In a preferred embodiment, the systems platform measures the risk of certain issuer decisions or directives. In another preferred embodiment, the systems platform recommends footprints in a multiple footprint system along with other attributes of the program to optimize the escheat or derecognition profiles of a portfolio.

When utilized in its operations mode, the multiple axis rules-based processing platform of a preferred embodiment manages the escheat process for the cards in a portfolio. Based upon the legal variables, factual variables, and issuer's directives, the systems processing platform determines the escheat status of each card and adjust the status of each card as it ages and as facts and laws change over time. The systems processing platform preferably determines if the card is slated for future escheat. With respect to cards slated for future escheat, the systems processing platform of a preferred embodiment also tracks, ascertains and manages various attributes and events regarding the escheat of a card. In a preferred embodiment, the escheat events and attributes processed by the systems platform includes, among others, the jurisdiction of escheat, the presumed abandonment date, the duty to send a pre-escheat notice, the pre-escheat notice dates, the date of escheat filing with the jurisdiction, the escheat amount, the jurisdiction's escheat filing fields, the jurisdiction's escheat data format, the jurisdiction's filing media, the statute of limitations for card owner claims, the statute of limitations for escheat jurisdiction claims, and applicable archive requirements.

When utilized in its operations mode, the multiple axis rules-based processing platform of a preferred embodiment manages the derecognition process for the cards in a portfolio. Based upon the specified accounting method, specified statistics method, certain factual variables, and issuer's directives, the systems processing platform determines the derecognition status of each card and adjust the status of each card as it ages and as facts and laws change over time. The systems processing platform determines if the card is eligible for derecognition. With respect to cards that are eligible for future derecognition, the systems processing platform of a preferred embodiment tracks, ascertains and manages various attributes and events regarding the derecognition of a card. In a preferred embodiment, the derecognition attributes and events processed by the systems platform include, among others, the amount that is subject to derecognition, the timing of derecognition, and the reconciliation of the derecognition method on a per card basis.

The systems processing platform of a preferred embodiment is used to process the cards of a portfolio issued in a single footprint system. In a preferred embodiment for a single footprint system, the systems platform processes the cards and individually positions the cards within the single footprint system with their individual escheat status, derecognition status, redemption rate, breakage rate, and redemption discounted balance. The systems platform preferably sets the status of each card with respect to these metrics as of the date sold and automatically adjusts the status of each card with respect to these metrics as a card ages and as facts and laws change over time. With respect to escheat, the systems platform of a preferred embodiment determines whether the card is slated for future escheat. If so, the systems processing platform preferably tracks, ascertains and manages various escheat events and attributes regarding the card as the card ages or facts and laws change over time. With respect to derecognition, the systems platform of a preferred embodiment determines if the card is eligible for derecognition. If so, the systems processing platform preferably tracks, ascertains and manages various events and attributes regarding the derecognition of the card as the card ages or facts and laws change over time. With respect to rates and balances, the systems platform of a preferred embodiment determines and reports the redemption rate, breakage rate, and redemption discounted balance for any segment or subset of the portfolio as of any specified date, and adjusts the rates and balance as the segment or subset ages, or as facts and laws change over time.

The systems processing platform of a preferred embodiment is used to process the cards of a portfolio issued in a multiple footprint system. In a preferred embodiment for a multiple footprint system, the systems processing platform assigns issuers to the multiple footprints, as needed or desired, allowing financial institutions, retailers, issuers, portfolio managers and portfolio designers to optimize escheat compliance and derecognition opportunities while taking advantage of the escheat laws of the jurisdiction where the footprint entities are located. After the footprints of a multiple footprint system are determined and assigned, then systems processing platform of a preferred embodiment individually positions and populates each card in the proper footprint of the system at the proper time specified for the portfolio, so that each card is placed with and issued by the proper issuing entity in the proper footprint as of the specified time. In a preferred embodiment, the systems platform optimizes the use of the multiple footprints by automatically selecting and individually positioning and populating each card with the footprint that best optimizes the escheat and derecognition of the card, consistent with the issuer's directives.

With respect to each footprint of a multiple footprint system, after the cards are positioned and populated in a specific footprint, the systems processing platform of a preferred embodiment is used to process the cards issued in the footprint. In a preferred embodiment, the systems processing platform processes the cards and individually positions the cards within each footprint of the multiple footprint system with their individual escheat status, derecognition status, redemption rate, breakage rate, and redemption discounted balance. The systems platform preferably sets the status of each card with respect to these metrics as of the date sold and automatically adjust the status of each card with respect to these metrics as a card ages and facts and laws change over time. With respect to escheat, the systems platform of a preferred embodiment determines whether the card is slated for future escheat. If so, the systems platform preferably tracks, ascertains and manages various escheat events and attributes for the card as the card ages or facts and laws change over time. With respect to derecognition, the systems platform of a preferred embodiment determines if the card is eligible for derecognition. If so, the systems processing platform preferably tracks, ascertains and manages various derecognition events and attributes for the card as the card ages or facts and laws change over time. With respect to rates and balances, the systems platform of a preferred embodiment determines and reports the redemption rate, breakage rate, and redemption discounted balance for any segment or subset of the portfolio as of any specified date, and adjusts these rates and balance as the segment or subset ages or facts and laws change over time.

Preferred embodiments of the systems of the instant invention are capable of "triaging" cards on an individual per card basis to determine in real-time or near real-time, based upon the multiple evaluated variables, whether and how the escheat and derecognition of a card can be minimized or maximized. In a preferred embodiment, depending upon settings to meet an issuer's directives, the instant invention positions each card within a multiple footprint system to separate the cards that are slated for future escheat from the cards that are eligible for derecognition. Furthermore, with respect to cards positioned for escheat, a preferred embodiment of the instant invention further positions the cards to take advantage of the most favorable escheat rules among a group of escheat jurisdictions and within a specific escheat jurisdiction. With respect to items slated for future escheat, a preferred embodiment of the instant invention also determines and reports if and when amounts slated for escheat may be subjected to revenue generating events such as generation of float, the retention of discounts or reductions allowed by a jurisdiction, and the like. With respect to the items that are eligible for derecognition, a preferred embodiment of the instant invention determines and reports if and when the items may be subject to revenue generating events such as the generation of float, taking of fees, and derecognition of liabilities with resultant income or earnings. Because the system of the preferred embodiment of instant invention continuously evaluates changes to the variables, an issuer may implement risk assessed compliance on revenue generating events as individual cards meet required or designated criteria.

After a card has been initially positioned, the systems processing platform of a preferred embodiment of the instant invention continuously evaluates any changes in the applicable variables concerning the card, and repositions the escheat status or derecognition status of each card on an individual basis in light of the changes. In a preferred embodiment, if the reevaluation system determines that the escheat status or derecognition status of an item has changed within a footprint, the system repositions the item within the footprint to reflect the change (hereinafter "vertical repositioning"). For example, if a card slated for escheat is partially used by the card owner, the card is vertically repositioned within its footprint to extend the projected presumed abandonment date and the deadline for the escheat jurisdiction to reflect the fact that the card was partially used.[17] In the preferred embodiment, if the reevaluation system determines that a change in the variables for a card makes issuance of the card by a different issuing entity within a multiple footprint system more appropriate or beneficial, the system repositions the card and transfer its issuer obligation to the more correct or desirable footprint issuer to reflect the change (herein "horizontal repositioning"). For example, if a purchaser of a registered card lived in one state at the time of purchase but later moved and changed the registered address to another state, the system evaluates whether positioning the card in a different footprint of a multiple footprint system is required or would be more favorable for the issuer, and then horizontally repositions the card as required with a different footprint issuer in the multiple footprint system.[18]

[17] The systems processing platform uses vertical repositioning to reposition the escheat status of a card within a single footprint. As such vertical repositioning applies to the sole footprint in a single footprint systems and any one of the footprints in a multiple footprint system.

[18] The systems processing platform uses horizontal repositioning to reposition the escheat status of a card among different footprints of a multiple footprint system. A horizontally repositioned card is moved from one footprint to another footprint in the multiple footprint system.

A preferred embodiment of the instant invention also enables the issuer to separate the cards into classes based upon specified criteria. In a preferred embodiment, the cards are classified on a per card basis by their escheat or derecognition status. For example, the cards that are not slated for escheat and are eligible for derecognition are placed in one class (hereinafter the "Class A Cards"), and the cards slated for future escheat are placed in a second class (hereinafter the "Class B Cards"). It will be appreciated that the composition of and number of classes may vary depending upon the specified criteria. A preferred embodiment of the instant invention enables the issuer to set parameters that establish the specific distinction between the Class A Cards and the Class B Cards. A preferred embodiment of the instant invention also permits the issuer to create other classes of paper based upon the parameter settings. This system enables issuers to manufacture, manage or sell various classes of cards, and enables portfolio purchasers to buy and manage classes of cards. In a preferred embodiment, the systems processing platform classifies the cards on an automated basis pursuant to specified parameters regarding the escheat or derecognition status of the cards, and the systems platform allocates these classes of cards among multiple issuers or among buyers and sellers on an automated basis at specified times.

In a preferred embodiment, each card is subject to time-sensitive milestones. With respect to cards slated for future escheat, examples include the presumed abandonment date, the dates for pre-escheat notices, the deadline for reporting cards to the applicable jurisdictions, the required time period for archive of records, the statutes of limitation on card owners' claims, the statutes of limitation on claims by jurisdictions seeking escheat, and the like. The cards eligible for derecognition preferably are also subject to several time-sensitive milestones. Examples include the deadline for negative escheat reporting if required, the required time period for archive of records, the timing for derecognition of cards, the timing for "true-ups" of derecognized cards if required, the statutes of limitation on card owners' claims, the statutes of limitation on claims by jurisdictions contesting derecognition and seeking escheat, and the like. The systems processing platform of a preferred embodiment of the instant invention manages timelines on an automated and individual card basis by reference to the laws and facts that apply to each card, and individually positions each card with deadlines on an automated per card basis, thereby allowing an issuer to meet its obligations and assess its portfolio exposure in an efficient manner.

When a multiple footprint system is used to issue the cards sold in a card program, the owner of a particular card may desire to ascertain the identity of the issuer of the card. The systems processing platform of a preferred embodiment of the instant invention provides a system that enables card owners to identify the issuers of cards sold and issued in a multiple footprint system. In the preferred embodiment, the systems platform individually positions each card with a correct issuer and footprint within the multiple footprint system at the time the card is sold to a buyer. The systems platform also creates a record identifying the issuer and drops/stores the record into one or more files of a database that is available for web or telephone access by a card owner pursuant to a prompt specified on the card. The systems platform of a preferred embodiment updates the record upon the initial positioning of the card and upon each repositioning.

When cards are escheated to a jurisdiction, the obligation of the issuer to honor the cards likely will be released, and the card owner may not be able to use the card in its usual and intended manner. To avoid this adverse result to card owners, the systems processing platform of a preferred embodiment of the instant invention provides a system under which card owners are enabled to use an escheated card on a continued and seamless basis after escheat in its usual manner as if it were not subject to escheat. In a preferred embodiment, the card owner is permitted to use the card after escheat in the same manner permitted prior to escheat. The systems processing platform tracks each card escheated to a state, filters the transaction data to recognize the use of an escheated card, bridges the processing system to permit the card to be properly settled, and seeks reimbursement from the jurisdiction of escheat by either transmitting a proper record and reimbursement form or by processing a proper set-off at the next applicable state escheat filing. In another embodiment, the card owner is required to reclaim the card from the state, but the systems processing platform processes the reclamation in an efficient manner as an intermediary between the card owner and state. The card owner is issued a new card by the issuer, and the systems processing platform reconciles the payment and seeks reimbursement from the state by transmitting a proper record and reimbursement form or by processing a proper set-off for the redemption at the next applicable state escheat filing.

When cards are escheated, the issuer may be required or permitted to report the cards in the aggregate to a jurisdiction, so that specific data and information for the escheated cards are retained by the issuer and are not transferred to the jurisdiction. In addition, for security reasons, an issuer may desire not to transmit card numbers and other security sensitive information to a jurisdiction upon escheat. As a result, an issuer will retain information about escheated cards that may be needed by a card owner or jurisdiction to process an owner's claim for the return of an escheated card. To address this subject, the systems processing platform of a preferred embodiment of the instant invention provides a system under which the jurisdiction is enabled to access the required data retained by the issuer for the purpose of processing a card owner's claim for return of an escheated card. In preferred embodiment, a gateway with the jurisdiction permits limited and secured access by or through the jurisdiction to the data required to process the card owner's claim.

The multiple axis rules-based systems processing platform of a preferred embodiment performs the above-described processes on an automated basis allowing the issuer to manage thousands or millions of cards in an efficient manner. In a preferred embodiment, the systems processing platform aggregates transaction data on a constant real-time basis or on periodic near-real time basis from the transaction processors for a card program, along with information from the issuers, and extracts, translates and loads the data and information required by the systems processing platform to perform the processes and systems described herein along with other functions now known or hereinafter developed. In this preferred embodiment, the aggregation of data from the transaction processors also permits an issuer to reconcile and tie the issuer's accounting books and records with the transaction processor's data of record with respect to escheat and derecognition transactions.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth, by way of illustration and example, an embodiment of this invention.

BRIEF DESCRIPTION OF THE DRAWINGS

One or more preferred embodiments of the invention, illustrative of the best mode in which the applicant has contemplated applying the principles, are set forth in the following description and is shown in the drawings and is particularly and distinctly pointed out and set forth in the appended claims.

FIG. 1 is an illustration showing the position of cards in a single footprint system in which the cards are issued by a single issuer to multiple card owners or end-users.

FIG. 2 is an illustration showing the position of cards in a multiple footprint system of the instant invention in which the cards are issued by multiple issuers to multiple card owners or end-users. FIG. 2 specifically illustrates the configuration of a multiple footprint system embodiment using two footprints in which one issuer is a parent company and a second issuer is a subsidiary of the parent company. FIG. 2 also specifically illustrates the configuration of a multiple footprint system embodiment using two footprints in which one issuer is a subsidiary of parent company and the second issuer is another subsidiary of the same parent company.

FIG. 3 is an illustration showing the position of cards in a multiple footprint system embodiment in which the cards are split for issuance by multiple issuers to multiple card owners and end-users. FIG. 3 specifically illustrates the configuration of a multiple footprint system embodiment using two footprints in which some cards are issued by one company and the other cards are issued by an independent and unaffiliated company.

FIG. 4 is an illustration showing the individual positioning of cards within in a single footprint of a single footprint system embodiment of the instant invention. FIG. 4 specifically illustrates a configuration of an embodiment of the invention in which the cards are individually positioned and separated by their escheat status within the single footprint into one group of cards that is slated for future escheat and a second group that is eligible for derecognition.

FIG. 5 is an illustration showing the individual positioning of cards within a multiple footprint system embodiment of the instant invention. FIG. 5 specifically illustrates a configuration of an embodiment in which the cards are individually positioned between two footprints by their escheat status with the cards slated for future escheat being issued by one company in the first footprint and the cards eligible for derecognition being issued by the other company in a second footprint of a multiple footprint system.

FIG. 6 is an illustration showing the vertical repositioning of cards within a single footprint system embodiment of the invention. FIG. 6 specifically illustrates the use of vertical repositioning to reposition the presumed abandonment date and escheat filing deadline for a card that was slated for future escheat when issued and was partially used by the card owner after issuance.

FIG. 7 is an illustration showing horizontal repositioning of a card within a multiple footprint system embodiment of the invention. FIG. 7 specifically shows the repositioning of a card from one footprint to another footprint based upon a change in the card's escheat status from being a card slated for future escheat to being a card not slated for future escheat.

FIG. 8 is a schematic diagram of a system configuration of a preferred embodiment of the instant invention under which a multiple axis rules-based systems processing platform processes and manages the escheat and derecognition of the cards in the issuer's portfolio on an automated basis employing individual card positioning and individual card repositioning with the capability of using multiple footprint systems and split portfolio analysis.

FIG. 9 is a schematic diagram of a system configuration of another preferred embodiment of the instant invention in which the systems processing platform is used to process the split issuance of the cards in a portfolio or program among two unaffiliated issuers for split issuance within a multiple footprint system. FIG. 9 specifically shows the configuration of the use of the instant invention for split issuance where the systems architecture is used by the first issuer to classify the cards, retain one class of cards, and transfer the other class of cards to the second issuer, and the systems architecture is also used by the second issuer to further classify the cards received from first issuer.

FIG. 10 is a schematic diagram of a system configuration of a preferred embodiment of the Escheat Service/Platform component of the instant invention shown in FIG. 8 through which the escheat status, the concomitant derecognition status, and the escheat events and attributes of the cards are processed and managed on an automated and individual per card basis.

FIG. 11 shows an example of decision flow of an embodiment of the Escheat Service/Platform component of the instant invention shown in FIG. 10 which triages a card to determine if its revenue generating status can be maximized by individually positioning a card slated not to escheat with a footprint in a multiple footprint system that uses an issuer domiciled in a non-escheat state.

FIG. 12 shows an example of decision flow of an embodiment of the Escheat Service/Platform component of the instant invention shown in FIG. 10 which triages a card to determine if its revenue generating status can be maximized by individually positioning a card slated to escheat with the optimum escheat footprint in a multiple footprint system.

FIG. 13 shows another example of decision flow of an embodiment of the Escheat Service/Platform component of the instant invention shown in FIG. 10 which triages a card to determine if its revenue generating status can be maximized by individually positioning a card slated to escheat with an optimum escheat footprint in a multiple footprint system.

FIG. 14 is a schematic diagram of a system configuration of a preferred embodiment of the Forecasting Service/Platform components of the instant invention shown in FIG. 8.

FIG. 15 is a schematic diagram of a system configuration of an embodiment of the Escheat Service/Platform and the Forecasting Service/Platform components of the instant invention shown in FIG. 8 when used to individually position the redemption rate, breakage rate, and redemption discounted value of each card in a portfolio.

FIG. 16 is a schematic diagram of a system configuration of an embodiment of the instant invention used to process the system for card owners to identify and look-up the issuer of a particular card in a program.

FIG. 17 is a schematic diagram of a system configuration of an embodiment of the instant invention in which an issuer processes internally the products and/or services that the issuer offers and that are potentially subject to escheat.

FIG. 18 is a schematic diagram of a system configuration of an embodiment of the instant invention in which an issuer utilizes a third party processor for external processing of at least some of the products and/or services that the issuer offers and that are potentially subject to escheat.

FIGS. 19a through 19c show exemplary screen shots of an Issuer Profile of the embodiment of the instant invention shown in FIG. 8.

FIGS. 20a through 20d show exemplary screen shots of State Law Profiles of a state law table of the embodiment of the instant invention shown in FIG. 8. FIG. 20a shows general legal attributes for a state profile within the state law table. FIG. 20b shows retailer-specific information for a state profile within a state law table. FIG. 20c shows legal attributes regarding pre-escheat notices for a state profile within a state law table. FIG. 20d shows legal attributers regarding state escheat filings for a state profile within a state laws table.

FIG. 21 is an exemplary output file from the Escheat Service/Platform component the embodiment of the instant invention shown in FIG. 8.

FIG. 22 shows a sample output from the Forecast Service/Platform component of the embodiment of the instant invention shown in FIG. 8.

FIGS. 23 through 29 show examples of various reports that may be generated by the Reports Platform component of the instant invention shown in FIG. 8.

DETAILED DESCRIPTION OF A PREFERRED EMBODIMENT

Figure 23:
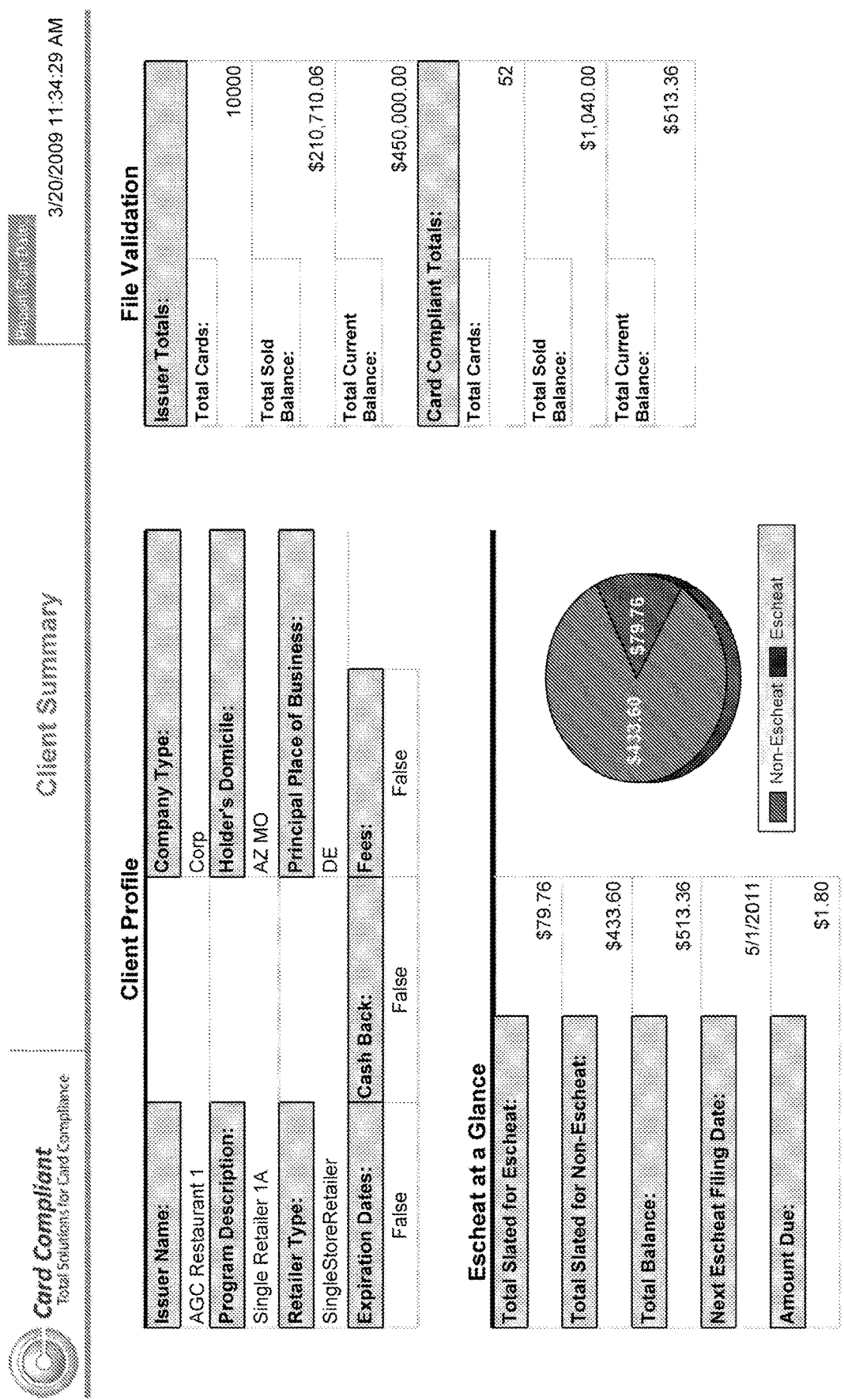

As required, a detailed embodiment of the present invention is disclosed herein; however, it is to be understood that the disclosed embodiment(s) are merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. For example, the detailed embodiments disclosed and discussed below are particularly well-suited for, and therefore discussed in connection with, products such as cards. Nevertheless, it will be appreciated that various other products or services may be utilized in connection with the same or similar embodiments of the invention without departing from the spirit or scope of the instant invention.

Referring to FIGS. 1 through 3, illustrations of configurations of a single footprint system and several multiple footprint systems are shown. The issuers and designers of card programs currently use a single footprint system to issue the cards sold in a program. FIG. 1 shows the configuration of a single footprint system. In a single footprint system only one issuer is used to issue the cards in the card program/portfolio to the card owners and end users. The embodiment of the instant invention described herein in detail employs a new technique of using a multiple footprint system method to issue (position) and/or reposition the cards in a card program. In a multiple footprint system, the cards in a program are issued by (positioned) and/or repositioned into two or more issuers. Any combination of companies/entities can be used, such as a parent and subsidiary, two subsidiaries, or two unaffiliated entities.

FIG. 2 shows the configuration of an embodiment of a multiple footprint system using a parent and a single subsidiary to issue/reposition the cards into a single portfolio. FIG. 2 also shows the configuration of a multiple footprint system using two sister subsidiaries to issue/reposition the cards into a single portfolio. FIG. 2 shows embodiments in which two issuers are used in the multiple footprint system. Nevertheless it will be appreciated that three or more issuers may be utilized in the same or similar manner without departing from the spirit and scope of the instant invention. As is shown in FIG. 2, the parent company creates one or two subsidiary entities, depending upon whether the parent company itself desires to be one of the two issuers, or if the parent company wishes to have both issuers be subsidiary companies. It will be appreciated that the decision as to whether a parent company itself is an issuer will depend on a variety of factors, including, but not necessarily limited to the jurisdiction in which the parent company resides. If the parent company is acting as one of the issuers, the parent company itself issues cards in the portfolio to certain specified end-users (as determined through the systems and method of the instant invention) as part of a first footprint, while the single subsidiary issues cards in the portfolio to other specified end-users as part of a second footprint. If the parent company is not acting as one of the issuers, a first subsidiary issues cards in the portfolio to certain specified end-users as part of a first footprint, while the second subsidiary issues cards in the portfolio to other specified end-users as part of a second footprint.

FIG. 3 shows the configuration of another embodiment of a multiple system using two independent and unaffiliated companies to issue/reposition the cards for a single portfolio. FIG. 3 shows an embodiment in which two issuers are used in the multiple footprint system. Nevertheless it will be appreciated that three or more issuers may be utilized in the same or similar manner without departing from the spirit and scope of the instant invention. As is shown in FIG. 3, a first entity issues cards in the portfolio to certain specified end-users (as determined through the systems and method of the instant invention) as part of a first footprint or Sub-Portfolio, while the second, independent entity issues cards in the portfolio to other specified end-users as part of a second footprint or Sub-Portfolio. In one preferred embodiment, Issuer #1 shown in FIG. 3 is retailer or other entity for which the Total Card Portfolio has been designed to benefit (i.e. the store in which the cards in the Total Card Portfolio may be used), while Issuer #2 is an independent third party that contracts with the retailer to act as an issuer for certain cards. Nevertheless, it will be appreciated that both Issuer #1 and Issuer #2 could be independent third parties that have contracted with the retailer to act as issuers for certain cards within the portfolio. Referring to the embodiment shown in FIG. 3, Issuer #1 issues cards that have been classified as Class A Cards by the systems and methods of the instant invention; such cards are not slated for escheat and are eligible for derecognition when issued by Issuer #1. Cards that are slated for escheat if issued by Issuer #1 are classified as Class B Cards and are issued by Issuer #2. As is discussed further below, this allows the retailer to take advantage of more than one state's escheat laws.

In a preferred embodiment, a multiple footprint system and method is used to issue the cards in a card program to enable the issuers and/or the retailer for which a card program has been designed to take advantage of more than one issuing state's escheat laws. Under the second priority rule governing escheat, an issuer is required to escheat cards to the domiciliary state of the card issuer. However, under the third priority rule governing escheat, the issuer is required to escheat cards to the state where the cards were sold in the event that the domiciliary state of the card issuer is a non-escheat state.[19] In a single footprint system, there is only one issuer of the cards and only one domiciliary state for that issuer. Therefore, when the second priority is applied, the single footprint system restricts the issuer to one state's laws. If the domiciliary state is an escheat state, the issuer will be required to escheat the cards to the state, leaving no cards available for derecognition. If the domiciliary state is a non-escheat state, the issuer will be required to escheat the third priority cards to the escheat states where the cards were sold, making those cards unavailable for derecognition.

[19] In the United States, conflicts between the states seeking escheat of intangible property in multiple jurisdiction settings are governed by certain priority rules. Three priority rules are commonly referenced, and are commonly known as the "first priority rule" the "second priority rule" and the "third priority rule." The first priority rule gives the first position to the resident state of the card owner in certain circumstances. The second priority rule gives the second position to the domiciliary state of the card issuer under certain circumstances. The third priority rules give the third position to the domiciliary where the card was sold under certain circumstances.

In a multiple footprint system of the instant invention, however, several issuers may be used to issue the cards, and each issuer will have its own domiciliary state. As a result, where appropriate, the issuers are able take advantage of laws of multiple states in managing the second priority rule and third the priority rule. For example, the cards sold in the non-escheat states (along with the escheat-exempt cards sold in some escheat states) are issued from one footprint of a multiple footprint system by an issuer domiciled in non-escheat state. These cards will not be slated future escheat under either the second priority rule or the third priority rule. The cards sold in the escheat states (along with the non-exempt cards sold in some non-escheat states) are issued in a second footprint of a multiple footprint by an issuer domiciled in an escheat state with favorable laws permitting discounts, reductions, and the like. These cards will be slated for future escheat but the use of the second footprint permits the second issuer to take advantage of its domiciliary escheat laws instead of applying the third priority rule.

By using a multiple footprint system to manage the escheat profile of a portfolio, issuers optimize revenue generating events related to the breakage in a portfolio. The breakage on the cards eligible for derecognition may be turned into income or earnings if and when the cards properly are derecognized by the issuers. In addition, the use of a multiple footprint system allows the issuers to manage the time periods for escheat and thereby lengthen the time giving rise to increased float or cash flows. For example, in one embodiment an issuer domiciled in an escheat state with a long abandonment period is used to issue the cards for the escheat segment of a portfolio to increase the time when funds are held or available for use before escheat.[20] Furthermore, the use of revenue models that charge back-end fees against the balance of the card after it is issued will be enhanced. For example, an issuer domiciled in a domiciliary escheat with a long presumed abandonment is used in one embodiment to issue the cards for a segment of a portfolio to increase the time period during which fees may be taken before escheat.[21] In addition, the use of revenue models that utilize expiration date to take the breakage as income, where permitted, may be enhanced by the use of a multiple footprint system or the invention.

[20] The unclaimed property laws of the states deem intangible property to be abandoned for the purpose of escheat after a stated period of time. These time periods differ from state to state ranging primarily from two to five years.

[21] The use of back-end fees is permitted for certain programs. These fees usually are charged each month against the balance of the card, such as a $2.00 monthly fee commencing twelve months after the last use of the card. The escheat of a card will stop the process of taking fees over time. Therefore, a longer escheat period permits more fees to be charged.

By using a multiple footprint system to manage the escheat profile of a portfolio, the issuers also are able to manage the redemption risk in a portfolio. In a program without expiration dates, the issuers are required to honor the cards for extended, if not indefinite, periods of time.[22] As a result, the issuer is subject to extended risk that cards may be redeemed. Escheat may be used to manage that risk. The escheat of cards in some states results in a release of the card issuer's obligation to a card owner. With respect to such cards, an issuer may use escheat to cut-off ongoing redemption risk. The use of a multiple footprint system enhances the issuer's ability to use escheat to manage redemption risk in that the issuer positions the escheat segment of a portfolio in a footprint that is favorable to redemption risk. In addition, the use of expiration dates to manage redemption risk, where permitted, may be enhanced by a multiple footprint system.

[22] The consumer statutes of some states ban the use of expiration dates for certain types of cards. These statutes create redemption risk in that the issuer is not permitted to use an expiration date to cut-off its liability on the cards.

Referring to FIG. 4 and FIG. 5, illustrations of the use of the individual card positioning method and system of several embodiments of the instant invention are shown. Current systems for analyzing the escheat profile of a portfolio typically use averages and estimates in determining program designs and escheat solutions. The shown embodiments of the instant invention employ an individual card positioning method and system under which the cards are individually positioned on a per card basis with their respective escheat status. FIG. 4 shows a configuration of an embodiment of the invention for use of the individual card positioning method to separate the cards within a single footprint system into the group of cards slated for future escheat and the group of cards eligible for future derecognition. As is shown in FIG. 4, cards are sold and issued by a single issuer for varying amounts to various end-users. The system of an embodiment of the instant invention, utilizes a rules-based platform (service, engine, program, subroutine, or other suitable function) to determine whether each card is to be positioned as an escheat card slated for possible escheat or as a non-escheat card slated for possible derecognition. Cards slated for possible escheat are tagged (e.g. logged in a data file contain information regarding each card within a portfolio) as being subject to escheat, while cards slated for possible derecognition are tagged as non-escheat.

FIG. 5 shows a configuration of another embodiment of the invention for the use of the individual card positioning method to separate the cards slated for future escheat from the cards eligible for future derecognition in a multiple footprint system, under which the cards slated for future escheat are issued by one issuer in one footprint and the other cards issued by the another issuer in a second footprint in a multiple footprint system. As is shown in FIG. 5, cards are sold and issued by two different issuers for varying amounts to various end-users. The system of an embodiment of the instant invention, utilizes a rules-based platform (service, engine, program, subroutine, or other suitable function) to determine whether each card is to be positioned as an escheat card slated for possible escheat or as a non-escheat card slated for possible derecognition. Cards slated for escheat are tagged as being subject to escheat and assigned to be issued by (or repositioned into) a first issuer's footprint, while cards slated for possible derecognition are tagged as non-escheat and issued by (or repositioned into) a second issuer's footprint.

In a preferred embodiment of the instant invention, the individual card positioning method and system is used to ascertain and set the escheat status of each card on a per card basis. The use of this method enables card issuers and card program designers to ascertain an exact or near-exact status of the escheat profile of a portfolio as of any specified date. The ability to determine escheat on an exact or near-exact basis enables an issuer to optimize revenue opportunities to an exact or near-exact maximum. In addition, the portfolio visibility resulting from individual card positioning enables card issuers and card program designers (or entity for which program has been designed to benefit) to determine the exact or near-exact impact of program designs, escheat solutions, program features, and distribution methods upon the escheat of the cards and resultant revenue opportunities. This visibility also enables issuers and program designers to ascertain unintended escheat consequences of program designs, escheat solutions, program features and distribution methods.

In a preferred embodiment, the individual card positioning method and system is used to split a portfolio into segments based upon the escheat status of the portfolio. This method enables cards to be accurately placed into classes or groups for the purpose of split issuance, a transfer of a portion of a portfolio, opinion letters, risk assessment, portfolio analysis, and the like. In a preferred embodiment, the individual card positioning method is used to assign the footprints of a multiple footprint system and position and populate the cards among various footprints within the multiple footprint system. The cards in a portfolio are split or separated by reference to the escheat status of each card, and each card is populated in the proper footprint and placed with the proper issuer in a multiple footprint system based upon the escheat status of the card. This process requires the use of individual positioning to ascertain the escheat status of the cards on a per card basis, and to position and populate the card in the proper footprint. FIG. 2 and FIG. 3, discussed above, illustrate configurations for the use of multiple footprint systems to issue cards. FIG. 5, discussed above, illustrates the use of individual card positioning to position cards among the multiple footprints.

In the preferred embodiment discussed herein, the instant invention employs a process, system and method of combining the individual positioning method with the multiple footprint system to enable an issuer (or issuers) to assess and/or optimize the revenue generating events regarding the breakage of a portfolio on an exact or near-exact basis. Under this process, an issuer combines the individual positioning method with a multiple footprint system: first, to use individual positioning to diagnose, determine and assign optimal escheat footprints for the multiple footprint system and thereby structure the multiple footprint system in an optimal configuration; second, to individually position each card by its escheat status with the proper footprint of the multiple footprint system and thereby optimize the escheat priority rules; and lastly, position each card within the footprint itself and thereby optimize the escheat laws of the footprint's jurisdiction. This process, system and method optimizes escheat compliance and maximizes revenue generating opportunities on an exact or near-exact basis.

Referring to FIG. 6, illustration of the uses of the vertical individual card repositioning method and process of a preferred embodiment is shown. The escheat status of a card will depend highly upon various laws and variables that likely will change over time. The escheat status of a card also will be related to the issuer's (or the entity for which the program has been designed to benefit, if that entity is not an issuer) directives for the card program, and the directives may change over time. Therefore, after a card is initially individually positioned, it may need to be individually repositioned to reflect pertinent changes. To address such changes in the variables impacting escheat, the instant invention employs an individual card repositioning method and process under which the escheat status of each card is continuously or periodically (i.e. daily, weekly, monthly, etc.) reevaluated to determine and reset the escheat status of the card with respect to legal variables, factual variables, and issuer directives.

The use of individual card repositioning to reposition the escheat status of a card within a single footprint is referred herein as "vertical repositioning." In the preferred embodiment of the instant invention, this method is used to reposition cards within the single footprint of a single footprint model or within one of the footprints of a multiple footprint system. FIG. 6 illustrates the use of vertical repositioning to change the escheat status of a card. In FIG. 6 a card slated for future escheat in a five escheat year state is partially used six months after it is issued. When the card was sold, the card was slated for future escheat under an applicable state's law, and was slated to be presumed abandoned five years after it was sold and to be escheated to the state six months later. Upon the partial use of the card six months after it was sold, the escheat clock rest and the card was repositioned to escheat on a later date. In the example illustrated in FIG. 6, the vertical repositioning of the card extends the filing date for the card an entire year due to the annual filing deadline for the escheat state.

Vertical repositioning has a substantial impact upon a portfolio. For example the extension of an escheat filing date creates additional float and cash flow and allows additional fees to be assessed in programs which charge back-end fee. FIG. 6 provides only one example of the use of vertical repositioning to optimize the management of escheat. Vertical repositioning is used with respect to other changes in facts, laws, and directives that result in a change in the escheat status of a card, including changes that result in a card that was slated for future escheat being converted into a card that is eligible for derecognition. As a result, the individual repositioning method and system enables the issuer to optimize the impact of changes in escheat variables on a near or near-exact basis.

Referring to FIG. 7, illustrations of the uses of the horizontal individual card repositioning method and process are shown. The embodiment of the instant invention shown also employs an individual card repositioning method and process under which the escheat status of each card in a multiple footprint system is continuously and periodically (i.e. daily, weekly, monthly, etc. or in real-time upon the occurrence of certain events) reevaluated to determine and reset the escheat status of each card and to reposition a card from one footprint to another footprint. In a preferred embodiment, each card is reevaluated on a continuous or periodic basis with respect legal variables, factual variables, and issuer directives to determine and reset the escheat status of each card. When required, the card is repositioned from one footprint to another, and the issuer's obligations on the card is transferred from one footprint issuer to another footprint issuer to take advantage of the change in the card's escheat status.

The use of individual card repositioning across multiple footprints in a multiple footprint system is referred to herein as "horizontal repositioning." FIG. 7 illustrates the use of horizontal repositioning to take advantage of a change in the escheat status of a card. The embodiment shown in FIG. 7 includes a number of cards sold as part of a portfolio and initially positioned utilizing the systems and methods of the instant invention into on of two footprints (a slated for escheat footprint, and an eligible for derecognition footprint), including a $200 gift card sold in New Hampshire that is partially used six months after it is sold to purchase goods in the amount of $150. At the time of issuance, the card is slated to escheat to New Hampshire and is positioned in a footprint in a state that has favorable escheat attributes. New Hampshire exempts cards under $100 from escheat. Therefore, upon the partial use of the card, the card is repositioned from being slated to escheat to being slated as eligible for derecognition. At that time, the card is horizontally repositioned to be issued by an issuer domiciled in a non-escheat state to assure that escheat does not occur under either the second or third priority rules. The end result is a $200 card slated for future escheat becoming a $50 card eligible for derecognition.

Referring to FIG. 8, a schematic diagram of a configuration of a preferred embodiment of a multiple axis rules-based systems processing platform is shown. The individual positioning and individual repositioning of cards by their escheat status on a continuous or periodic basis requires the application of large numbers of escheat variables to the large volumes of cards comprising a card portfolio.[23] Therefore, the system of using the individual positioning method and individual repositioning method either in a single footprint system or in combination with a multiple footprint system is integrated and executed in an automated process. FIG. 8 is a schematic diagram of a configuration for a preferred embodiment of the instant invention comprising the use of a multiple axis rules-based systems processing platform to integrate and employ the individual positioning method and individual repositioning method in a single footprint system or in combination with a multiple footprint system on an automated basis to manage escheat and/or derecognition of cards in a card program on an exact or near-exact basis. In this preferred embodiment, the cards may be processed internally by an issuer, through a third party processor, by a third party compliance company, or through a combination thereof. The embodiment of the invention shown in FIG. 8 is well-suited for real-time, near real-time, and batch positioning, repositioning, and reporting.

[23] The instant invention is capable of processing millions of combinations of escheat variables arising from the multiple layers of escheat laws and legal variables, varying factual scenarios, and differing issuer directives. The instant invention is capable of doing so with respect to large volumes of cards including the millions of cards and billions of card transactions encountered with respect to the largest of the existing portfolios.

In the embodiment of FIG. 8, detailed transaction data and/or transaction history for each individual card are either continuously or periodically, such as once per month, transmitted from the Issuer or the Issuer's transaction processor to the processing platform of the instant invention. The instant invention analyzes individual cards that may be targeted for escheat, and positions or repositions individually each cards with and issuing system to achieve optimum compliance with applicable unclaimed property laws while either minimizing or maximizing the amount of funds escheated to the appropriate jurisdictions and simultaneously minimizing or maximizing derecognition opportunities and other revenue generating events. At the directive of the issuer (or entity for which a program is designed to benefit), this instant invention may be employed to process all forms of issuing systems, including single footprint systems and multiple footprint systems in all combinations and forms.

Figure 19A:
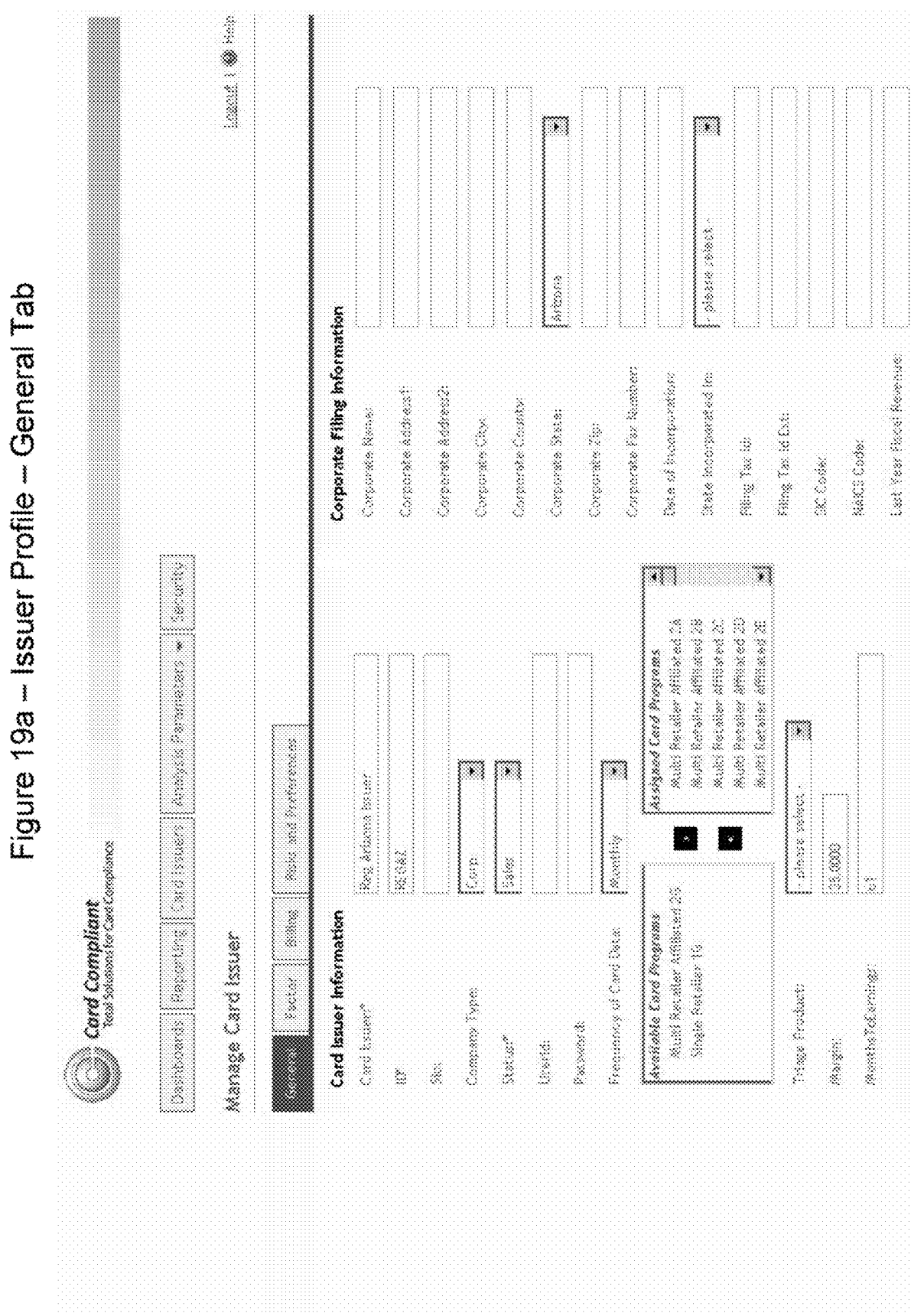
Figure 19C:
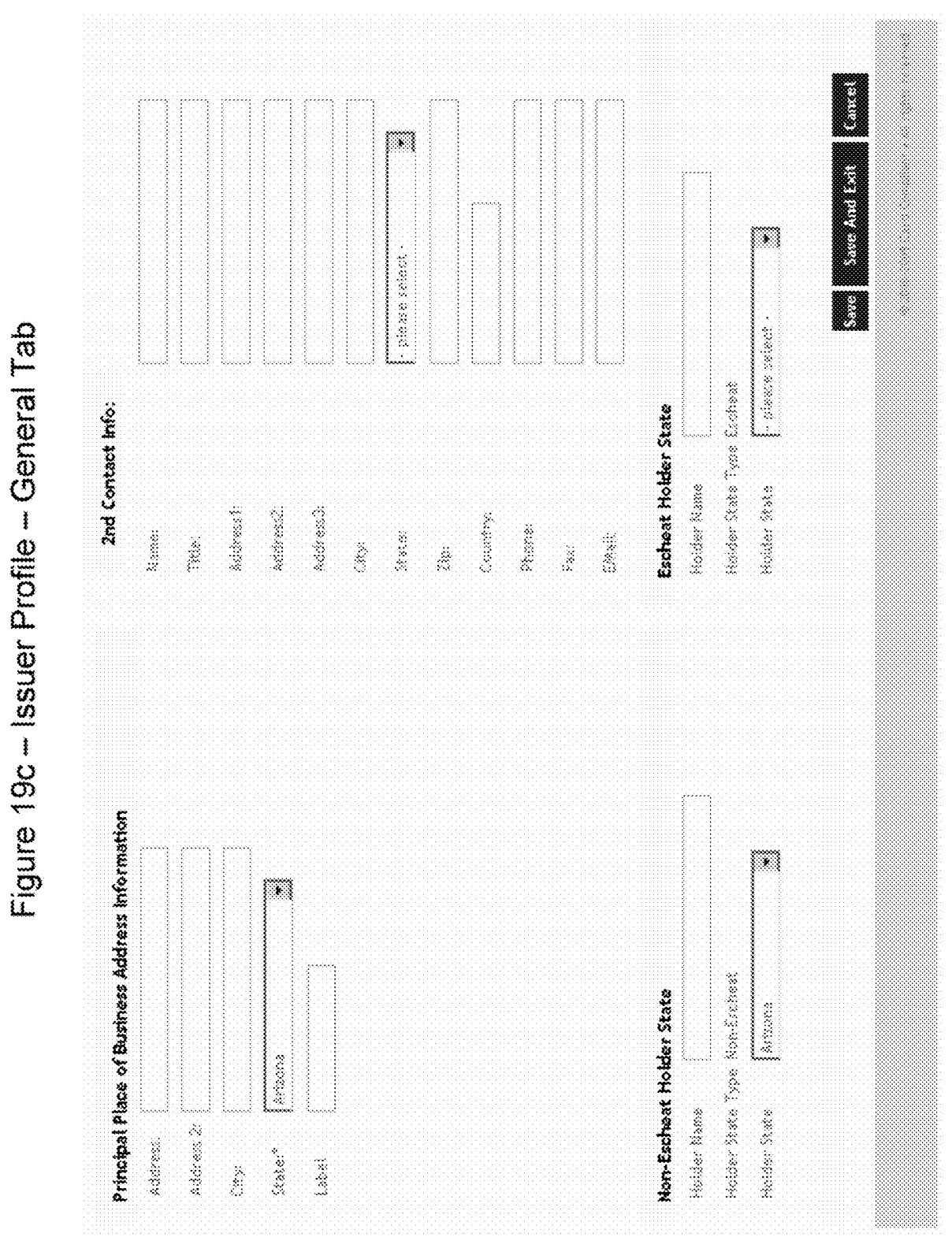

In the embodiment shown in FIG. 8, required factual information about the Issuer, cards, and program, along with the Issuer's directives and decisions, are inputted to construct an Issuer Profile that is stored in a database maintained by or on the systems processing platform.[24] FIGS. 19a through 19c show exemplary screen shots of a graphical user interface (GUI) utilized to access, create, edit and review the Issuer Profile for each Issuer stored in the database. Referring to FIGS. 19a through 19c, client facts include such information as Card Issuer (i.e., the Issuer's name), ID (a unique identification code used by the processing platform for storing data, files or other information, relating to a particular Issuer), SIC (Standard Industrial Classification) codes for the Issuer, company type (i.e., LLC, Corporation, etc.) of Issuer, Status (i.e., prospective, active or inactive client/customer of the third party service provider), user id and password (for accessing Issuer-specific extranet portions of the platform), frequency of card data (i.e., data stream provided and analyzed by the platform monthly, weekly, quarterly, etc.), contact information for Issuer technical representatives, Issuer's principal place of business address, Issuer's filing address (e.g., state of incorporation), Issuer's billing address, Issuer's Margin (certain states allow a Issuer to deduct the cost of goods sold when reporting unclaimed property), types of Card Programs utilized by the Issuer, and states in which the Issuer holds ownership of cards issued by the Issuer (i.e., through one or more subsidiaries or through a third party), and names of the holders of such cards. Issuer decisions/directives include, among others, information as the selection of footprints, the use triage processes (discussed further below), and directives regarding the Issuer's preferences and risk tolerances in implementing escheat and derecognition of the cards.

[24] In a single footprint system, one Issuer Profile is used. In a multiple footprint system, multiple Issuer Profiles are used.

A Card Program Profile contains relevant factual details concerning the card portfolio that must be aggregated and processed. The Card Program Profile contains details about the nature of the loop on which the card program is operated (i.e., open-loop, closed-loop, partially open-loop, and the like) required for escheat processing. The Card Program Profile also contains pertinent details about the terms and conditions for the cards in the portfolio required for escheat processing (i.e., expiration dates, fees, cash back, and the like). In the embodiment of the instant invention shown in FIG. 8, Card Program Profile facts are entered, edited, saved and/or deleted in a database accessed by the third party service provider. The Card Program Profile inputs are stored in a database and are accessed by the systems processing platform of the instant invention for selection in the Issuer Profile and for use in one or more of the applications of the instant invention discussed below. In the current preferred embodiment, six types of card programs loops are processed including: single store/retailer loop; multiple affiliated stores/retailers loop; multiple unaffiliated stores/retailers loop; multiple unaffiliated stores/retailers loop issued by a federal financial institution; multiple unaffiliated stores/retailers loop issued by a state financial institution; and multiple unaffiliated stores/retailers loop issued by a licensed money transmitter. Each of these six types of loops are processed in conjunction with respect to key facts regarding the terms and conditions governing the cards, including whether or not the cards have an expiration provision, whether or not the consumer is allowed to obtain cash back from a card (in up to three formats), and whether or not the Issuer deducts a fee from the balance of the card. This results in a combination of 48 or more possible program fact options in the current preferred embodiment for a Issuer to utilize. In addition, in a preferred embodiment, a test program option is created for testing purposes, resulting in a total of 49 or more possible program options.

In the embodiment shown in FIG. 8, the detailed account transaction data and/or transaction history for each card sold by a Issuer is transmitted from the database of the Issuer or the Issuer's transaction processor to the systems processing platform of the instant invention. Depending upon the configuration, the systems processing platform of the instant invention may be operated by the Issuer, by the Issuer's transaction processor, by a third party compliance company, or a third party compliance processor. Encryption and privacy filters are positioned at multiple locations in the system at points prior to the receipt of transaction data by the systems processing platform. Depending upon directives by the Issuer, these filters can be used to keep or escrow personally identifiable information about card owners (along with security sensitive information subject to PCI standards such as card numbers) at the Issuer, at the Issuer's transaction processor, at the third party compliance company, at other third party locations, or any combination of the foregoing. These filters permit the Issuer to control the location of personal card owner information and security sensitive information for security and privacy reasons, and also prevent the third party service providers from being obligated to comply with various privacy and security standards (such as PCI standards and the like) relating to the type of data and cards at issue. The encryption filter inputs the card data at the designation location in the system and encrypts each card account number (along with magnetic stripe information if required) and replaces the card number with a unique encrypted alias identification number which is used for the processing required by the instant invention. Personal information above card owners are either filtered to physically prevent access by one or more Issuers, third parties or participants in the process, or is encrypted in a manner that makes access to the personal information physically impossible, or is disassociated from the card number by a process that electronically unlinks the personal information and card number.

After the card account numbers have been replaced with aliases, the data stream or file is transmitted for processing by the systems processing platform of the instant invention. The data stream or file becomes an input for the Data Aggregation Service/Platform component of the instant invention where it is processed by one or more applicable ETL (extract, transform, and load) software applications operating on the Data Aggregation Service/Platform. In the embodiment of FIG. 8, a data file is transmitted and stored in a storage location (such as a directory or folder on a storage drive) with which the ETL service is associated. The ETL service accesses the data file from the storage location and standardizes the data for use by subsequent applications or services of the platform of the instant invention. The ETL then stores the standardized data in one or more storage locations and/or files in a Production Data Store for access by the various applications of the instant invention. In one embodiment, the ETL is customized based upon the data format and protocols of the particular Issuer from which the data is being transmitted. Nevertheless, it will be appreciated that a single ETL program may be utilized that is capable of standardizing various differing data formats and protocols from multiple Issuers without departing from the spirit and scope of the instant invention. In a preferred embodiment, the ETL is located on a segmented server to maximize processing capabilities and reduce application processing times. Nevertheless, it will be appreciated that one or more applications (such as ETL and any of the applications of the inventive platform discussed below) may be combined onto a single server, computer or other suitable appliance without departing from the spirit and scope of the instant invention.

In a preferred embodiment, the ETL service creates multiple data file outputs from the data stream (or file) received from a Issuer and stores those files in separate storage locations (e.g., directories or folders) within the data store. This allows each subsequent application of the inventive platform (such as the Escheat Service, the Forecast Service and the Derecognition Service, discussed below) to utilize separate data files that contain only the specific data needed by those applications to perform their service (e.g., the ETL filters data from within the data stream that is not needed for processing or analysis by a specific service). In addition, in the event that personal information about card owners is provided with a third party operator of instant invention, such as a third party compliance processor, in the preferred embodiment, the ETL removes the personally identifiable information from the data stream and stores such information in a separate encrypted file in a data store, so that such information is not readily accessible by the employees of the compliance company.

As is discussed above, the card transaction data is provided for processing in a continuous basis or at standard intervals by batch for processing through the systems processing platform of the instant invention. After the data is processed by the ETL, one or more of the files created and stored are accessed by the applications or services of the instant invention. One data file created by the ETL is for use with the Escheat Service. That file is saved as a text file in a storage location (folder) in which the Escheat Service "looks" for any new data. The Escheat Service then pulls the file from the storage location, schedules, batches and analyzes the card data providing final reports through the use of output files for each batch that may be used to show the Issuer how card values are currently categorized.

In a preferred embodiment, the input file for the Escheat Service (which is an output file from the ETL), includes without limitation the following information, if collected by Issuer, regarding each individual card within a batch of cards of a Issuer's Card Program: card alias; card balance (after any and all program fees); sold amount of the card; sold date of the card; the state in which the card would be registered to a purchaser (i.e., state in which the purchaser resides if and as shown only by the transaction data of record), if it is later determined (through the Fragment Filter discussed below) that enough information exists for the card to be considered registered; state in which a card would be registered to a card recipient (other than the purchaser), if it is later determined (through the Fragment Filter discussed below) that enough information exists for the card to be considered registered; the state in which the card was sold; the date of the user's last redemption on the card; the expiration date of the card; whether the purchaser's name, street address, P.O. Box, city, state, zip code, or email has been recorded in the transaction data of record, if any, accessible by the Issuer (and, if so, with each one is recorded as a yes or no—1 or 0, if the actual information will have been encrypted by ETL); and whether the recipient's name, street address, P.O. Box, city, state, zip code, or email has been recorded in the transaction data of record, if any, accessible by the Issuer (and, if so, with each one is recorded as a yes or no—1 or 0, as the actual information has been encrypted by ETL). In a preferred embodiment, the input file for the Escheat Service is stored using a batch ID/File name that includes the Issuer's ID (from Issuer Profile), Issuer's Card Program ID (from Issuer Profile), the date to which the analysis is applied, and a sequence number to identify the particular batch. This input data file is input into the Escheat Service and the above data for each card/alias is individually analyzed by the Escheat Services multi-axis rules engine.

Each card within a batch of cards is analyzed by the Escheat Service individually to determine whether or not each individual card will be subject to escheat, and when and where it will be subject to Escheat. Depending upon the Issuer Profile information (e.g., Issuer Programs, Holder States, Triage Products), the Escheat Service will position or reposition cards to minimize (or alternatively to maximize, or to obtain some other desired result based upon selections made by the Issuer within the Issuer Profile) the escheat and derecognition for unused cards and otherwise perform the functions and processes described above. In a preferred embodiment, the Issuer Profile is configured to utilize a multiple footprint model, in which cards may be held by and positioned or repositioned in one of at least two different issuing entities. Nevertheless, it will be appreciated, that the Escheat Service may be utilized in connection with a single footprint system as well. FIG. 10 is a schematic diagram of a preferred embodiment of the Escheat Service component architecture of instant invention shown in FIG. 8.

In processing the input data, the Escheat Service utilizes a Fragment Filter (shown as the First Priority Filter on FIG. 8) and State Law Tables (defined below) to analyze who owns the card and whether or not the card is registered based on the applicable state law. Then the Escheat Service utilizes and Escheat Decision Tree (discussed below) and the State Law Tables to analyze the card for escheat and positioning/reposition for each card within a batch. The Escheat Service's output is an Analysis File or Analysis Data Base that is stored in the Production Data Store and utilized to generate various reports in the Reports Platform. In a preferred embodiment, the Analysis File is stored using a batch ID/File name that includes the Issuer's ID (from Issuer Profile), Issuer's Card Program ID (from Issuer Profile), the date to which the analysis is applied, a sequence number to identify the particular batch, and information to identify the file as an Analysis File. Such a naming structure eliminates the need to include Issuer ID and Program ID with every individual card. Referring to FIG. 21, an Analysis File of a preferred embodiment includes the following information (i.e., columns) for each individual card (i.e., rows) within a batch: Alias, Class, Holder State, Escheat State, Escheat Amount, Escheat Date, Escheat Due Date, Available For Earnings Amount, Decision Tree Version, Registered State Profile Id, Sold State Profile Id, Holder State Profile Id, Escheat State Profile Id, Paper, Sold Date, Sold Amount, Last Use Date, Adjusted Escheat Amount, Adjusted Available For Earnings Amount, and Deliverable Address. In addition, in a preferred embodiment, a Audit Trail (defined below) is generated during the analysis and stored for subsequent historical use and/or recreation of data runs and audit purposes.

As part of its analysis, the Escheat Service first utilizes the Fragment Filter to determine two outcomes: First, who is the actual owner of record of the card as between the purchaser and the card recipient based on the actual information on the transaction data records, if any, accessible by the Issuer. Second, whether sufficient actual address information exists in the transaction data of record accessible by the Issuer for the actual owner of record to require the first priority rule to an individual card within a batch. To perform this analysis the Fragment Filter accesses the State Law Tables to determine the amount of information that is required by a particular state in order for an account to be considered registered for the purpose of the first priority rule or similar rule. In some states, the Fragment Filter utilizes the following equation to determine whether sufficient address information is available:

Sufficient=(Street OR P.O. Box) AND ((City AND State) OR (Zip OR Zip+4))

The State Law Tables, accessed by the Escheat Service, in the embodiment shown in FIG. 8 are created by a third party compliance provider and are stored in a database or other appropriate storage medium that is associated with the Escheat Service. Referring to FIGS. 20a through 20d, the State Law Tables include multiple State Profiles with each State Profile having details on pertinent legal attributes of the applicable state's escheat laws, and is stored with respect to general attributes, program loops (e.g., single store closed-loop, or multiple store open-loop), pre-escheat notices, state escheat filings, and the like, based upon the escheat laws in each state at any give effective date.

The State Law Tables are populated by State Profiles containing the details upon which each card is evaluated through the Decision Tree logic of the Escheat Service for the different priority rules, different versions of each priority rule, each jurisdictions specific escheat laws, and the historical versions of these rules and laws. The State Law Tables are continuously updated to add or modify profiles as the escheat laws of a state are modified by new legislation. Historical versions of state laws are maintained in a historical version drive of the state law tables, which is accessible by the Escheat Service in accordance with rules governing retroactive or prospective application) to ensure that proper version of a state's laws are applied to a card that is being analyzed, and to allow for historical data runs to test data or to recreate prior analysis and properly apply the application historical laws.

Figure 20A:
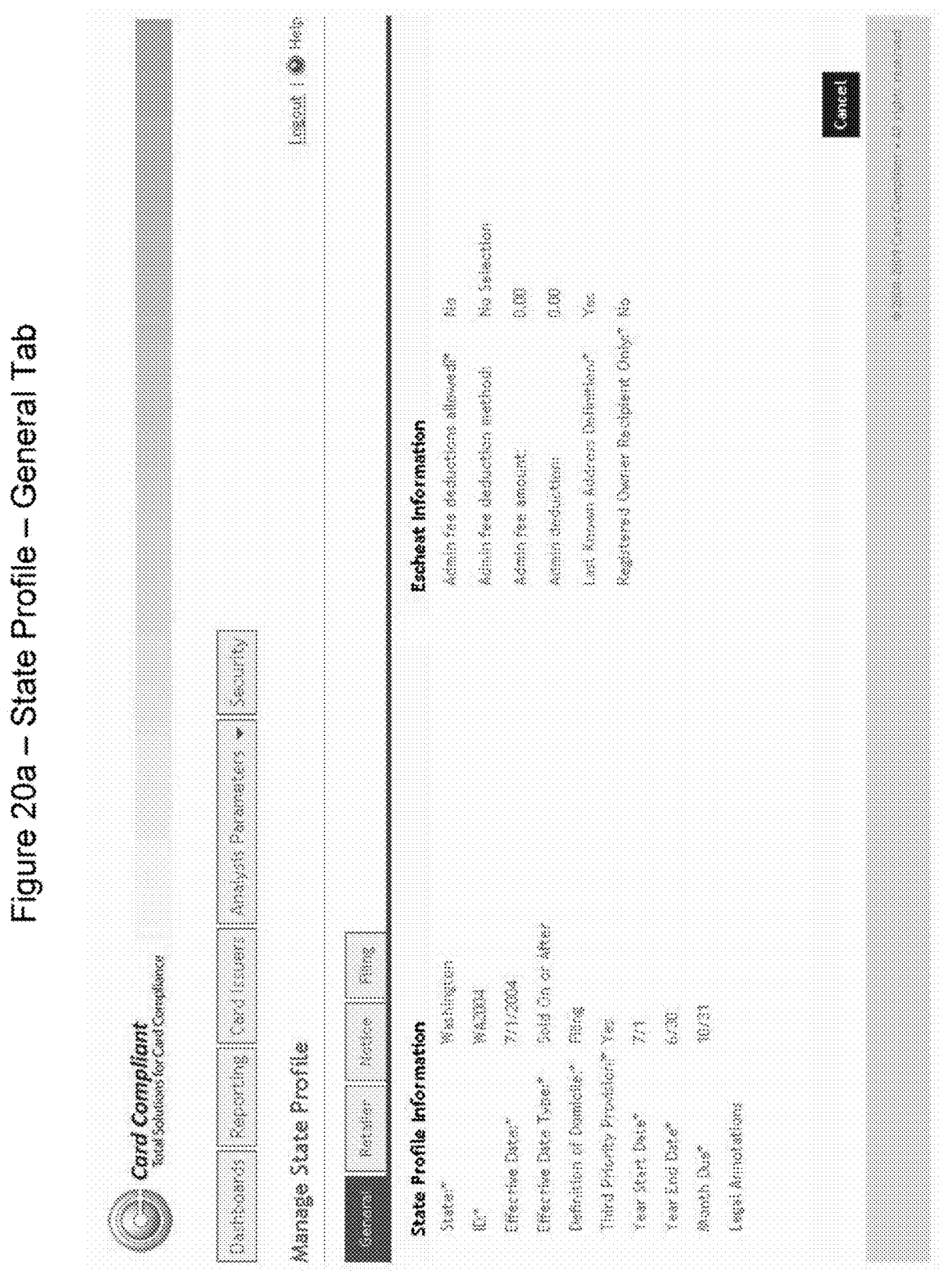

Referring to FIG. 20a, each State Profile includes the following fields in the General tab: State; ID (Identifier used to associate which State Profile was used by Escheat Service analysis; Effective Date (Date upon which State Profile parameters are applicable; Effective Date Type (e.g., Presumed Abandoned On or After); Definition of Domicile (e.g., state of issuer entities' Filing); Third Priority Provision (Determines if the State has enacted the Third Priority Rule); Year Start Date (e.g., start date of fiscal year); Year End Date (e.g., end date of fiscal year); Month Due (the date escheat payment is due to the state); Legal Annotation (e.g. explanation of inputted state field—user notes field); Admin fee deductions allowed (Determines if the State allows the Issuer to deduct administrative fees from the appropriate Card value prior to escheat); Admin fee deduction method (Determines which method is used to calculate administrative deduction taken from the appropriate Card value prior to calculation of amount eligible for escheat); Admin fee amount (Flat amount of the administrative deduction taken from the appropriate Card value prior to calculation of amount eligible for escheat); Admin deduction (Percentage amount of the administrative deduction taken from the appropriate Card value prior to calculation of amount eligible for escheat; Last Known Address Definition (i.e., does the state require a deliverable U.S. mail address for a card to be registered); Registered Owner Recipient Only (e.g., does the state recognize the card recipient as the only valid owner).

Figure 20B:
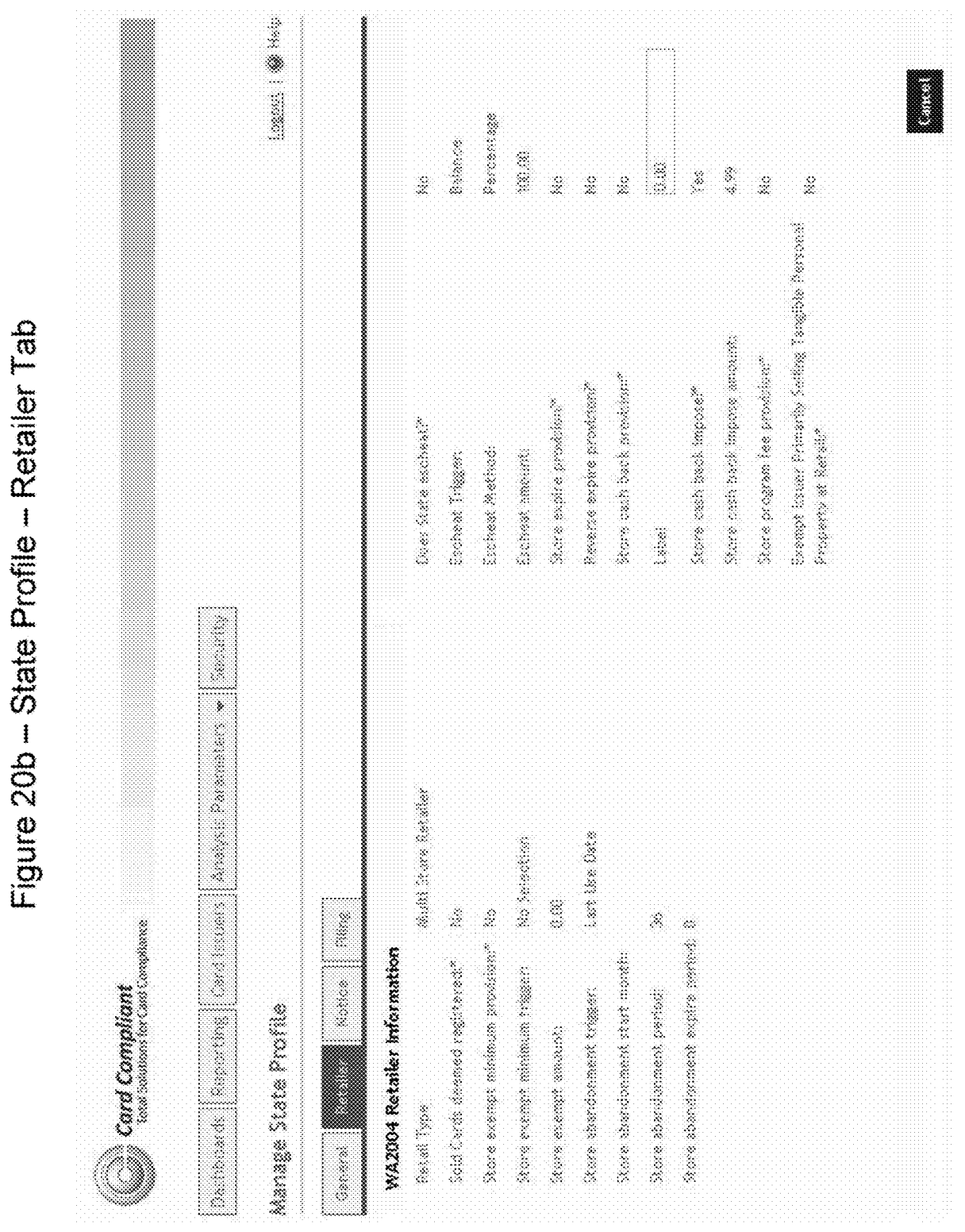

Referring to FIG. 20b, each State Profile includes the following fields in the Retailer tab for each of the six types of retailers: Retail Type (e.g., Single Store Retailer); Sold Cards deemed registered (Determines if the State considers a Card sold within its borders is registered to the State); Store exempt minimum provision (Determines if the State exempts from escheat appropriate Card values less than or equal to a designated amount); Store exempt minimum trigger (e.g., balance, sold amount); Store exempt amount (Amount at which appropriate Card value must be equal or less than for that Card to be exempted from escheat); Store abandonment trigger (Determines which date—sold date, last use, expire date, Store abandonment Start Month, Earlier of Expire Date or Abandon Period from Last Use Date, Earlier of Abandon Expire Period from Expire, Date or Abandon Period from Last Use Date, Abandon Expire Period from Expire Date if exists or Abandon Period from Last Use Date if no Expire Date—is used to calculate if a Card should be considered "Abandoned"); Store abandonment start month (State-mandated date to use to calculate if a Card should be considered "Abandoned" if Start Month is the trigger; Store abandonment period (Period of time in months used to calculate when a Card is considered "Abandoned"); Store abandonment expire period (Period of time in months used to calculate from the expire date when a Card is considered "Abandoned"); Does State escheat (Determines if the State escheats—or in other words, has relevant escheat/unclaimed property laws); Escheat Trigger (Determines which appropriate Card value is used to calculate amount held for escheat); Escheat Method (Determines which method is used to calculate amount held for escheat—e.g., Percentage); Escheat amount (Percentage or amount of the appropriate Card value that is held for escheat); Store expire provision (Determines if a state requires escheat because a Card has a an expiration date); Reverse expire provision (Determines if a state requires escheat because a Card does not have an expiration date); Store cash back provision (Determines if the State requires escheat if the Card Program has a cash back feature); Label (Determines the appropriate value of the Card before it requires escheat based on store cash back provision); Store cash back impose (Determines if the State requires the Issuer to provide cash back regardless of the Card Program features); Store Cash back impose amount (Determines the amount at which the appropriate Card value must be equal or less than before the State requires the Issuer to provide cash back); Store program fee provision (Determines if the State requires escheat if the Card Program applies fees to the Card); exempt issuer primarily selling tangible personal property at retail (determines if a state exempts a retailer if they sell personal property at retail).

Referring to FIG. 20c, each State Profile includes the following fields in the Notice tab: Notice Threshold Amount (Determines whether a notice may be required to be sent based on the appropriate Card value greater than or equal to); Statute Of Limitations (Determines whether a notice may be required to be sent based on the appropriate statute of limitations of the Card); Earliest (the earliest date a notice can be sent per state statute); Latest (the latest date a notice can be sent per state statute).

Referring to FIG. 20d, each State Profile includes the following fields in the Filing tab that relate to requirement for filings made relating to escheat with the state: Aggregate Max Amount (Determines the maximum amount of the appropriate Card value that it can be filed with other Cards of like value); Relation To Owner (Determines the owner code used for the electronic filing); Media Type (Determines the type of media used for the electronic filing, e.g., diskette or CD-ROM); Property Type Code (Determines the property code used for the electronic filing); Aggregate Property Type Code (Determines the property code used when filing Cards in the aggregate); Deduction Code (Determines the code used when filing to classify discounts or deductions); Is Encryption Required (Determines if an electronic file is required to be encrypted when filing).

The Escheat Service uses two types of Effective Dates to determine which historical version of a State Profile to apply to a particular Card with respect to states that have altered their unclaimed statutes over time. The first type is Sold Date where only Cards sold on or after the Effective Date will use that version of the State Profile. The second type is Presumed Abandon on or After where only the cards that have a presumed abandonment date on or after the effective date will use that version of the State Profile. The escheat service analyzes the Card using the abandonment period from the prior version of the State Profile to calculate the abandonment date (Presumed Abandoned Date) in order to see if it is on or after the current version of the State Profile. The Escheat Services analyzes either the Sold Date or the Presumed Abandoned Date for all Cards to determine the appropriate State Profile to be used for Evaluation.

The abandonment trigger varies greatly by state laws. Following are examples of how the Abandonment Trigger may be used in the Escheat Service Decision Tree: Sold Date (Escheat Service will calculate abandonment by adding the Abandonment Period to the Card Sold Date); Last Use Date (Escheat Service will calculate abandonment by adding the Abandonment Period to the Card Last Use Date, or if no Last Use Date exists, to the Card Sold Date); Expire Date (Escheat Service will calculate abandonment by adding the Abandonment Period to the Card Expire Date); Abandon Start Month (Escheat Service will calculate abandonment by adding the Abandonment Period to the Abandon Start Month dictated by the State); Earlier of Card Expiration Date or Abandon Period from Last Use (Escheat Service will calculate abandonment by evaluating which date is earlier the Card Expiration Date or Card Last Use Date plus the Abandon Period, or if no Last Use Date exists, the Card Sold Date plus the Abandon Period); Earlier of Abandon Period from Card Expiration Date or Abandon Period from Last Use (Escheat Service will calculate abandonment by evaluating which date is earlier the Card Expiration Date plus the Abandon Expire Period or Card Last Use Date plus the Abandon Period, or if no Last Use Date exists, the Card Sold Date plus the Abandon Period); Abandon Expire Period from Card Expiration Date if exists or period from Last Use if no Expiration Date (Escheat Service will calculate abandonment by adding the Abandon Expire Period to the Card Expiration Date, or if no expiration date exists, by adding the Abandon Period to the Card Last Use Date).

The Escheat Service of the instant invention uses a Decision Tree to process the analysis of the escheat status of each card. Each card is processed through the Decision Tree of the Escheat Service. The Decision Tree processes all pertinent legal variables (priority rules, individual state provisions, and the like) the pertinent factual variables (specific to the issuer, program, each card, and the like) and the Issuer's directives for the purpose of setting the escheat and derecognition status of each card and managing the cards slated for future escheat. Card data is logged and stored in a file in the Production Data Store for each condition in the tree, and for subsequent retrieval and use after the Escheat Service analysis has been concluded. In a preferred embodiment, any previous versions of the Decision Tree are maintained for historical records and audit purposes.

The first evaluation of the Decision Tree is to determine if the Card should be fully processed through the Decision Tree. For example, a Card with a $0 balance is not subject to full processing and is classified as "Used."

Cards that are not classed as used shall then begin the first priority evaluation through use of the First Priority Filter, determining if the Card is registered and therefore will not reach second or third priority evaluations. If the Card is not registered to a card owner (i.e. purchaser, recipient and address), the Escheat Service then evaluates whether the Sold State deems the Card to be registered to the Sold State. If the Card is registered or deemed registered, then the Escheat Service evaluates whether or not the Registered State escheats and therefore might prevent second or third priority evaluations. If the Registered State does escheat then the Escheat Service evaluates whether the appropriate exempt minimum Card value specified by the State is met. If the exempt minimum is met, the Card leaves first priority and requires second priority evaluation. If the Registered State does not escheat, the Escheat Service evaluates all other Card features that may still make the card escheat (conditional escheat) to the Registered State (such as expiration, cash back, fee features, and the like). This single condition evaluates both State provisions and Card Program provisions for based upon the feature being evaluated.

If the Card has reached second priority evaluation, then the Escheat Service determines whether or not the Holder State escheats and therefore might prevent third priority evaluation. If the Holder State does not escheat, the Escheat Service evaluates all other Card features that may still make the card escheat to the Holder State. This single condition evaluates both State provisions and Card Program provisions based upon the feature being evaluated. If the Holder State does escheat then the Escheat Service evaluates whether the appropriate exempt minimum Card value specified by the State is met. If the exempt minimum is met, the Card leaves second priority and requires third priority evaluation.

After evaluating first priority and second priority, the System determines if the Sold State requires third priority evaluation because the Sold State has enacted the third priority rule. If the Sold State does not escheat, the Escheat Service evaluates all other Card features that may still make the card escheat to the Sold State. This single condition evaluates both State provisions and Card Program provisions for both potential and actual values based upon the feature being evaluated.

The Optimal Holder State Analysis determines which result set produces the most beneficial non-escheat or escheat situation for the Card. The Escheat Service evaluates all scenarios to select the best outcome for the Card, evaluates all cards individually, and compiles the results of the analysis per batch for reporting. The first evaluation of the Optimal Holder State analysis is to find the result set with the greatest amount logged as "Available for Earnings". If two values match or the Card does not have any amount written to "Available for Earnings" additional evaluations are performed.

A Card Issuer set to the status of "Sales" results in additional analysis via the Escheat Service when a data set is presented. The Escheat Service first creates a "Baseline" analysis which will use only the assigned Holder State and Card Program to analyze the Card data and provide summary data. After the Baseline analysis, the System proceeds to analyze the Card data using each individual Escheat Product regardless of assignment to the Issuer. Each run is summarized for reporting purposes.

Escheat Triage Products are Holder State combinations that have predetermined results for optimal escheat solutions. During the evaluation of a Card, the Decision Tree may direct the Escheat Service to the Escheat Triage process which involves its own set of conditions and evaluations. Each Issuer may choose an Escheat Triage Product based upon the level of aggressiveness they would like for the portfolio.

A Card may reach Escheat Triage if it does not meet the Holder State exempt minimum or has gone through the Sold State evaluation and does not meet the Sold State minimum and is not registered to an Escheat State. Prior to performing the Decision Tree for any Escheat Product, the Escheat Service must determine if an Escheat Triage Product has been assigned to the Issuer. FIGS. 12 and 13 (discussed below) show decision flows for triage products of two embodiments of the invention.

After first evaluating the Card result sets for the highest amount written to Available for Earnings, the Escheat Service does an additional evaluation if two results sets have the same amount. This evaluation determines which of the options provides the longest presumed abandoned period for any amounts also written to "Held for Escheat".

Logging is a key component of the Escheat Service platform. The log files provide supporting documentation to all card sorting and Decision Tree logic. In a preferred embodiment, two types of files are created via the Escheat Service. The first type, the Analysis File, provides the major Card output fields required for reports and the second type provides detailed information about all Card data inputs and outputs throughout the Escheat Service. The Analysis Log files (also referred to as Audit Trails) contain a much more robust log of every condition evaluated for the Card in the Escheat Service, as well as all inputs and outputs. The Analysis Log files provide the substantiation that may be required for audit and legal purposes. The file shall contain the following data for all conditions: Condition name, Input values, Parameters evaluated, and Output. Both types of log files are stored in the Production Data Store.

In the preferred embodiment, the systems processing platform can be used to optimize the position of a card within a multiple footprint system and, therefore, maximize on an exact or near-exact basis the breakage that will be eligible for derecognition and other revenue generating events. FIG. 11 shows an example of a decision flow in the Decision Tree of the Escheat Service which separates cards slated for future escheat from cards slated not to escheat for positioning in different footprints with one footprint using an issuer domiciled in a non-escheat state and the other using an issuer domiciled in a favorable escheat state. FIG. 12 and FIG. 13 show examples of a decision flow in the Decision Tree of the Escheat Service which separates cards slated for future escheat for positioning in different footprints with the footprints using issuers domiciled in different favorable escheat states to place the escheat card with the best escheat state.

The Analysis File of the Escheat Service is utilized by the Card Classifier for classifying (or splitting) cards as into classes of cards for purposes described above. Referring to FIG. 9, a split issuer structure is shown in which a retailer/Issuer is a first issuer of cards, and a third party (CardCo) is a second issuer of cards sold by the Issuer. In the embodiment shown in FIG. 9, the cards are classified into to two classes with Class A consisting of the cards that are not slated for escheat and Class B consisting of the cards that are slated for future escheat by the Escheat Service. Cards that are classified by the Escheat Service and the Card Classifier as being A Cards are held by the Issuer if it is domiciled in a non-escheat state, or a subsidiary of the Issuer that is located in a non-escheat state. Cards that are classified as B cards go through the a same or similar encryption and privacy filter discussed above with respect to FIG. 8, to remove personal information about the cards owners and to encrypt the card numbers, and the card data from the Escheat Service output file is transmitted to the second issuer, CardCo. CardCo processes the card data through a separate Escheat Service that processes CardCo's own multiple footprint systems. Due to the privacy filter, CardCo will only receive anonymous cards reducing the application of the first priority rule. Furthermore, the Escheat Service optimizes the cards in CardCo's multiple footprint system to maximize escheat and derecognition of the cards under the second and third priority rules. The output files of CardCo's Escheat Service are processed through its own card classifier to change some of the Class B Cards to Class A Cards (e.g., in light of their anonymous status) and the Class A Cards are positioned with a non-escheat footprint, while the remaining Class B Cards are positioned with one or more escheat footprints, to minimize escheat and maximize derecognition or revenue generating events.

The Escheat Service provides a variety of reporting functions through the Reports Platform, including reports and/or populating forms for required state escheat filings, reporting regarding, creating and sending escheat notices to purchasers or card recipients, and audit responses. The Escheat Service looks at cards on an individual basis, and positions cards, determines when cards are subject to escheat, etc. In positioning or repositioning cards, the Reports platform compares a prior evaluation period's positioning report to evaluate any changes of holder for a particular card. If the holder state has changed, the change is reported to allow the Issuer to properly account for the positioning event.

The Escheat Service provides reports regarding the total amounts for a card portfolio without regard for possible future redemptions. This is because the Escheat Service only looks at or takes into account card activities over a given period (such as once a month); it does not take into account predictors for estimating redemption/breakage rates. Thus, the total amounts that are reported as subject to escheat or non-escheat are merely amounts that are potentially subject to escheat or non-escheat, if purchasers were to never actually redeem their cards. The Forecast Service provides forecasting reports that are based upon individual card data, but that also take into account actual historical redemption/breakage rates over a Issuer's entire portfolio and/or other predictors for estimating redemption/breakage rates. In a preferred embodiment, the forecasting results are utilized by the Escheat Service to produce reports, which summarize the present and future dollar amounts from a Issuer's portfolio of cards which are escheat and non-escheat. In a preferred embodiment, the forecasts use the age of cards as the primary predictor of redemption/breakage. Notwithstanding, it will be appreciated that other predictors may be utilized, alone or in combination, without departing from the spirit and scope of the instant invention. Other predictors, include, but are not limited to: amount remaining and/or amount activated on a card (e.g., a card with $100 on it is more likely to be redeemed than a card with less than $1.00 on it); zip code where card is sold or where purchaser/recipient reside (e.g., persons in certain geographic regions are more likely than persons in other regions to be more frugal); type of card (e.g., cards that can be utilized at multiple different locations or different retailers are more likely to be utilized than cards that can only be utilized at a more limited number of locations or retailers); sector in which card may be utilized (e.g., "big box stores" vs. specialty goods or services); information regarding the card purchaser/recipient (e.g., child vs. an adult); and whether the card has been used or never been used over a period of time.

Referring to FIG. 14 a schematic diagram of a Forecast Service of the instant invention is shown. The Forecast Service processes the historical transaction data for a program (such as the data for all card activity for a Issuer, or entity for which the program is designed to benefit, over a 5 year period). As described above, transaction data is sent from the Issuer through the Encryption and Privacy Filters to the ETL service discussed above. The ETL service creates and stores in the Production Data Store, an input file for the Forecast Service. The input file from the ETL service is inputted into the Triangle Application, and a Transactions Triangle (defined below) is created and stored in the Production Data Store. The Transactions Triangle is then utilized by the Forecast application to create an Aged-Based Balance Triangle, which shows the expected balance as a percentage of the original activated balance of a card based on age of the card. The Aged-Based Balance Triangle data is then utilized by a Forecast Engine to conduct a variance analysis, to obtain Redemption Discount Factors and breakage, and to obtain stability factors. The data output from the Forecasting Engine is stored in a file, and subsequently a database table, for use by other services. In a preferred embodiment, the data output from the Forecasting Engine is utilized by the Escheat Service (through Reporting Platform) to produce reports in which the redemption discounted balances are processed and reported for the cards slated for future escheat, the cards slated for derecognition and other segments or subsets of a card portfolio as described above. FIG. 15 is a schematic diagram of the process employed by the discussed embodiment the instant invention in individually positioning the redemption rate and breakage rate for each card for aggregation in determining redemption discounted balances. In yet another preferred embodiment, the data output from the Forecasting Engine is utilized by the Reporting Platform to create reports to a Issuer regarding measures of 1) Terminal Breakage, i.e., the proportion of the activation amount for a card (or cards) that is not expected to be redeemed, for possible derecognition, and 2) whether the rate of redemption of the Issuer's cards is changing over time.

The main input to the Forecast Service of the embodiment shown in FIG. 14 is the transaction data of all cards for that Issuer. From that data, the Triangle Application produces a Transactions Triangle matrix which summarizes the individual data of each card into data regarding each month and year of issuance for the group of cards being evaluated (i.e., Peer Group). For each month and year of issuance, the summarized data includes: 1) the total activation amount for all cards issued in that month and 2) the total dollar amount of transactions (e.g., redemptions plus a small amount of reloads) by month for subsequent months. The matrix has a row for each month of issuance and a column for each month of transactions. Since each row starts one month later than the previous row, it has one fewer month of transactions and fills one fewer columns than the previous row, which gives the matrix a triangular shape. In a preferred embodiment, the Transactions Triangle is capable of holding at least 121 rows of data, or ten years and one month. However, the instant invention may have additional or less rows as needed or desired without departing from the spirit and scope of the instant invention.

The Transactions Triangle is in a worksheet which is an Excel spreadsheet in the embodiment shown in FIG. 14. Each cell includes the dollars from any transaction, including activation, for the calendar months in the appropriate row and column. Thus, the dollar amount for a card issued Jan. 31, 2008 and redeemed Feb. 1, 2008 will be included in cells for January 2008 and February 2008 respectively, and the redemption will be considered to be on a one-month old card. The other input from the Triangle Application into the Transactions Triangle spreadsheet is a table of activation amounts by starting month, with the same number of rows as the triangle.

The main outputs of the Forecast Service shown in FIG. 14 are: 1) monthly Redemption Discount Factors; and 2) summaries of breakage and redemption. Monthly Redemption Discount Factors show the expected balance as a percent of the activation amount, by month of age, from 1 to 60 (in the preferred embodiment). The Redemption Discount Factors are used because the age of the card is a primary predictor of redemption. These factors estimate how much of the balance of a card of a certain age will be left at a later age for that same card. FIG. 22 shows a sample output for the Forecast Service of the instant invention, including a table of Redemption Discount Factors for one Issuer.

In a preferred embodiment, the Forecast Service creates a report for the Issuer listing three measures of breakage: Arithmetic Breakage; Slope-Determined Breakage, and Terminal Breakage. The Forecast Service also creates a report listing two measures of the stability of the redemption over time: Drift; and Consistency. The Arithmetic Breakage is not a forecast, it is just a summary of the Issuer's data. Slope-Determined Breakage shows the percent left on a Peer Group of cards that reach an age when the balance is declining very slowly and is not expected to go down by much after that. Terminal Breakage is the theoretical limit of the balance—how much of the balance that is expected to never be redeemed.

Regarding stability, Drift shows the underlying trend of the balance for a given age (e.g., Month 14) as the start date advances, and is designated as "Positive," "Negative," and "Stable." For example, a positive drift for month 14 means that as time goes on, newer groups of cards will have a higher balance at 14 months than older groups. Consistency measures how much the redemption patterns jump around from year to year over and above any drift. It shows the Issuer how reliable the current redemption patterns will be in predicting next year's redemption. Consistency is designated at levels from A (low variability) to D (very high variability).

Referring to FIG. 14, the flow of data through the Forecast Service of the instant invention is shown. First, the Triangle Application summarizes the transaction data for an Issuer, which comes from a transactional data file and a card file, and puts that summarized data into a triangle file and a table of activation amounts by month, both of which are located in the Production Data Store. Both the triangle file and the table go into an applications spreadsheet. The triangle, called the "Transactions Triangle," goes into a worksheet with up to 121 rows, corresponding to the starting months, and 121 columns, corresponding to the months of transaction. The diagonal cells of the worksheet have the net value (activation amount less redemptions) in the first month for all cards activated in that month. For example, the cell in the January 2008 row and the January 2008 column shows the net dollars of activations less redemptions during the first month for the January 2008 group. The rest of the cells in a corresponding row show the net redemptions for all months after each activation month.

The Forecast Service spreadsheet uses the activation amounts and transforms the Transactions Triangle, through a series of worksheets, into an "Age-Based Balance" triangle, also with 121 rows and columns. In this triangle, each row is still a starting month, but each column is now a month of age. A cell in a given row (starting month) and column (month of age) contains the percent of the original balance for the cards that started in that month that is still unredeemed at that age. The percentages for each row decrease across the columns because the total dollars from redemptions for that group in any month after the first month will most likely outweigh any dollars from reloads, making the balance lower each month. Since the data starts five years back, cards in later starting groups have fewer months of transactions. This makes the Age-Based Balance matrix a triangle as before, except that in this case the diagonal goes from the upper right to the lower left corner. FIG. 14 shows an illustration of the Transactions Triangle and the Age-Based Balance Triangle discussed above.

The Forecast Service then uses a model (statistical model rules and financial rules) to compute the monthly Redemption Discount Factors and terminal and other breakage values from the age-based triangle. The Forecast Service also summarizes data from the age-based triangle to produce measures of stability. The monthly Redemption Discount Factors and Terminal Breakage are passed to the Escheat Service, which uses them to calculate the Redemption Adjusted Balances (described above) in the reports. The Forecast Service also derives the stability measures and issues a report to the Issuer with the breakage and stability measures.

The monthly Balance Factor for a given month of age is the estimated percent of the activation amount remaining on a card at the end of that month. For example, referring to FIG. 22 the value of 6.9580% (rounded) for 20 months means that it is expected that a card issued for $100 will have a balance of $6.96 at the end of the 20th month. Since the balance on a card on the average goes down over time, the factors are decreasing by month. It is assumed that the balance for a card will decrease in proportion to these Redemption Discount Factors. Thus, if a group of cards has an initial balance of $1,000, it is expected that the unredeemed amount will be 6.9580%*$1,000=$695.80 in 20 months. Or referring to FIG. 22, if a card is 12 months old and has a $200 balance, it is expected that in 10 months, the cards will be 22 months old and have a balance of:

$200*Factor(22)/Factor(12)=$200*6.4045%/ 11.2522%=$113.84.

The Forecast Service uses a forecasting model in the spreadsheet to derive the monthly Redemption Discount Factors from the age-based triangle. First, the dollar balance is summarized by column (i.e., month of age) to get a "raw" average balance for each month of age. Since each succeeding column has one less cell than the last, the averages for the earlier months of age are based on more data and on earlier months than the later columns. For example, the first column represents balances for the first month of cards issued during each activation month over the last ten years, whereas the 121st column has only one cell, representing the balance for the most recent calendar month available, which is the 121st month of a card issued ten years ago.

In some embodiments of the invention, to make the averages more comparable, the Forecast Service limits the averages to the first 36 rows, or first 3 years of issue. In alternative embodiments, the Forecast Service uses all of the rows but weights the balances by the issue amount, since many Issuers have seasonal business with the bulk of their activations (and resulting balance dollars) in one or two months of the year. In any case, the result is a row of average balances by month of age. These balances are generally declining, but jump around slightly, especially for the later months, which are based on fewer months of data.

Next, to obtain Redemption Discount Factors that are more logical predictors of the balances and exclude inconsistencies that may be introduced (e.g., an older card that is redeemed may have a larger impact on its age group since there will likely be fewer older cards still having a balance), a curve is fitted through the points represented by the 121 raw balances. This curve better represents the "real" expected balance for each age. The best form of a curve was found to follow the formula:

Percent Balance for month $t = a/(b+t)^d + c$ where t=age of card (months) and a, b, c, and d, are positive constants.

As t gets large, the first term on the right hand side, $a/(b+t)^d$, gets close to zero and the total approaches c. This gives the curve a "hyperbolic" shape, meaning that it gets closer to a horizontal line of height c, which represents the portion of the balance that will never be redeemed.

The model derives values of a, b, c, and d using the least-squares criteria to obtain a curve that most closely "fits" the 61 average balances. This is done by computing the sum of the squares of the differences between the averages and their corresponding points on the curve, and then using the Microsoft Solver routine in Excel to find a, b, c, and d which will minimize this sum. The combination of values of the constants that minimize this sum is unique. This process is therefore objective and replicable.

Suppose that the "best" values of the constants from Solver are $a_1$, $b_1$, $c_1$, and $d_1$. Then the monthly Redemption Discount Factors are computed from these values using the formula:

Factor$(t) = a_1/(b_1+t)^{d_1} + c_1$, for $t=1,2,3,\ldots,60$

The formula provides the points on the fitted curve corresponding to each month. The value of $c_1$ is the model's estimate of Terminal Breakage.

The term "fitted" may connote that the curve and therefore the factors vary for different fits of the same triangle of numbers. Although the computational procedure is detailed, it will consistently yield the same results for a given triangle. This is in the same way that an arithmetic average of a given set of numbers (which is just another kind of "fitted" estimate) will always have the same value if it is computed correctly.

Arithmetic Breakage is the actual balance left for the oldest age group in the Issuer's data. Arithmetic Breakage is included in the Forecast Service report to show the Issuer the actual redemption rate. Many card issuers erroneously think that their Arithmetic Breakage is the same as the ultimate (terminal) breakage.

Slope-Determined Breakage is the breakage for the month of age where the month-to-month decline in the Balance Factor is less than 0.25% of the previous month's factor. This breakage is used in the Forecast Service report along with the month of age. The month of age shows the Issuer the month in the life cycle that the redemptions slow down so much that the balance will not change by a significant amount.

Slope-Determined Breakage is derived using the following algorithm:

Starting with $t=1$, compute $PD(t)=1-\text{Factor}(t)/\text{Factor}(t-1)$, which is the percent decline in the Balance Factor, for successive values of t and stop at the first month t where PD(t) is under 0.25%. If this does not happen by month 120, then the fitted curve can be extended using the balance curve equation discussed above for computing Factor(t) for t>120.

Terminal Breakage is the asymptotic limit of the balance curve that is fitted to the data. Terminal Breakage is reported to the Issuer to show the "real" amount of the activated amount that will theoretically never be redeemed. In addition, either Terminal Breakage or Slope-Determined Breakage is used in the Forecast Service reports to compute the adjusted balances after redemption on non-escheat cards. Basically, the totals of adjusted non-escheat dollars are proportional to this value.

Terminal Breakage is an output of the curve-fitting model described above to find the Redemption Discount Factors. The fitted value of $c_1$ is the level to which the balance curve approaches and is therefore the estimate of Terminal Breakage.

Drift is the underlying trend of the balance for at given age (e.g., "Month 14") as the start date changes. Drift is defined as the slope of a line that is fitted to the balances for multiple Peer Groups of cards measured at the same age (i.e., months since activation).

Drift is reported along with the month used to show the Issuer whether the redemption is increasing or decreasing over time, and whether the Issuer should change the amortization and other decisions accordingly.

Drift is derived by taking the balances for a given age over a sequence of starting dates and removing the seasonal and irregular components, using a 12-month centered moving average. Then a line is fit though the data to show the underlying trend. Below we describe the computation of Drift in more detail.

1) Determine the age on which to base Drift. In a preferred embodiment, this is the age where the balance is the nearest to 5% over the Terminal Breakage. For example, in FIG. 22, the Terminal Breakage is 3.58%. The closest factor to 3.58%+5%=8.58% is Factor(16)=8.60%, so month 16 is used.

2) Obtain a centered moving average on the groups for that age. This is done as follows. First, take the series of monthly balances for the appropriate age from that column of the age-balance triangle. For example, for 14 months, this data comes from the 14th column of the age-based balance triangle and represents the 14-month balances of groups that started in consecutive months (e.g., January 2008, February 2008, etc.).

3) Then, obtain the centered moving average over 12 months for this series. A centered moving average averages two moving averages to "center" the average around that month. For example, for starting month 19 in the series, the average of the 12-month moving averages for 1) Month 13 through Month 24 and 2) Month 14 through Month 25 are taken. Taking these two moving averages "centers" the months used on Month 19, since the "center" of 13 through 24 is 18½ and the "center" of 14 through 25 is 19½; thus, the final average is centered on the middle of 18½ and 19½, or 19. Obtaining moving averages has the effect of taking out seasonality and some of the random variation from the balance data, better showing the underlying trend. Since a moving average must include 6 raw data points before and after each averaged point, obtaining this moving average reduces the number of data points.

4) Fit a line through the centered moving averages. This is accomplished by the least-squares criteria and can be done using the TREND function in Excel. The points on this line will be used later to compute Consistency. Since the least-squares fit is unique, as it was for the balance curve, this method is again objective and replicable.

5) Code the rate of increase to "Positive," "Negative,", or "Stable." In the preferred embodiment, we code the percentage per year T to:

Positive if T>0.1,
Negative if T<−0.1, and
Stable if −0.1<=T<=+0.1

Thus, the report shows the Drift as Positive, Negative, or Stable.

Consistency measures how much the redemption patterns jump around from year to year, over and above any Drift. This is reported to the Issuer along with Drift and month of balance to show how reliable the current redemption patterns will be in predicting next year's (or future) redemption. Thus, Drift may be positive, but a low Consistency will warn the Issuer that next year's balances or breakage still may not necessarily be higher than the current year.

Consistency is derived using the same month of age that was used for Drift. The series of centered moving averages (CMAs) and the points on the least-squares trend line that was used for drift is used. For each month in the series, the difference between the CMA and the trended value for that month (e.g., the distance from the point to the line) is computed. The absolute value of this difference divided by the trended value as a percent is taken. The average of all of the percents in the series is then taken. Suppose, for purposes of example that the resulting average is 3.1%. Then the average group of cards has a balance after, for example 14 months, that deviates by an average of 3.1% from the underlying trend. Finally, this average X is coded into A through D by:

A if 0<=X<=2%,
B if 2%<X<=4%,
C if 4%<X<=6%, and
D if X>6%.

In the example above, X=3.1% will be reported as a "B" for consistency. However, thresholds may be adjusted.

In a preferred embodiment of the instant invention, for the first year of service for a Issuer, the third party service provider updates the above measurements at the 3 and 6 month marks, and then at 6 months intervals. For each update, this would mean restating old transactions if necessary and adding more months of history to the triangles, and then redoing the factors and measures.

Each update of the Forecast Service includes tracking the estimates that are based on the factors from the previous version. For example, consider a Issuer with the first run based on data ending with 1Q2009. After three months, in 2Q2009, the 1Q2009 portfolio of non-escheat cards, plus non-escheat cards issued during 2Q2009 are taken and the 1Q2009 factors are used to estimate what the total non-escheat balance in this portfolio would be at the end of 2Q2009. This total is then compared to the actual value of the portfolio at the end of 2Q2009. If, for example, the estimated value was $98M and the actual value was $100M, the factors are considered "98.0% accurate." For a portfolio of cards issued in a quarter, the Forecast Service may be used to demonstrate alternative schedules for the Issuer to account for Terminal Breakage on the books of the Issuer (e.g., take to earnings). In a current embodiment, three alternatives are processed: 1) Amortizing over time in proportion to the redemption (which can be derived from the Redemption Discount Factors), 2) Doing a straight line from 0 to 60 months, and 3) Doing a straight line for the month when 80% of the activation amount is redeemed (again, shown by the Redemption Discount Factors) to the 36th month.

The Escheat Service discussed above tells an Issuer (through reports) whether any individual card or group of cards will escheat and when it or they will escheat. The Redemption Discount Factors from Forecast Service are used to estimate how much of the current balance of the cards will be left for escheat after redemptions. The Redemption Discount Factors can also be used to estimate the future redemptions of non-escheat cards or the terminal value (breakage) of these cards.

For escheat cards, it is assumed that the card issuer (Issuer) will honor any redemptions that occur between the presumed abandonment date and the filing date. Thus the balance for redemptions are adjusted until the filing date.

To adjust escheat balances for redemptions, examples of the factors are shown in the first table in FIG. 22. For each age of the card in months, the associated factor is the average remaining balance at the end of that month as a percent of the activation amount.

For a card or group of cards with a given age and escheat filing date, suppose that the total balance and amount slated for escheat is known. To adjust the escheat amount for redemptions, use the formula:

$$ER=EC*\text{Factor(age at filing)}/\text{Factor(age now)},$$

where
 ER=amount of escheat adjusted for redemption,
 EC=current balance scheduled for escheat, and
 Factor(t)=the Balance Factor in the table for t months.

Example 1

A card with a $100 face value is 12 months old, has $60 left on it, and is scheduled to escheat 14 months from now. Then, age now=12, age at escheat filing=12+14=26, and EC=$100. From the above formula, $$ER=\$100*\text{Factor}(26)/\text{Factor}(12)$$

Looking in the table, $$=\$100*5.6372\%/11.2522\%=\$50.10.$$

So it is expected that the balance will be $50.10 at filing time.

Example 2

A new card with a $100 face value is scheduled to escheat in 3 years and to file four months later. Use the formula with age at filing=36+4=40 and age now=0. Then, $$ER=\$100*\text{Factor}(40)/\text{Factor}(0)=\$100*4.4063\%/100\%=\$4.41$$

Note again that this example includes possible redemptions after the presumed abandonment date, up until the filing date. To adjust the non-escheat portions of hybrid card balances for redemption, it is assumed that the Issuer will take the non-escheat balance of the card at the time that the Issuer files for the card escheating. The same formula is applied to the non-escheat balance of these cards.

Example 3

A $100 card is 12 months old and currently still has a $100 balance. The card is held in Alabama, which is a 60-40 state (the State takes 60% of the amount, and the Issuer keeps 40%) and the filing date for escheat is 14 months from now. What will be the adjusted balance in 14 months?

Of the $100 balance, 40%, or $40, is non-escheat. Using the same formula with the same factors as in Example 1, you get:

$$\text{Adjusted balance}=\$40*\text{Factor}(26)/\text{Factor}(12)$$
$$=\$40*5.6372\%/11.2522\%=\$20.04.$$

To adjust balances of non-escheat cards for redemption we assume that the amount left over after redemption will be the breakage. To compute this amount, use the above formula with the bottom line of the table ("Slope-Breakage") for the age of escheat.

Example 4

What is the estimated breakage for a non-escheat card 8 months old with a $50 balance? We get:

$$\text{Estimated Breakage}=\$50*\text{Factor(Terminal)}/\text{Factor}(8)$$

$$=\$50*3.58\%/16.3240\%=\$10.97.$$

The choice of using slope-breakage rate for breakage in the Forecast Service is arbitrary. Terminal Breakage could be used as an alternative and would result in a slightly lower adjusted amount.

In the above-described embodiment of the Forecast Service, earnings are taken by an Issuer on a portfolio basis; however, card transaction data is obtained/maintained/handled by the Escheat Service on a per card basis. The Derecognition Service reconciles any actual differences between the portfolio basis and the per card basis. In addition, the Derecognition Service takes transaction data and settles accounts on a periodic basis (such as monthly) between subsidiaries in a multiple-footprint model. This allows the Issuer in the embodiment discussed in connection with FIG. 9 to keep cash for a longer period of time. Referring to FIG. 9, when a card is repositioned from the Issuer to one of the third party's subsidiaries, or vice versa, Derecognition Service provides reports that account for assets, liabilities and income on each respective entity's books. Derecognition Service accounts for the transfers of assets, liabilities and income on a per card basis.

As is discussed above, the Derecognition Service also reconciles the fact that earnings are taken through the Forecast Service on a portfolio basis with the individual card positioning basis. Derecognition Service maintains accounts (i.e., databases or spreadsheets, which are stored in the Production Data Store), to track amounts that a Issuer has taken to earnings (through acceleration of earnings utilizing the balance curves of the Forecast Service of the instant invention discussed above) with respect to a given group or batch of cards (an "Accelerated Earnings Adjustment Account"). Derecognition Service determines the difference between the activation amount and the redeemed amount for the cards of the batch to obtain the "current" amount existing on those cards. In a preferred embodiment, this is determined based upon the age of a card and the time in which the last activity occurred. At the point in which Derecognition Service determines the likelihood of redemption is remote, the amount current on each card is subtracted from the "current" account and added to a "contingent" account for the batch of cards. Derecognition Service then determines the difference between the Accelerated Earning Adjustment Account and the Contingent Account, and that difference is taken to earnings (if positive) or is derecognized from earnings (if negative).

Figure 29:

The Reports Platform of the embodiment stated in FIG. 8 utilizes data stored in the Production Data Store and other Analysis Files or Data Bases (including data from the Issuer Profile) to produce various reports for a Issuer. In addition, the Reports Platform supports the generation of Escheat Notices to card owners (purchaser or recipient), generates forms for filing escheat amounts with the various states, and certain responses to inquiries or audit requests from escheat jurisdictions. When generating Escheat Notices, the Reports Platform utilizes the First Priority Filter to determine if sufficient address information is available regarding the card owner for the Issuer to send the required notice. All reports, filings, notices and associated documents are stored in the Business Data Store for archival purposes. FIGS. 23 through 29 show examples of various reports that may be generated by the Reports Platform of the instant invention, including: a Issuer summary report summarizing escheat information for a batch of cards; a cash report showing a breakdown of card information for each subsidiary in a multiple-footprint model; an escheat payable due report showing when, where and how much from a batch of cards will be subject to escheat; a card notices report showing cards that require escheat notices; a portfolio positioning report showing data regarding cards from a batch that have been positioned and/or repositioned into various entities of a multiple-footprint model; an aged escheat report showing escheat amounts that are expected to be payable taking into account redemption forecasts; and an aged non-escheat report showing amounts that are expected to be taken to earnings taking into account redemption/breakage forecasts.

Referring to FIG. 16 a schematic diagram of a system configuration of an embodiment of the instant invention used to process the system for card owners to identify and look-up the issuer of a particular card in a program is shown. As is shown in FIG. 16, card owners or end-users may look-up the issuer of a particular card possessed by the end-user through a web portal. The web port access of portion of the Production Data Store to associate the end-user's card number with the specific issuer. As is shown in FIG. 16, the Web Port may also be used by the Issuer to access reports and other data to which the Issuer has access through the Reports Platform and the Production Data Store.

Referring to FIGS. 17 and 18, schematic diagrams of several embodiments of system configurations of the instant invention are shown. FIG. 17 shows a system configuration of an embodiment of the instant invention in which a Issuer processes internally, through a single footprint model, the products and/or services that the Issuer offers and that are potentially subject to escheat. FIG. 18 is a schematic diagram of a system configuration of an embodiment of the instant invention in which a Issuer utilizes a third party processor for external processing of at least some of the products and/or services that the Issuer offers and that are potentially subject to escheat. In the embodiment shown in FIG. 18, the Issuer may process all products and/or services through the third party processor in a single footprint model, or alternatively, in a multiple footprint model or a split issuer model, the Issuer may process a portion of its products and/or services through the third party processor and process another portion internally in the same or similar manner as shown and described with respect to FIG. 17.

The embodiments shown in FIGS. 17 and 18 are particularly well-suited for systems and methods of the invention in which real-time (or near real-time) online positioning and/or repositioning occurs. In the embodiments shown in FIGS. 17 and 18, payment processors (i.e., Visa, MasterCard, Discover, American Express, etc.)(through routers and gateway servers), ATM's and/or ATM networks, stand alone shopping kiosks, public telephone and wireless networks (through Interactive Voice Response systems), public Internet web sites of Issuers, and/or Issuer POS systems are connected via one or more networks (such as the Internet) to transaction servers and switches of the inventive system. The transaction servers and switches are connected through an internal network to one or more application servers that analyze individual accounts or property that may be targeted for escheat, that position or reposition individually each account or item of property and the associated funds into parent or subsidiary accounts to achieve optimum compliance with applicable unclaimed property laws while either minimizing or maximizing the amount of funds escheated to the appropriate jurisdictions, and that provide forecasting reports and/or recommendations/instructions for revenue generating events. The application servers are connected through the internal network to one or more relational database servers for storing information for use by and/or processed by the application servers. In the embodiment shown in FIG. 18, the transaction server is connected via virtual or dedicated IP secure gateway network connections to a server of a third party processor.

In a preferred embodiment of the instant invention, differing levels of access to the platform of the instant invention are provided to different system users. For example, access levels may be associated with a particular user's login account and other security required passwords or numbers. System users include, but are not necessarily limited to, administrative system users of a third party service compliance provider, the Issuers, card owners, escheat jurisdictions, and third parties who may have an interest in the property at issue. Levels of access to certain functions or portions of the platform may further be segregated within the groups described above. For example, access to encrypted personally identifiable information received may be limited to only to the Issuer or certain third party service providers.

In the foregoing description, certain terms have been used for brevity, clearness and understanding; but no unnecessary limitations are to be implied there from beyond the requirements of the prior art, because such terms are used for descriptive purposes and are intended to be broadly construed. Moreover, the description and illustration of the inventions is by way of example, and the scope of the inventions is not limited to the exact details shown or described. For example, it will be appreciated that the terms such as "platform", "service", or "architecture" although used herein to refer to specific structures are intended to encompass components including but not limited to single pieces of hardware, software programs or subprograms, groups of hardware working together, groups of software programs or subprograms working together, or any combination thereof.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall there between.

What is claimed is:

1. A method for determining escheat status for unclaimed property, said method comprising the steps of:
    utilizing data regarding a variable-balance payment instrument that is potentially subject to escheat; and
    analyzing said data via a rules-based processing platform to determine a first set of escheat information, said first set of escheat information comprising an indication of whether said payment instrument is subject to escheat, an amount that is subject to escheat, and a jurisdiction in which said payment instrument is subject to escheat,
    wherein the first set of escheat information is determined assuming the payment instrument is held by a first entity, regardless of whether the payment instrument is actually held by the first entity when the first set of escheat information is determined.

2. The method as claimed in claim 1 further comprising the steps of:
    positioning said payment instrument by logging the first set of escheat information in an output file, the output file being associated with said payment instrument;
    assigning a redemption/breakage rate to said payment instrument based upon a model of redemption/breakage; and
    logging said redemption/breakage rate in said output file.

3. The method as claimed in claim 2 further comprising the steps of:
    assigning a redemption discounted balance to said payment instrument; and
    logging said redemption discounted balance in said output file.

4. The method as claimed in claim 3 further comprising the step of aggregating redemption/breakage rates, and redemption discounted balances for a specific subset of payment instruments for which such data is logged in said output file.

5. The method as claimed in claim 1 wherein said utilizing and analyzing steps are performed upon activation of said payment instrument.

6. The method as claimed in claim 2 wherein said utilizing, analyzing, and positioning steps are performed subsequent to a prior positioning of said payment instrument such that said positioning step comprises repositioning said payment instrument, the prior positioning being one of an initial positioning and a subsequent positioning, the initial positioning being associated with activation of said payment instrument.

7. The method as claimed in claim 3:
    wherein said utilizing, analyzing, positioning, assigning and logging steps are performed subsequent to a prior positioning of said payment instrument such that said positioning step comprises repositioning said payment instrument, the prior positioning being one of an initial positioning and a subsequent positioning, the initial positioning being associated with activation of said payment instrument; and
    wherein said assigning steps comprise the steps of assigning redemption/breakage rate and redemption discounted balance to said payment instrument based said first set of escheat information.

8. A method for determining escheat status for unclaimed property, said method comprising the steps of:
    utilizing data regarding a variable-balance payment instrument that is potentially subject to escheat;
    analyzing said data via a rules-based processing platform to determine whether said payment instrument, assuming said payment instrument is held by a first entity, is subject to escheat, an amount that is subject to escheat, and a jurisdiction in which said payment instrument is subject to escheat, and to further determine whether said payment instrument is subject to escheat assuming said payment instrument is held by a second entity, an amount that is subject to escheat, and a jurisdiction in which said payment instrument is subject to escheat; and
    comparing results of said analyzing step to determine whether a desired escheat status is obtained by holding said payment instrument in said first entity or in said second entity.

9. The method as claimed in claim 8 wherein said second entity comprises a plurality of entities, and wherein said step of analyzing said data via said rules-based platform to determine whether said payment instrument is subject to escheat assuming said payment instrument is held by a second entity comprises:
    analyzing for each of said plurality of entities said data via said rules-based platform to determine whether said payment instrument is subject to escheat assuming said payment instrument is held by each of said plurality of entities; and
    wherein said comparing step comprises comparing results of said analyzing step to determine whether optimal escheat is obtained by holding said payment instrument in said first entity or in any of said plurality of entities.

10. The method as claimed in claim 8 further comprising the step of logging results of said analyzing and comparing steps into an output analysis file.

11. The method as claimed in claim 10 wherein said output analysis file is stored in a production data store.

12. The method as claimed in claim 10 wherein said output analysis file is utilized by a reports platform to generate reports regarding said analyzing and comparing steps.

13. The method as claimed in claim 12 wherein said reports include state escheat filings, escheat notices to purchasers or recipients of said payment instrument, and audit responses.

14. The method as claimed in claim 12 wherein said reports are stored in a business data store.

15. The method as claimed in claim 8, further comprising the step of obtaining a batch of data regarding a plurality of individual payment instruments that are potentially subject to escheat, and wherein said utilizing, analyzing, and comparing steps are performed separately for each individual payment instruments.

16. The method as claimed in claim 15, further comprising the step of logging individually with respect to each payment instrument, results of said analyzing and comparing steps into an output analysis file.

17. The method as claimed in claim 15 further comprising the step of processing said batch of data through a forecast engine to estimate a redemption discounted balance for the payment instruments that have been determined to be subject to escheat but which will be redeemed prior to escheatment.

18. The method as claimed in claim 8, wherein said payment instrument is selected from payment instruments that use electronic systems or devices to carry out payment including: magnetic stripe cards, chip based cards/devices, and wireless phone chip devices.

19. The method as claimed in claim 18, wherein said payment instrument is selected from the list of: prepaid cards, stored value cards, gift cards, credit memo accounts or cards, loyalty or affinity points or cards, rebates, promotional cards, awards or incentive points or cards, health savings account cards, government benefit cards, payroll cards, per diem cards, prepaid minutes from wireline or wireless telephone companies, electronic coupons or certifications, and mobile chip payment systems.

20. The method as claimed in claim 18 wherein said payment instrument comprises a stored value card.

21. The method as claimed in claim 8 wherein said data includes said profile information.

22. The method as claimed in claim 8 wherein said utilizing, analyzing, and comparing steps are performed separately for each individual payment instrument on a real-time or near real-time basis.

\* \* \* \* \*